United States Patent
Takizawa et al.

[11] Patent Number: 5,565,748
[45] Date of Patent: Oct. 15, 1996

[54] POSITIONING AND CONTROL APPARATUS THAT IS INTERACTIVELY PROGRAMMABLE USING A DISPLAY

[75] Inventors: Yoshichika Takizawa; Yasuyuki Suzuki; Misako Okada; Makoto Nishimura; Hidehiko Matsumoto; Yasuharu Kudo; Tohru Tsujimoto, all of Aichi, Japan

[73] Assignee: Mitsubishi Denki Kabushiki Kaisha, Tokyo, Japan

[21] Appl. No.: 268,109

[22] Filed: Jul. 6, 1994

Related U.S. Application Data

[62] Division of Ser. No. 936,841, Aug. 27, 1992.

[30] Foreign Application Priority Data

Sep. 13, 1991 [JP] Japan ................... 3-234635

[51] Int. Cl.⁶ .................................. G05B 19/04
[52] U.S. Cl. ................. 318/568.1; 318/568.13; 364/474.24
[58] Field of Search .............. 318/568.25, 560–579; 364/167.01, 172–175, 474.11, 474.22, 474.23, 474.24, 474.27, 578

[56] References Cited

U.S. PATENT DOCUMENTS

| | | | |
|---|---|---|---|
| 4,568,866 | 2/1986 | Floro et al. | 318/696 |
| 4,609,855 | 9/1986 | Andrews | 318/561 |
| 4,663,704 | 5/1987 | Jones et al. | 364/188 |
| 4,771,374 | 9/1988 | Ropelato | 364/130 |
| 4,799,158 | 1/1989 | Patil | 364/424.1 |
| 4,864,205 | 9/1989 | Fisher et al. | 318/568.11 |
| 4,879,644 | 11/1989 | Gottshall | 364/167.01 |
| 4,901,221 | 2/1990 | Kodosky et al. | 395/159 |
| 4,908,746 | 3/1990 | Vaughn | 364/147 |
| 4,949,253 | 8/1990 | Chigira et al. | 395/500 |
| 4,982,358 | 1/1991 | Tanaka et al. | 364/147 X |
| 4,999,553 | 3/1991 | Seraji | 318/561 |
| 5,025,200 | 6/1991 | Kurakake et al. | 318/569 |
| 5,097,405 | 3/1992 | Sato | 364/147 X |
| 5,168,441 | 12/1992 | Onarheim et al. | 364/146 |
| 5,173,869 | 12/1992 | Sakamoto et al. | 364/147 X |
| 5,177,420 | 1/1993 | Wada et al. | 318/568.1 |
| 5,187,788 | 2/1993 | Marmelstein | 395/600 X |
| 5,336,982 | 8/1994 | Backes | 318/568.22 |
| 5,355,062 | 10/1994 | Takizawa et al. | 318/568.1 |
| 5,377,116 | 12/1994 | Wayne et al. | 364/474.17 |

FOREIGN PATENT DOCUMENTS 0358776  3/1990  European Pat. Off. .

*Primary Examiner*—Brian Sircus
*Attorney, Agent, or Firm*—Sughrue, Mion, Zinn, Macpeak & Seas; Richard C. Turner

[57] ABSTRACT

An apparatus for synchronously controlling the actual operation of a machine using one or more motors, such as servo motors, by simulating in program form a combination of selectable machine mechanisms, including drivers, connecting shafts, clutches, gears and cams. Each such machine mechanism is represented by a virtual mechanism, preferably as a software module that contains information uniquely identifying the module, operation information that defines the generation of position information and connection information that defines other modules to which connection is made. The software modules comprise drive modules for generating position information, transmission modules for simulating the transmission mechanisms and output modules for outputting motor commands.

26 Claims, 90 Drawing Sheets

VIRTUAL CONNECTING SHAFT 50

FIG. 10

| MODULE SEGMENTATION | MODULE SEGMENTATION NUMBER | 71 |
| MODULE SEGMENTATION | MODULE SEGMENTATION NUMBER | 72 |
| 80 | 81 | |

FIG. 17

| MODULE NUMBER | | ~71 |
|---|---|---|
| CONNECTION INFORMATION | | ~72 |
| OPERATION EXPRESSION | $y = NR/NE(x(n)-(x(n-1))+y$ | ~100 |
| VARIABLE | NONE | ~101 |
| PARAMETERS | NUMBER OF PULSES PER VIRTUAL CONNECTING SHAFT REVOLUTION : NR | ~102 |
| | NUMBER OF PULSES PER ENCODER REVOLUTION : NE | ~103 |

FIG. 18

| | |
|---|---|
| PRECEDING VALUE OF INPUT PULSE COUNT FROM ENCODER : x(n-1) | ~104 |
| CURRENT VALUE OF INPUT PULSE COUNT FROM ENCODER : x(n) | ~105 |

FIG. 20

| MODULE NUMBER | | ~71 |
|---|---|---|
| CONNECTION INFORMATION | | ~72 |
| POSITIONING PROGRAM | | ~110 |
| VARIABLES | POSITIONING PROGRAM START COMMAND | ~111 |
| | EXECUTED POSITIONING PROGRAM NUMBER | ~112 |
| | VARIABLE USED IN POSITIONING PROGRAM | ~113 |
| PARAMETER | PARAMETER USED IN POSITIONING PROGRAM | ~114 |

FIG. 23

| | | |
|---|---|---|
| MODULE NUMBER | | 71 |
| CONNECTION INFORMATION | | 72 |
| AUXILIARY INPUT AXIS CONNECTION INFORMATION | NONE | 76 |
| OPERATION EXPRESSION | y= (x(n)-x(n-1))*Gi/Go*Gs+y | 120 |
| VARIABLE | NONE | 121 |
| PARAMETERS | NUMBER OF TEETH ON INPUT AXIS SIDE: Gi | 122 |
| | NUMBER OF TEETH ON OUTPUT AXIS SIDE: Go | 123 |
| | NUMBER-OF-GEAR INFORMATION, EVEN = -1/odd = +1: Gs | 124 |

FIG. 24

| | |
|---|---|
| PRECEDING VALUE OF INPUT AXIS POSITION ADDRESS DATA: x(n-1) | 125 |
| CURRENT VALUE OF INPUT AXIS POSITION ADDRESS DATA: x(n) | 126 |
| OUTPUT AXIS POSITION ADDRESS DATA: y | 127 |

FIG. 26

| MODULE NUMBER | | | 71 |
|---|---|---|---|
| CONNECTION INFORMATION | | | 72 |
| AUXILIARY INPUT SHAFT CONNECTION INFORMATION | NONE | | 76 |
| OPERATION EXPRESSION | $y = T((x(n)-x(n-1))*Gi/Go*Gs*i+y,t)$ | | 130 |
| VARIABLE | TIME CONSTANT SETTING ADDRESS (VARIABLE MEMORY ADDRESS) | | 131 |
| PARAMETERS | NUMBER OF TEETH ON INPUT AXIS SIDE : Gi | | 122 |
| | NUMBER OF TEETH ON OUTPUT AXIS SIDE : Go | | 123 |
| | NUMBER-OF-GEAR INFORMATION, EVEN = -1/ODD = +1 : Gs | | 124 |
| | GEAR VALIDITY RANGE INPUT AXIS SIDE ADDRESS TABLE | STARTING POSITION ADDRESS (Goj) | END POSITION ADDRESS (Gbj) | 132 |
| | | Go1 | Gb1 |
| | | Go2 | Gb2 |
| | | ⋮ | ⋮ |
| | | Gon | Gbn |

FIG. 27

| PRECEDING VALUE OF INPUT AXIS POSITION ADDRESS DATA : $x(n-1)$ | 125 |
|---|---|
| CURRENT VALUE OF INPUT AXIS POSITION ADDRESS DATA : $x(n)$ | 126 |
| OUTPUT AXIS POSITION ADDRESS DATA : $y$ | 127 |

FIG.30
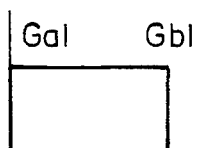
a. FILTER TIME CONSTANT t=0
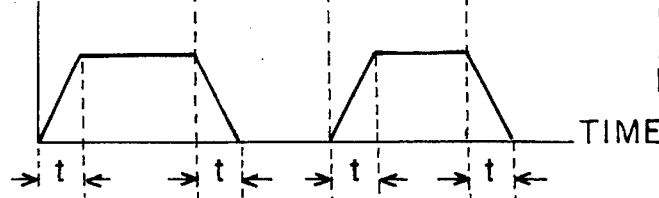
b. TIME CONSTANT t ≠ 0 AND LINEAR ACCELERATION / DECELERATION
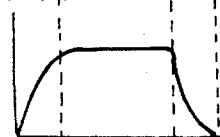
c. TIME CONSTANT t ≠ 0 AND EXPONENTIAL ACCELERATION / DECELERATION
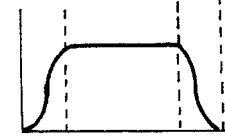
d. TIME CONSTANT t ≠ 0 AND S-PATTERN ACCELERATION / DECELERATION

FIG. 31

| | | |
|---|---|---|
| MODULE NUMBER | | 71 |
| CONNECTION INFORMATION | | 72 |
| AUXILIARY INPUT AXIS CONNECTION INFORMATION | NONE | 76 |
| OPERATION EXPRESSION | $y(n) = (x(n) - x(n-1))\ (h) + y(n-1)$ | 150 |
| VARIABLE | VARIABLE MEMORY ADDRESS WHERE VIRTUAL CLUTCH MODULE ON/OFF COMMAND INFORMATION IS STORED | 151 |
| PARAMETER | NONE | 152 |

FIG. 32

| | |
|---|---|
| PRECEDING VALUE OF INPUT AXIS POSITION ADDRESS DATA: $x(n-1)$ | 153 |
| CURRENT VALUE OF INPUT AXIS POSITION ADDRESS DATA: $y(n)$ | 154 |
| PRECEDING VALUE OF OUTPUT AXIS POSITION ADDRESS DATA: $y(n-1)$ | 155 |
| CURRENT VALUE OF OUTPUT AXIS POSITION ADDRESS DATA: $y(n)$ | 156 |

FIG. 33

| | |
|---|---|
| VIRTUAL CLUTCH MODULE ON/OFF COMMAND : h (ON:1, OFF: 0) | 157 |

FIG. 35

| | 71 MODULE NUMBER | | |
|---|---|---|---|
| | 72 CONNECTION INFORMATION | | |
| AUXILIARY INPUT AXIS CONNECTION INFORMATION | 76 | NONE | |
| OPERATION EXPRESSION | 160 | $y(n) = (x(n) - x(n-1))(h) + y(n-1)$ | |
| VARIABLE | 161 | NONE | |
| PARAMETER 1 | 162 | VIRTUAL CLUTCH MODULE ON ADDRESS: AddON | |
| PARAMETER 2 | 163 | VIRTUAL CLUTCH MODULE OFF ADDRESS: AddOFF | |

FIG. 36

| | |
|---|---|
| 164 | PRECEDING VALUE OF INPUT AXIS POSITION ADDRESS DATA: x (n-1) |
| 165 | CURRENT VALUE OF INPUT AXIS POSITION ADDRESS DATA: x (n) |
| 166 | PRECEDING VALUE OF OUTPUT AXIS POSITION ADDRESS DATA: y (n-1) |
| 167 | CURRENT VALUE OF OUTPUT AXIS POSITION ADDRESS DATA: y (n) |
| 168 | VIRTUAL CLUTCH MODULE ON/OFF COMMAND: h (ON: 1, OFF: 0) |

FIG. 38

| | MODULE NUMBER | |
|---|---|---|
| | CONNECTION INFORMATION | |
| AUXILIARY INPUT AXIS CONNECTION INFORMATION | | NONE |
| OPERATION EXPRESSION 1 | | $y(n) = (x(n) - x(n-1))(h) + y(n-1)$ |
| OPERATION EXPRESSION 2 | | $yf(n) = y(n) + \alpha(yf(n-1) - y(n))$ |
| VARIABLE 1 | | VARIABLE MEMORY ADDRESS WHERE VIRTUAL CLUTCH MODULE ON/OFF COMMAND INFORMATION IS STORED |
| VARIABLE 2 | | VARIABLE MEMORY ADDRESS WHERE FILTER CONSTANT IS STORED |
| PARAMETER | | NONE |

FIG. 40

| VIRTUAL CLUTCH MODULE ON/OFF COMMAND: h (ON: 1, OFF: 0) | VIRTUAL CLUTCH MODULE FILTER CONSTANT: α (0 TO 1) |
|---|---|
| 181 | 182 |

FIG. 48

| PRECEDING VALUE OF INPUT AXIS POSITION ADDRESS DATA: x(n-1) | CURRENT VALUE OF INPUT AXIS POSITION ADDRESS DATA: x(n) | AUXILIARY INPUT AXIS TRAVEL: z = V/T | OUTPUT AXIS POSITION ADDRESS DATA: y | AUXILIARY INPUT AXIS COMMAND VELOCITY: V |
|---|---|---|---|---|
| 213 | 214 | 215 | 216 | 217 |

FIG. 47

| MODULE NUMBER | CONNECTION INFORMATION | OPERATION EXPRESSION $y(n) = \dfrac{CMX1}{CDV1} * (x(n) - x(n-1)) - \dfrac{CMX2}{CDV2} * z + y$ | PARAMETERS | GEAR RATIO BETWEEN INPUT AXIS AND OUTPUT AXIS $\dfrac{CMX1}{CDV1}$ | GEAR RATIO BETWEEN AUXILIARY INPUT AXIS AND OUTPUT AXIS $\dfrac{CMX2}{CDV2}$ |
|---|---|---|---|---|---|
| 71 | 72 | 210 | | 211 | 212 |

FIG. 54

| MODULE NUMBER | 71 |
|---|---|
| CONNECTION INFORMATION | 72 |
| AUXILIARY INPUT AXIS CONNECTION INFORMATION | 76 |
| OPERATION EXPRESSION $y = \dfrac{CMX1}{CDV1} * (x(n) - x(n-1)) - \dfrac{CMX2}{CDV2} * (z(n) - z(n-1)) + y$ | 220 |
| PARAMETERS — GEAR RATIO BETWEEN INPUT AXIS AND OUTPUT AXIS $\dfrac{CMX1}{CDV1}$ | 221 |
| GEAR RATIO BETWEEN AUXILIARY INPUT AXIS AND OUTPUT AXIS $\dfrac{CMX2}{CDV2}$ | 222 |

FIG. 55

| |
|---|
| PRECEDING VALUE OF INPUT AXIS POSITION ADDRESS DATA: $x(n-1)$ — 223 |
| CURRENT VALUE OF INPUT AXIS POSITION ADDRESS DATA: $x(n)$ — 224 |
| PRECEDING VALUE OF AUXILIARY INPUT AXIS POSITION ADDRESS DATA: $z(n-1)$ — 225 |
| CURRENT VALUE OF AUXILIARY INPUT AXIS POSITION ADDRESS DATA: $z(n)$ — 226 |
| OUTPUT AXIS POSITION ADDRESS DATA: $y$ — 227 |

FIG. 56

| | |
|---|---|
| PARAMETERS | NUMBER OF GEARS BETWEEN INPUT AXIS AND OUTPUT AXIS: P1 — 228 |
| | NUMBER OF GEARS BETWEEN AUXILIARY INPUT AXIS AND OUTPUT AXIS: P2 — 229 |

FIG. 60

| MODULE NUMBER | | | | |
|---|---|---|---|---|
| CONNECTION INFORMATION | | | | |
| OPERATION EXPRESSION | $y = \dfrac{CMX1}{CDV1} * (x(n) - x(n-1)) - \dfrac{CMX2}{CDV2} * z(i) + y$ | | | |
| PARAMETERS | | GEAR RATIO BETWEEN INPUT AXIS AND OUTPUT AXIS $\dfrac{CMX1}{CDV1}$ | GEAR RATIO BETWEEN AUXILIARY INPUT AXIS AND OUTPUT AXIS $\dfrac{CMX2}{CDV2}$ | |

| |
|---|
| PRECEDING VALUE OF INPUT AXIS POSITION ADDRESS DATA: $x(n-1)$ — 238 |
| CURRENT VALUE OF INPUT AXIS POSITION ADDRESS DATA: $x(n)$ — 239 |
| AUXILIARY INPUT AXIS ADDRESS DATA TABLE NUMBER: $i$ — 240 |
| CURRENT VALUE OF AUXILIARY INPUT AXIS TRAVEL DATA: $z(i)$ — 241 |
| OUTPUT AXIS POSITION ADDRESS DATA: $y$ — 242 |

FIG. 66

| MODULE NUMBER | | 71 |
|---|---|---|
| CONNECTION INFORMATION | | 72 |
| AUXILIARY INPUT AXIS CONNECTION INFORMATION | NONE | 76 |
| OPERATION EXPRESSION | $y(n) = (x(n) - x(n-1))(h) + y(n-1)$ | 250 |
| VARIABLE | VARIABLE MEMORY ADDRESS WHERE VIRTUAL SPEED CHANGE MODULE SPEED CHANGE RATIO IS STORED | 251 |
| PARAMETER | NONE | 252 |

FIG. 67

| | |
|---|---|
| PRECEDING VALUE OF INPUT AXIS POSITION ADDRESS DATA: x(n-1) | 253 |
| CURRENT VALUE OF INPUT AXIS POSITION ADDRESS DATA: x(n) | 254 |
| PRECEDING VALUE OF OUTPUT AXIS POSITION ADDRESS DATA: y(n-1) | 255 |
| CURRENT VALUE OF OUTPUT AXIS POSITION ADDRESS DATA: y(n) | 256 |

FIG. 68

| | |
|---|---|
| VIRTUAL SPEED CHANGE MODULE SPEED CHANGE RATIO: h | 257 |

FIG. 70

| | MODULE NUMBER | | |
|---|---|---|---|
| CONNECTION INFORMATION | AUXILIARY INPUT AXIS CONNECTION INFORMATION | NONE | |
| OPERATION EXPRESSION 1 | VIRTUAL SPEED CHANGE MODULE OPERATION EXPRESSION $y(n) = (x(n) - x(n-1))(h) + y(n-1)$ | | |
| OPERATION EXPRESSION 2 | FILTER OPERATION EXPRESSION $yf(n) = y(n) + (yf(n-1) - y(n))$ | | |
| VARIABLE 1 | VARIABLE MEMORY ADDRESS WHERE VIRTUAL SPEED CHANGE MODULE SPEED CHANGE RATIO IS STORED | | |
| VARIABLE 2 | VARIABLE MEMORY ADDRESS WHERE FILTER CONSTANT $\alpha$ IS STORED | | |
| PARAMETER | NONE | | |

FIG. 71

| |
|---|
| PRECEDING VALUE OF INPUT AXIS POSITION ADDRESS DATA: x (n-1) |
| CURRENT VALUE OF INPUT AXIS POSITION ADDRESS DATA: x (n) |
| PRECEDING VALUE OF OUTPUT AXIS POSITION ADDRESS DATA: y (n-1) |
| CURRENT VALUE OF OUTPUT AXIS POSITION ADDRESS DATA: y (n) |
| PRECEDING VALUE OF AFTER-FILTERED OUTPUT AXIS POSITION ADDRESS DATA: yf (n-1) |
| CURRENT VALUE OF AFTER-FILTERED OUTPUT AXIS POSITION ADDRESS DATA: y (n) |

| |
|---|
| VIRTUAL SPEED CHANGE MODULE SPEED CHANGE RATIO: h |
| VIRTUAL SPEED CHANGE MODULE FILTER RATIO: $\alpha$ (0 to 1) |

| MODULE NUMBER | | ~71 |
|---|---|---|
| CONNECTION INFORMATION | | ~72 |
| AUXILIARY INPUT AXIS CONNECTION INFORMATION | | ~76 |
| OPERATION EXPRESSION | $A = x + z$<br>$D = D1 + (D2-D1) * (A-A1) / (A2-A1)$<br>$Y = (h1) * (D) + h2$ | ~282 |
| VARIABLES | STROKE VALUE SET VALUE: h1<br>STROKE BOTTOM POSITION SET VALUE: h2 | ~283 |

FIG. 82

| MODULE NUMBER | | ~71 |
|---|---|---|
| CONNECTION INFORMATION | | ~72 |
| AUXILIARY INPUT AXIS CONNECTION INFORMATION | | ~76 |
| OPERATION EXPRESSION | $A = x + z$<br>$D = D1 + (D2-D1) * \{(A-A1) / (A2-A1)\}$<br>$Y = (h1) \times (D) + E$ | ~292 |
| VARIABLES | STROKE VALUE SET VALUE: h1<br>STARTING ADDRESS OF POSITION FEEDING CAM OPERATION ON VIRTUAL CAM AXIS: h3 | ~293 |

FIG. 83

| OFFSET REGISTER: E | ~294 |

FIG. 87

| | | |
|---|---|---|
| MODULE NUMBER | | ~71 |
| CONNECTION INFORMATION | | ~72 |
| AUXILIARY INPUT AXIS CONNECTION INFORMATION | | ~76 |
| OPERATION EXPRESSION | $A = x + z$<br><br>$D = D1 + (D2-D1) * (A-A1) / (A2-A1)$<br><br>$y = (F) * (D) + h2$ | ~302 |
| VARIABLE | STROKE VALUE SET VALUE: H1<br><br>STROKE BOTTOM POSITION SET VALUE: h2<br><br>UPDATED ADDRESS OF STROKE VALUE ON VIRTUAL CAM SHAFT: h4 | ~303 |

FIG. 88

| STROKE VALUE DATA: F | ~304 |

FIG. 89

| MODULE NUMBER | | ~71 |
|---|---|---|
| CONNECTION INFORMATION | | ~72 |
| OPERATION EXPRESSION | Y = x(n) | ~310 |
| | P = (x(n) - (n-1)) / N1*πL * 1 | ~121 |
| VARIABLES | NONE | ~311 |
| PARAMETERS | SERVO OUTPUT AXIS NUMBER | ~312 |
| | ROLLER DIAMETER: L | ~313 |
| | NUMBER OF PULSES PER ROLLER REVOLUTION: N1 | |

FIG. 90

| PRECEDING VALUE OF INPUT AXIS POSITION ADDRESS DATA: x(n-1) | ~125 |
|---|---|
| CURRENT VALUE OF INPUT AXIS POSITION ADDRESS DATA: x(n) | ~126 |

FIG. 92

| MODULE NUMBER | | ~71 |
|---|---|---|
| CONNECTION INFORMATION | | ~72 |
| OPERATION EXPRESSION | $Y = x(n) + b$ | ~320 |
| | $P = (x(n) - z) * B1 / N1$ | |
| VARIABLE | NONE | ~121 |
| PARAMETERS | SERVO OUTPUT AXIS NUMBER | ~311 |
| | BALLSCREW PITCH: B1 | ~321 |
| | BALLSCREW BACKLASH: B2 | ~322 |
| | NUMBER OF PULSES PER BALLSCREW REVOLUTION: N1 | ~323 |

FIG. 93

| | |
|---|---|
| PRECEDING VALUE OF INPUT AXIS POSITION ADDRESS DATA: $x(n-1)$ | ~125 |
| CURRENT VALUE OF INPUT AXIS POSITION ADDRESS DATA: $x(n)$ | ~126 |

FIG. 96

| MODULE NUMBER | | ← 71 |
|---|---|---|
| CONNECTION INFORMATION | | ← 72 |
| OPERATION EXPRESSION | Y = x(n) | ← 330 |
| | P = (x(n) %N1) / N1 * 360 | ← 121 |
| VARIABLE | NONE | ← 311 |
| PARAMETER | SERVO OUTPUT AXIS NUMBER | ← 331 |
| | NUMBER OF PULSES PER ROTARY TABLE REVOLUTION: N1 | |

FIG. 97

| CURRENT VALUE OF INPUT AXIS POSITION ADDRESS DATA: | x(n) | ← 126 |

FIG. 99

| MODULE NUMBER | | 71 |
|---|---|---|
| CONNECTION INFORMATION | | 72 |
| OPERATION EXPRESSION | $Y = x(n)$ | 340 |
| | $Y_0 = k$ | |
| VARIABLE | TORQUE LIMIT VALUE SETTING ADDRESS (VARIABLE MEMORY ADDRESS) | 341 |
| PARAMETER | SERVO OUTPUT AXIS NUMBER | 311 |

FIG. 100

CURRENT VALUE OF INPUT AXIS POSITION ADDRESS DATA: $x(n)$ — 126

FIG. 109

| MODULE NUMBER | 71 |
|---|---|
| CONNECTION INFORMATION | 72 |
| OPERATION EXPRESSION OR POSITIONING PROGRAM | 73 |
| STOP COMMAND | |
| VARIABLE | 74 VARIABLES |
| PARAMETER | 75 |

| VIRTUAL DRIVE MODULE OUTPUT POSITION INFORMATION |
|---|

| BLOCK 1 STARTING ADDRESS |
|---|
| BLOCK 2 STARTING ADDRESS |

FIG. 120D
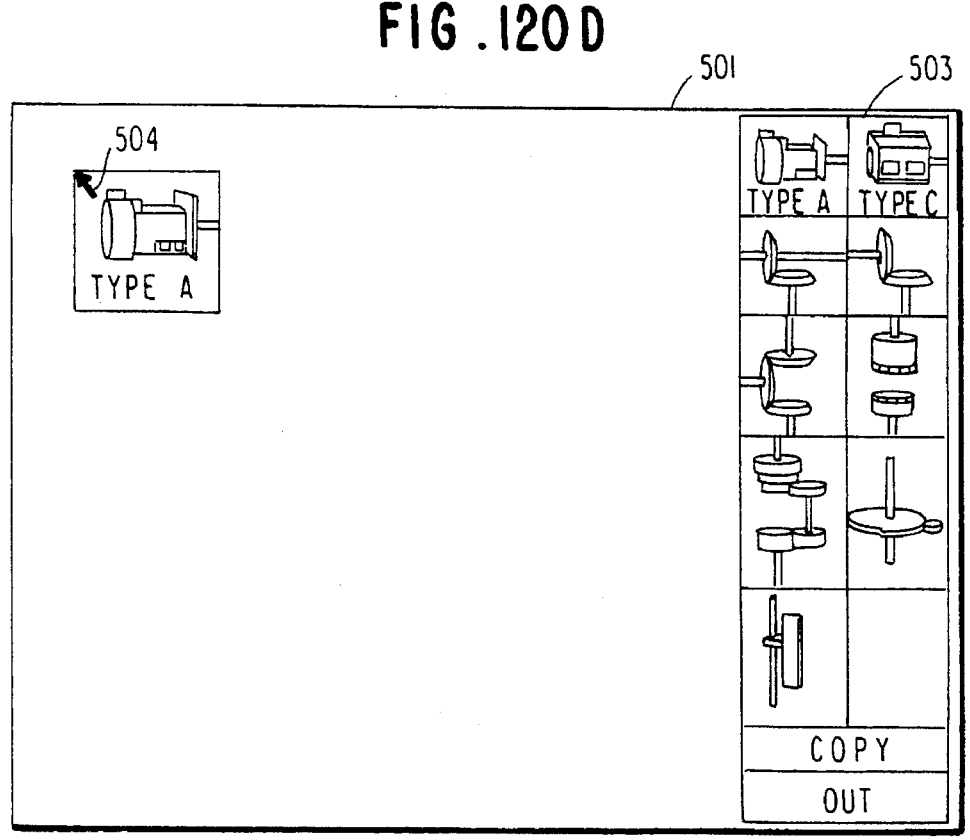
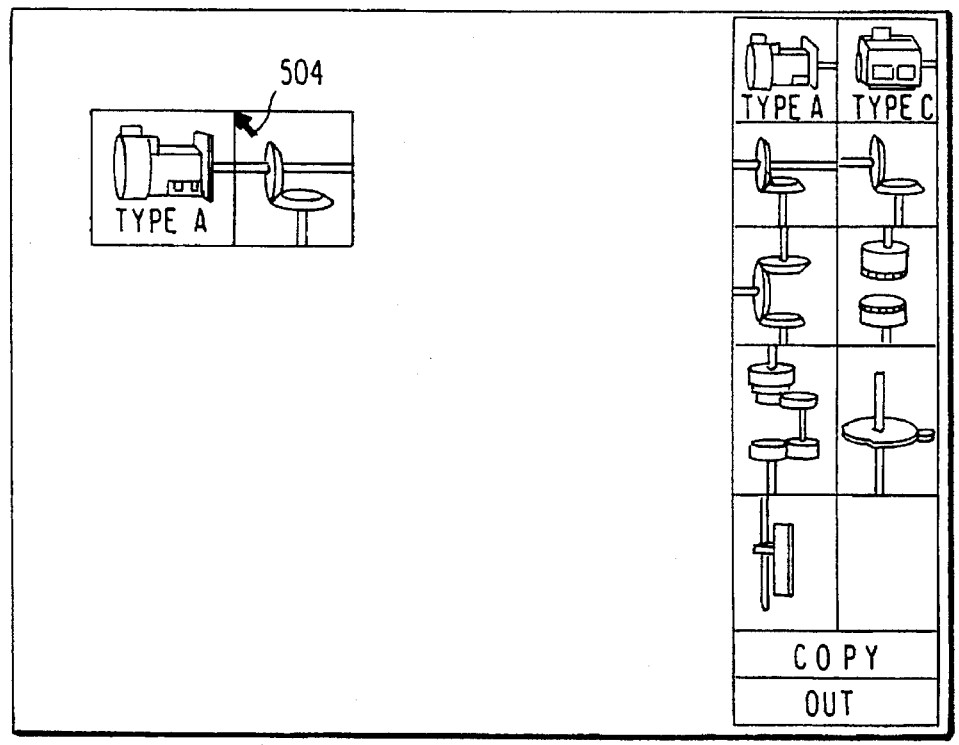
FIG. 120E

FIG. 129
PRIOR ART
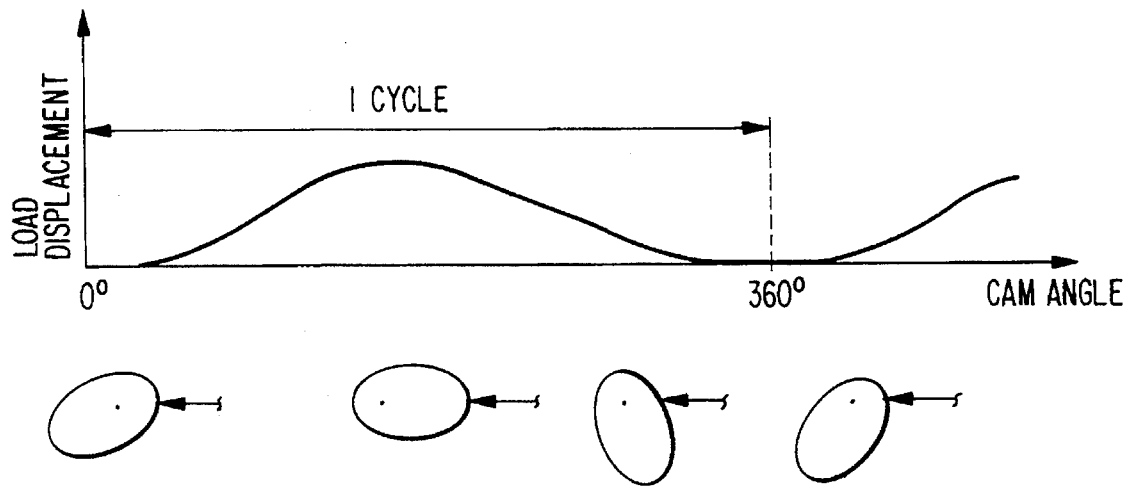
FIG. 130
PRIOR ART
| TARGET POSITION ADDRESS |
| --- |
| COMMAND VELOCITY |
| ACCEL./DECEL. TIME |
FIG. 131
PRIOR ART
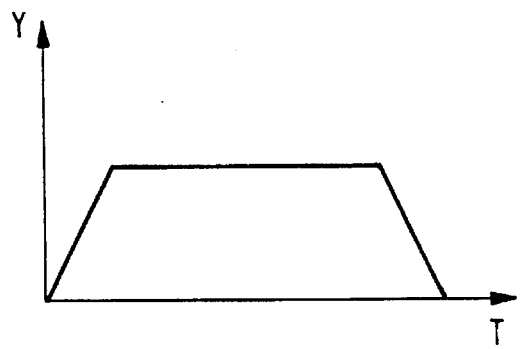

1

POSITIONING AND CONTROL APPARATUS THAT IS INTERACTIVELY PROGRAMMABLE USING A DISPLAY

This is a divisional of Application Ser. No. 07/936,841 filed Aug. 27, 1992.

BACKGROUND OF THE INVENTION

1. Field of the Invention

The present invention relates to the generation of positioning commands for controlling motors, such as servo motors, and particularly to a positioning apparatus for exercising synchronous control with only the motors, without employing actual machine mechanisms, such as connecting shafts, clutches, gears and cams.

2. Description of the Background Art

It is known in the art that there are industrial machines consisting of a large number of movable parts which must operate synchronously with each other.

A first conventional embodiment will be described in reference to the appended drawings. FIG. 121 illustrates the arrangement of a fluid filling machine as an example of a machine described above, of which numerous movable parts operate synchronously with each other. Referring to FIG. 121, the numeral 400 indicates a motor, 401 a connecting shaft, 402a, 402b, 402c and 402d gears, 403a, 403b and 403c clutches, 404 a transfer shaft, 405 a lifting shaft, 406 a filling shaft, 407 a conveyor, 408 a transferring cam, 409 a lifting cam, 410 a filling cam, 411 a lifting table, 412 a vessel filled with liquid, 413 a filling cylinder, 414 a filling piston, and 415 a filling nozzle.

FIG. 122 shows the operations of the conveyor 407, lifting table 411 and filling piston 414 illustrated in FIG. 121, wherein a horizontal axis indicates time and a vertical axis denotes the velocities of the conveyor 407, lifting table 411 and filling piston 414.

In FIG. 122, the velocities of the conveyor 407, lifting table 411 and filling piston 414 are determined in accordance with the patterns of the transferring cam 408, lifting cam 409 and filling cam 410 in FIG. 121.

The operation of the machine in FIG. 121 will now be described. The motor 400 not only provides power to the whole filling machine but also rotates the connecting shaft 401 to synchronize the whole filling machine. The connecting shaft 401 transmits the motion of the motor 400 via the gears 402a–402d to the transfer shaft 404, lifting shaft 405 and filling shaft 406. The transfer shaft 404 is connected to the conveyor 407 to transfer the vessel 412 filled with liquid. The lifting shaft 405 is connected to the lifting table 411 which is risen up to the position of a fill hole for filling the vessel 412 with liquid and is lowered as the vessel 412 is filled with liquid, and the filling shaft 406 is built to operate the filling piston 414 for sucking the liquid into the cylinder 413, discharging the liquid from the cylinder 413, and filling the vessel 412. The clutches 403a to 403c are engaged when the rotation of the connecting shaft 401 is transmitted to each of the transfer shaft 404, lifting shaft 405 and filling shaft 406, and are disengaged when the rotation is not transmitted.

Referring to FIG. 121, all the clutches 403a to 403c are first disengaged, the clutches of the transfer shaft 404, lifting shaft 405 and filling shaft 406 are then engaged separately on a shaft-by-shaft basis, and the shafts are operated to move the conveyor 407, lifting table 411 and filling piston 414 to their initial positions. All the clutches 403a to 403c are then engaged at the same time, and the transfer shaft 404 is operated in accordance with the motion of the motor 400 and the pattern of the transferring cam 408, thereby operating the conveyor 407. At this time, as shown in FIG. 122, the filling piston 414 simultaneously performs suction operation in accordance with the pattern of the filling cam 410 (Interval A in FIG. 122). After the conveyor 407 has reached a predetermined place, the lifting table 411 rises in accordance with the pattern of the lifting cam 409, moving the vessel 412 to be filled with liquid up to a predetermined height (interval B in FIG. 122). The lifting table 411 is then lowered in accordance with the pattern of the lifting cam 409, and the filling piston 414 concurrently performs filling operation in accordance with the pattern of the filling cam 410 (interval C in FIG. 122). By thus transmitting the motion of the motor 400 via the connecting shaft 401 to the transfer shaft 404, lifting shaft 405 and filling shaft 406, the sequence of operations are performed in synchronization with the motion of the motor 400.

A second conventional embodiment will now be described with reference to the appended drawings. FIG. 123 shows a conventional embodiment employing a single positioning controller to control transfer, lifting and filling operations with servo motors, wherein 421 indicates a transferring servo motor, 422 a lifting servo motor, 423 a filling servo motor, 424 a servo amplifier for controlling the transferring servo motor 421, 425 a servo amplifier for controlling the lifting servo motor 422, 426 a servo amplifier for controlling the filling servo motor 423, and 420 a positioning controller for giving position commands to the servo amplifiers 424 to 426, and 427 is equivalent to a transfer apparatus including the transfer shaft 404 and conveyor 407 in FIG. 121, 428 equivalent to a lifting apparatus including the lifting shaft 405 and lifting table 411 in FIG. 121, and 429 equivalent to a filling apparatus including the filling shaft 406, filling cylinder 413, filling piston 414 and filling nozzle 415 in FIG. 121.

The operation of the second conventional embodiment will now be described in reference to FIG. 123. The positioning controller 420 gives position commands to the servo amplifiers 424–426 in accordance with a positioning program which causes the conveyor, lifting table and filling piston to operate as shown in FIG. 122. The positioning program is written to perform the two-axis interpolative operation of the transfer shaft 404 and filling shaft 406 in the interval A in FIG. 122, so that the transferring servo motor 421 is rotated to operate the conveyor 407 and locate the vessel 412 to a liquid filling position, and also the filling servo motor 423 is rotated to lower the filling piston 414 and fill the filling cylinder 413 with liquid. Then, in the interval B in FIG. 122, the program is written to rotate the lifting servo motor 422 to raise the lifting table 411. Finally, in the interval C in FIG. 122, the program is written to perform the two-axis interpolative operation of the filling shaft 406 and lifting shaft 405 so that the filling servo motor 423 is rotated to raise the filling piston 414 and fill the vessel 412 with the liquid from inside the filling cylinder 413, and simultaneously, the lifting servo motor 422 is rotated to lower the lifting table 411.

A third conventional embodiment will now be described with reference to the appended drawings. FIG. 124 shows the third conventional embodiment using three servo amplifiers having a single-axis positioning function with the transfer shaft 404, lifting shaft 405 and filling shaft 406 for operating them in accordance with commands from a single sequence controller. 421 to 423, 427 to 429 and 431 to 433 indicate parts identical to those shown in FIG. 123.

The operation of the third conventional embodiment will now be described with reference to FIG. 124. When provided with an operation command 1, the transferring servo amplifier 431 rotates the transferring servo motor 421 to operate the conveyor 407 in a pattern indicated in the interval A in FIG. 122. When given an operation command 2, the lifting servo amplifier 432 rotates the lifting servo motor 422 to operate the lifting table 411 in a pattern indicated in the interval B in FIG. 122, and when provided with an operation command 3, rotates the lifting servo motor 422 to operate the lifting table 411 in a pattern indicated in the interval C in FIG. 122. When given an operation command 4, the filling servo amplifier 433 rotates the filling servo motor 423 to operate the filling piston 414 in a pattern indicated in the interval A in FIG. 122, and when provided with an operation command 5, rotates the filling servo motor 423 to operate the filling piston 414 in a pattern indicated in the interval C in FIG. 122.

The sequence controller 430 simultaneously provides the transferring servo amplifier 431 with the operation command 1 and the filling servo amplifier 433 with the operation command 4. After receiving completion signals indicating that respective operations are complete, the sequence controller 430 gives the lifting servo amplifier 432 the operation command 2. Thereafter, when receiving a completion signal indicating that the operation of the lifting table 411 is complete, the sequence controller 430 simultaneously issues the operation command 3 to the lifting servo amplifier 432 and the operation command 5 to the filling servo amplifiers 433, thereby operating the conveyor 407 and filling piston 414. The sequence controller 430 thus communicates the operation commands and completion signals with the transferring servo amplifier 431, lifting servo amplifier 432 and filling servo amplifier 433 to operate the conveyor 407, lifting table 411 and filling piston 414 in the patterns shown in FIG. 122.

A fourth conventional embodiment will now be described with reference to FIG. 125 which shows an example of a conveyor line where products transferred on a belt conveyor are machined in sequence by a plurality of machines to finish them into end products. 444 indicates a belt conveyor, 443a and 443b objects to be machined which are transferred on the belt conveyor, 442a and 442b rollers supporting the belt conveyor, 440 an induction motor for driving the roller 442a via a gear 441, 445 an encoder mounted to the roller 442b for detecting the travel of the belt conveyor, 446a and 446b positioning controllers, 447a and 447b encoder input interfaces provided inside the positioning controllers 446a and 446b, respectively, and 448a and 448b objects to be controlled incorporating servo motors, such as robots or machines, controlled by the commands of the positioning controllers 446a and 447b, respectively.

The operation of the fourth conventional embodiment will now be described. The induction motor 440 keeps running at a constant velocity, rotating the roller 442 via the gear 441. The rotation of this roller 442a drives the belt conveyor 444, transferring the objects to be machined 443a, 443b. The objects to be controlled 448a, 448b, which are machines Containing servo motors for machining the objects to be machined 443a, 443b, operate in accordance with the commands of the positioning controllers 446a, 446b written as positioning programs for machining operations to be performed when the belt conveyor 444 is at a stop. The positioning controllers 446a, 446b have different positioning programs according to the conveyor line, and the objects to be controlled 448a, 448b may either be identical or different.

When the objects to be machined 443a, 443b are at a stop, they can be machined by the above operations. When the belt conveyor 444 is in motion, however, machining must be carried out in synchronization with the motion of the belt conveyor 444. For this purpose, the travel of the belt conveyor 444 is detected from the encoder 445 and fetched into the controllers 446a, 446b via the encoder input interfaces 447a, 447b. Each of the positioning controllers 446a, 446b contains firmware which composes the fetched travel of the belt conveyor 444 and the travel of positioning operation by the positioning program. The results composed by the firmware are given to the objects to be controlled 448a, 448b as commands. This allows the objects to be machined 443a, 443b to be machined in synchronization with the motion of the belt conveyor 444 by only writing positioning programs for machining with the belt conveyor 444 at a stop, whereby machining time can be reduced as compared to machining performed after stopping the belt conveyor 444.

A fifth conventional embodiment will now be described in reference to the appended drawings. FIG. 126 is an arrangement diagram showing tension control by a dancer roll known in the art, wherein 190 indicates a hold-down roller for roll #1, 191 a roll #1, 192 a motor #1 for rotating the roll #1, 193 a servo amplifier #1 for controlling the motor #1, 195 a dancer roll, 194 and 196 rollers, 200 a hold-down roller for roll #2, 201 a roll #2, 202 a motor #2 for rotating the roll #2, 203 a servo amplifier #2 for controlling the motor #2, 198 a displacement detector for converting a displacement value from the center position of the dancer roll 195 into an electrical signal, 197 a spring for providing the dancer roll 195 with predetermined force, 460 a velocity command given to the servo amplifiers #1 and #2, 461 a compensation velocity command output from the displacement detector 198, and 462 an interface for inputting the compensation velocity command 461.

The operation of the fifth conventional embodiment will now be described. When the velocity command 460 is given, both the rollers #1 and #2 run at identical speeds if the compensation velocity command 461 is zero. The speed of the roller #2 is controlled by the displacement detector 198 which outputs a positive compensation velocity command 461 as shown in FIG. 127 when the displacement of the dancer roll 195 is on the upper side, and outputs a negative compensation velocity command 461 as shown in FIG. 127 when the displacement of the dancer roll 195 is on the lower side. This controls the dancer roll 195 to be kept in the center of an allowable stroke.

A sixth conventional embodiment will now be described with reference to the appended drawings. FIG. 128 is an arrangement diagram showing differential gears known in the art, wherein 480 indicates an input axis, 481 a gear a rotated Jointly with the input axis 480, 483 a gear b revolving around the gear a 481 while simultaneously rotating on its own axis by the rotation of the gear a 481 and a gear d 484, 482 a gear c disposed on the opposite side of the gear b 483 relative to the center point of the gear a 481 and similar to the gear b 483, 484 a cylindrical gear d concentric with the gear a 481 and equipped with an internal gear and an external gear, 485 an output axis connecting the center points of the gears b and c 483 and 482, 487 an auxiliary input axis for rotating a gear e 488, 488 a gear e rotated Jointly with the auxiliary input axis 487, 486 a cam rotated by the output axis 485, and 489 a load moved linearly by the rotation of the cam 486.

The operation of the sixth conventional embodiment will now be described. When the input axis 480 rotates, the gear a rotates in the same direction as the input axis 480. When the gear a rotates, the gears b and c rotate in the opposite direction. If the gear d is at rest at this time, the gears b and c revolve around the gear a in the same direction as the input axis 480, and the output axis 485 connecting the center points of the gears b and c rotates in the same direction similarly. The cam 486 connected with the output axis 485 also rotates in the same direction similarly. The load moves linearly in accordance with the shape of the cam 486. When the auxiliary input axis 487 rotates in the same direction as the input axis 480, the gear e rotates in the same direction as the auxiliary input axis 487. When the gear e rotates, the gear d rotates in the opposite direction. When the gear d rotates, the gears b and c rotate in the opposite direction and revolve around the gear a in the opposite direction to the auxiliary input axis 487, and the output axis 485 connecting the center points of the gears b and c rotates in the opposite direction similarly. Therefore, the output axis 485 is driven from both the input axis 480 and auxiliary input axis 487.

FIG. 129 shows the displacement curve of the cam 486, wherein one revolution of the output axis 485 is one cycle. Fundamentally, the cam 486 is rotated only by the input axis 480. When it is desired to adjust the phase of the cam 486 displacement curve, however, the auxiliary input axis 487 is rotated to turn the cam 486, thereby adjusting the starting position. This allows the phase of the cam 486 displacement curve to be adjusted without changing the rotational pattern of the input axis 480.

To rotate the cam 486 without turning the input axis 480 during adjustment, the auxiliary input axis 487 may only be rotated.

A seventh conventional embodiment will now be described in reference to the appended drawings. FIG. 130 indicates the settings of a positioning program consisting of a target position address, command velocity, and acceleration and deceleration times.

The operation of the seventh conventional embodiment will now be described. When positioning is started, a positioning pattern is calculated from the target position address, command velocities and acceleration and deceleration times, and is output to a servo amplifier in a pattern as shown in FIG. 131. Hence, the positioning pattern cannot be fine-adjusted.

SUMMARY OF THE INVENTION

The first positioning apparatus of the conventional art requires machine mechanisms, such as a long connecting shaft and cam, taking much time and labor in manufacturing a machine. In addition, the machine mechanisms must be changed at setup changes accompanied by product type changes, requiring time.

The second positioning apparatus of the conventional art has a limit to the number of axes interpolated and cannot operate a multiplicity of axes in synchronization due to its capability. To achieve the operations of the cam and others with motors, a dedicated positioning controller is required.

The third positioning apparatus known in the art not only requires dedicated servo amplifiers but also results in a time difference in synchronization of the servo amplifiers because there is a separately existing sequence controller which gives commands to the servo amplifiers.

The second and third positioning apparatuses of the conventional art accomplish the operations of the machine mechanisms by means of a positioning program. This makes the program complicated and also very difficult to understand when written by the other person.

It is accordingly an object of a first, second and third embodiments of the invention to overcome the disadvantages in the conventional art by providing a positioning apparatus which allows machine mechanisms to be replaced intact by programs (software modules).

The fourth positioning apparatus known in the art requires one positioning controller to have one encoder input interface and firmware for composing inputs from the encoder input interface into the operation of a positioning program when it is desired to synchronize with an external encoder. This is not only uneconomical but often makes the firmware dedicated to some objects to be controlled. Therefore, if the system undergoes great modifications, positioning program changes alone cannot meet such modifications, requiring an extremely long development period as well as firmware alterations.

It is accordingly an object of a fourth embodiment of the invention to overcome the disadvantages in the conventional art by providing a positioning apparatus which allows synchronous mechanisms with an external machine to be replaced intact by programs (software modules).

The second positioning apparatus of the conventional art has a limit to the number of axes interpolated and cannot operate a multiplicity of axes in synchronization due to its capability.

The third positioning apparatus known in the art results in a time difference in synchronization of servo amplifiers because there is a separately existing sequence controller which gives commands to the servo amplifiers.

It is accordingly an object of a fifth embodiment of the invention to overcome the disadvantages in the conventional art by providing a positioning apparatus equipped with a virtual drive module which allows a motor acting as a synchronization source to be replaced intact by a virtual motor.

The first positioning apparatus of the conventional art requires gears, which transmit the motion (velocity, travel, direction of rotation) of one revolution of a connecting shaft operated by a single drive source after conversion into a motion (velocity, travel, direction of rotation) appropriate for the applications of a plurality of shafts connected to the connecting shaft, to be manufactured individually, taking much time and labor.

In addition, since backlash occurs in the gears of the machine mechanisms, it is difficult to carry out accurate positioning where individual axes under synchronous control are to be positioned accurately in synchronous operation or where there are a plurality of gears.

It is accordingly an object of a sixth embodiment of the invention to overcome the disadvantages in the conventional art by providing a positioning apparatus which does not require machine mechanism gears to be made and allows accurate synchronous control to be exercised easily without backlash.

The first positioning apparatus known in the art not only takes much time and labor to manufacture a machine but also requires machine mechanisms to be altered at setup changes.

The second and third positioning apparatuses of the conventional art control the transfer shaft with a positioning program by actuating it every time. This not only takes much time to actuate the transfer shaft but also results in variations of actuating time, making it difficult to synchronize with the other shafts.

It is accordingly an object of a seventh embodiment of the invention to overcome the disadvantages in the conventional art by providing a positioning apparatus which does not require machine mechanisms to be manufactured and allows intermittent operation to be set and changed easily and synchronous control to be performed without variations in actuating time.

The first positioning apparatus of the conventional art is arranged as shown in FIG. 121, requiring much time to manufacture clutches mechanically constructed as power transmission mechanisms which must be made on a machine-by-machine basis. In addition, the clutches may be damaged or vibrated due to mechanical life, generated heat and/or noise accompanying the clutch mechanisms or impact occurring at the time of clutch engagement or disengagement.

It is accordingly an object of an eighth, ninth and tenth embodiments of the invention to overcome the disadvantages in the conventional art by providing a positioning apparatus which allows clutches acting as power transmission mechanisms to be replaced intact by programs (software modules).

The differential gears in the sixth conventional embodiment take much time and labor to design and manufacture and require changes every time product types change, taking time. In addition, the positioning pattern cannot be fine-adjusted.

It is accordingly an object of an eleventh embodiment of the invention to overcome the disadvantages in the conventional art by providing a positioning apparatus equipped with programs (software modules) which allow the designing and manufacturing of the gears to be omitted and the gears to be changed easily.

Tension control by means of the dancer roll in the fifth conventional embodiment requires the interface to enter a compensation velocity command to the servo amplifiers.

It is accordingly an object of a twelfth embodiment of the invention to overcome the disadvantages in the conventional art by providing a positioning apparatus which allows the differential gear function, which ensures ease of tension control by means of the dancer roll without needing the interface for inputting a compensation velocity command to the servo amplifiers, to be replaced intact by programs (software modules).

It is accordingly an object of a thirteenth embodiment of the invention to overcome the disadvantages in the conventional art by providing a positioning apparatus which allows fine adjustment of a positioning pattern.

A mechanically arranged speed changer in the conventional art must be manufactured on a machine-by-machine basis, requiring much time to manufacture. In addition, the machine may be damaged or vibrated due to mechanical life, generated heat and/or noise accompanying the speed change mechanism or impact occurring at speed change.

It is accordingly an object of a fourteenth and fifteenth embodiments of the invention to overcome the disadvantages in the conventional art by providing a positioning apparatus which allows a mechanically arranged speed changer to be replaced intact by a program (software module).

In an apparatus of the conventional art wherein a mechanical cam is employed to continuously perform reciprocative cam operation or unidirectional position feeding cam operation, the cam must be changed into one having a different shape when the velocity characteristic or acceleration characteristic of cam operation is to be changed or a stroke value is to be altered, making it difficult to change the velocity characteristic or acceleration characteristic of the cam operation or to alter the stroke value.

Also, the known positioning apparatus cannot store data on the shape of the cam employed to continuously perform reciprocative cam operation or unidirectional position feeding cam operation, the data used to calculate consecutive position commands for reciprocative cam operation or unidirectional position feeding cam operation in order to control a servo motor.

It is accordingly an object of a sixteenth and seventeenth embodiments of the invention to overcome the disadvantages in the conventional art by providing a positioning apparatus which allows reciprocative cam operation or unidirectional position feeding cam operation to be performed continuously and also the velocity characteristic or acceleration characteristic of the cam operation to be changed or the stroke value to be altered easily.

In an apparatus of the conventional art wherein a mechanical cam is employed to perform cam operation, the cam must be changed and adjusted in shape or a link mechanism from the cam to the object to be controlled must be adjusted for the fine adjustment of the stroke value of the cam operation, which makes it difficult to fine-adjust the stroke value while simultaneously running the apparatus.

It is accordingly an object of an eighteenth embodiment of the invention to overcome the disadvantages in the conventional art by providing a positioning apparatus which allows the stroke value of the cam operation to be changed easily while simultaneously running the apparatus.

In the positioning apparatus known in the art, the user sets positioning programs and parameters in accordance with the unitary system of an output mechanism serving as the actual object to be controlled, independently of what the output mechanism is. This makes it difficult to know what the actual output mechanism is by only viewing the program or to obtain the most appropriate positioning control information for the actual output mechanism.

In addition, where an output axis number is to be altered, all axis numbers in the positioning program must be changed, requiring much time for system modifications.

It is accordingly an object of an nineteenth, twentieth and twenty-first embodiments of the invention to overcome the disadvantages in the conventional art by providing a positioning apparatus which immediately tells what the output mechanism, i.e., the actual object to be controlled, is, provides the most appropriate positioning control information to the output mechanism, and ensures ease of system construction.

The first to third positioning apparatuses of the conventional art are very difficult to limit torque according to the load imposed on the motor in a synchronous system wherein transferred goods are altered by setup changes or a variety of transferred goods exist.

It is accordingly an object of a twenty-second embodiment of the invention to overcome the disadvantages in the conventional art by providing a positioning apparatus which allows a torque limit to be changed easily according to the motor load changing in a synchronous system.

The positioning apparatus known in the art has a dedicated positioning controller and machine mechanisms to perform the special movements of a cam, etc., making it difficult to perform simple linear motion or interpolative operation for position adjustment.

It is accordingly an object of a twenty-third embodiment of the invention to overcome the disadvantages in the conventional art by providing a positioning apparatus which ensures ease of switching between a mode wherein cam and other special operations are performed and a mode wherein simple linear motion or interpolative operation is implemented.

The first positioning apparatus of the conventional art has a limit to the number of axes interpolated and cannot operate a multiplicity of axes in synchronization due to its capability.

The second positioning apparatus known in the art results in a time difference in synchronization of positioning controllers because there is a separately existing sequence controller which gives commands to the positioning controllers.

It is accordingly an object of a twenty-fourth invention to overcome the disadvantages in the conventional art by providing a positioning apparatus which allows the operation of all axes to be started synchronously without user's burden.

The third positioning apparatus known in the art may be unsynchronized with the other axes and damage the machine if a fault occurs in any of the servo controllers or servo motors. Hence, a sequence program must be written which causes the sequence controller to detect that fault and output a stop command to stop all the servo controllers.

It is accordingly an object of twenty-fifth to twenty-ninth embodiments of the invention to overcome the disadvantages in the conventional art by providing a positioning apparatus which allows the machine to be protected from damage without user's burden.

The second and third positioning apparatuses of the conventional art accomplish the operations of the machine mechanisms by means of a positioning program. This makes the program complicated and also very difficult to understand when written by the other person.

It is accordingly an object of a thirtieth embodiment of the invention to overcome the disadvantages in the conventional art by providing a simple and easy-to-understand program displaying method which allows a program to be written and the result displayed by combining program modules with the use of graphics to simulate machine mechanisms, and further allows the program to be adapted by adding parameters relevant to a desired machine mechanism operation. In accordance with this embodiment of the invention, the available program modules are presented graphically, in menu form, are selectable by an operator interactively and are adaptable to a desired operation by the selection and/or input of parameter information. In accordance with a further feature of this embodiment, the selected modules are selectively combinable by an operator by interactively using the display and assembling the modules into a desired arrangement. Further, once the completed system is defined, the combined modules and their related information are used to automatically create a control program that emulates the operation of a machine having the arrangement defined by the operator.

BRIEF DESCRIPTION OF THE DRAWINGS

FIG. 10 shows the data format of a module number, connection information and auxiliary input axis connection information of the virtual mechanical module in the positioning apparatus according to the first preferred embodiment of the invention.

FIG. 17 is a detail program memory map for a virtual drive module in a positioning apparatus according to a fourth preferred embodiment of the invention.

FIG. 18 is a detail work memory map for the virtual drive module in the positioning apparatus according to the fourth preferred embodiment of the invention.

FIG. 20 is a detail program memory map for a virtual drive module in a positioning apparatus according to a fifth preferred embodiment of the invention.

FIG. 23 is a detail program memory map for a virtual gear module in a positioning apparatus according to a sixth preferred embodiment of the invention.

FIG. 24 is a detail work memory map for the virtual gear module in the positioning apparatus according to the sixth preferred embodiment of the invention.

FIG. 26 is a detail program memory map for a virtual gear module in a positioning apparatus according to a seventh preferred embodiment of the invention.

FIG. 27 is a detail work memory map for the virtual gear module in the positioning apparatus according to the seventh preferred embodiment of the invention.

FIG. 30 shows the operation example of the virtual gear module in the positioning apparatus according to the seventh preferred embodiment of the invention.

FIG. 31 is a detail program memory map for a virtual clutch module in a positioning apparatus according to an eighth preferred embodiment of the invention.

FIG. 32 is a detail work memory map for the virtual clutch module in the positioning apparatus according to the eighth preferred embodiment of the invention.

FIG. 33 is a detail variable memory map for the virtual clutch module in the positioning apparatus according to the eighth preferred embodiment of the invention.

FIG. 35 is a detail program memory map for a virtual clutch module in a positioning apparatus according to a ninth preferred embodiment of the invention.

FIG. 36 is a detail work memory map for the virtual clutch module in the positioning apparatus according to the ninth preferred embodiment of the invention.

FIG. 38 is a detail program memory map for a virtual clutch module in a positioning apparatus according to a tenth preferred embodiment of the invention.

FIG. 40 is a detail variable memory map for the virtual clutch module in the positioning apparatus according to the tenth preferred embodiment of the invention.

FIG. 47 shows a parameter area according to the twelfth preferred embodiment of the invention.

FIG. 48 shows a work area according to the twelfth preferred embodiment of the invention.

FIG. 54 shows a parameter area according to the eleventh preferred embodiment of the invention.

FIG. 55 shows a work area according to the eleventh preferred embodiment of the invention.

FIG. 56 shows an additional parameter area according to an alternative of the eleventh preferred embodiment of the invention.

FIG. 60 shows a parameter area according to the thirteenth preferred embodiment of the invention.

FIG. 61 shows a work area according to the thirteenth preferred embodiment of the invention.

FIG. 66 is a detail program memory map for a virtual speed changer module in a positioning apparatus according to a fourteenth preferred embodiment of the invention.

FIG. 67 is a detail work memory map for the virtual speed changer module in the positioning apparatus according to the fourteenth preferred embodiment of the invention.

FIG. 68 is a detail variable memory map for the virtual speed changer module in the positioning apparatus according to the fourteenth preferred embodiment of the invention.

FIG. 70 is a detail program memory map for a virtual speed changer module in a positioning apparatus according to a fifteenth preferred embodiment of the invention.

FIG. 71 is a detail work memory map for the virtual speed changer module in the positioning apparatus according to the fifteenth preferred embodiment of the invention.

FIG. 72 is a detail variable memory map for the virtual speed changer module in the positioning apparatus according to the fifteenth preferred embodiment of the invention.

FIG. 78 is a memory map used when the virtual cam module shown in FIG. 74 is stored into a program memory according to the sixteenth preferred embodiment of the invention.

FIG. 82 is a memory map employed when the virtual cam module shown in FIG. 79 is stored into a program memory according to the seventeenth preferred embodiment of the invention.

FIG. 83 is a memory map of a work memory used when the virtual cam module shown in FIG. 79 finds a positioning value to be output according to the seventeenth preferred embodiment of the invention.

FIG. 87 is a memory map employed when the virtual cam module shown in FIG. 84 is stored into a program memory according to the eighteenth preferred embodiment of the invention.

FIG. 88 is a memory map of a work memory used when the virtual cam module shown in FIG. 84 finds a positioning value to be output according to the eighteenth preferred embodiment of the invention.

FIG. 89 is a detail program memory map of an output module in a positioning apparatus according to a nineteenth preferred embodiment of the invention.

FIG. 90 is a detail work memory map for the output module in the positioning apparatus according to the nineteenth preferred embodiment of the invention.

FIG. 92 is a detail program memory map of an output module in a positioning apparatus according to a twentieth preferred embodiment of the invention.

FIG. 93 is a detail work memory map for the output module in the positioning apparatus according to the twentieth preferred embodiment of the invention.

FIG. 96 is a detail program memory map of an output module in a positioning apparatus according to a twenty-first preferred embodiment of the invention.

FIG. 97 is a detail work memory map for the output module in the positioning apparatus according to the twenty-first preferred embodiment of the invention.

FIG. 99 is a detail program memory map of an output module in a positioning apparatus according to a twenty-second preferred embodiment of the invention.

FIG. 100 is a detail work memory map for the output module in the positioning apparatus according to the twenty-second preferred embodiment of the invention.

FIG. 109 is a memory map in the twenty-fifth embodiment of the invention.

FIG. 120A shows a graphic display example in the thirtieth embodiment of the invention.

FIG. 120B shows a flowchart illustrating the procedure followed by an operator in interactively creating the control program for a positioning apparatus.

FIG. 120C shows the screen that is generated and used by an operator when executing the flowchart of FIG. 120B.

FIG. 120D shows the screen that is generated and used by an operator when selecting a drive module, in a first step to generate a control program.

FIG. 120E shows the screen that is generated and used by an operator when selecting a transmission module, in a second step to generate a control program.

FIG. 120F shows the screen that is generated and used by an operator when setting parameters for a transmission module.

FIG. 121 is an arrangement diagram of a machine wherein a multiplicity of axes are required to operate in synchronization according to a first conventional embodiment.

FIG. 122 shows the operation of the machine wherein a multiplicity of axes are required to operate in synchronization according to the first conventional embodiment.

FIG. 123 is a block diagram of a machine wherein a multiplicity of axes are required to operate in synchronization according to a second conventional embodiment.

FIG. 124 is a block diagram of a machine wherein a multiplicity of axes are required to operate in synchronization according to a third conventional embodiment.

FIG. 125 shows a positioning apparatus according to a fourth conventional embodiment.

FIG. 126 is an arrangement diagram illustrating tension control by a dancer roll in a fifth conventional embodiment.

Figure 127:
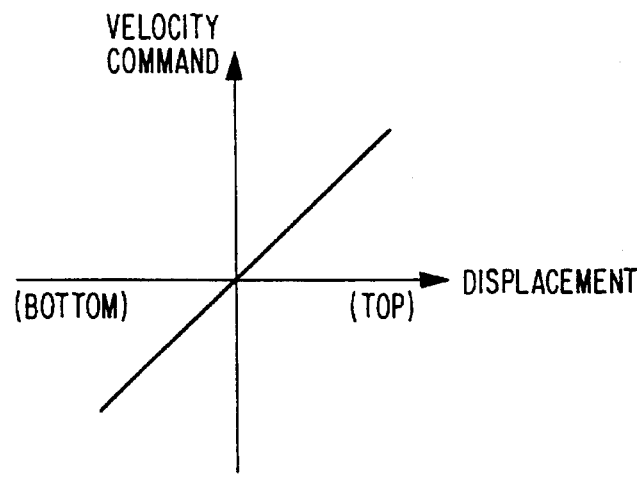

FIG. 127 shows a relationship between displacement and velocity command in the fifth conventional embodiment.

Figure 128:
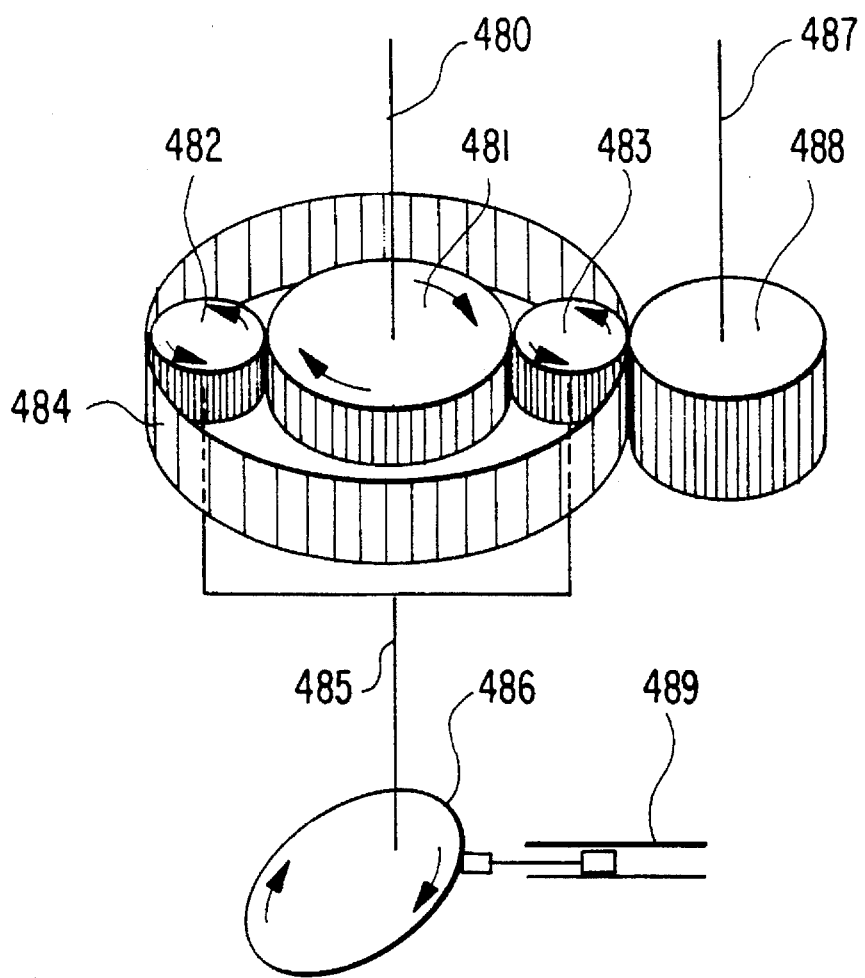

FIG. 128 is an arrangement diagram illustrating differential gears in a sixth conventional embodiment.

FIG. 129 illustrates a single cycle of an output axis 485 in the sixth conventional embodiment.

FIG. 130 is a map showing the program contents of a positioning apparatus according to a seventh conventional embodiment.

FIG. 131 shows the output of the positioning apparatus according to the seventh conventional embodiment.

DESCRIPTION OF THE PREFERRED EMBODIMENTS

Figure 1:
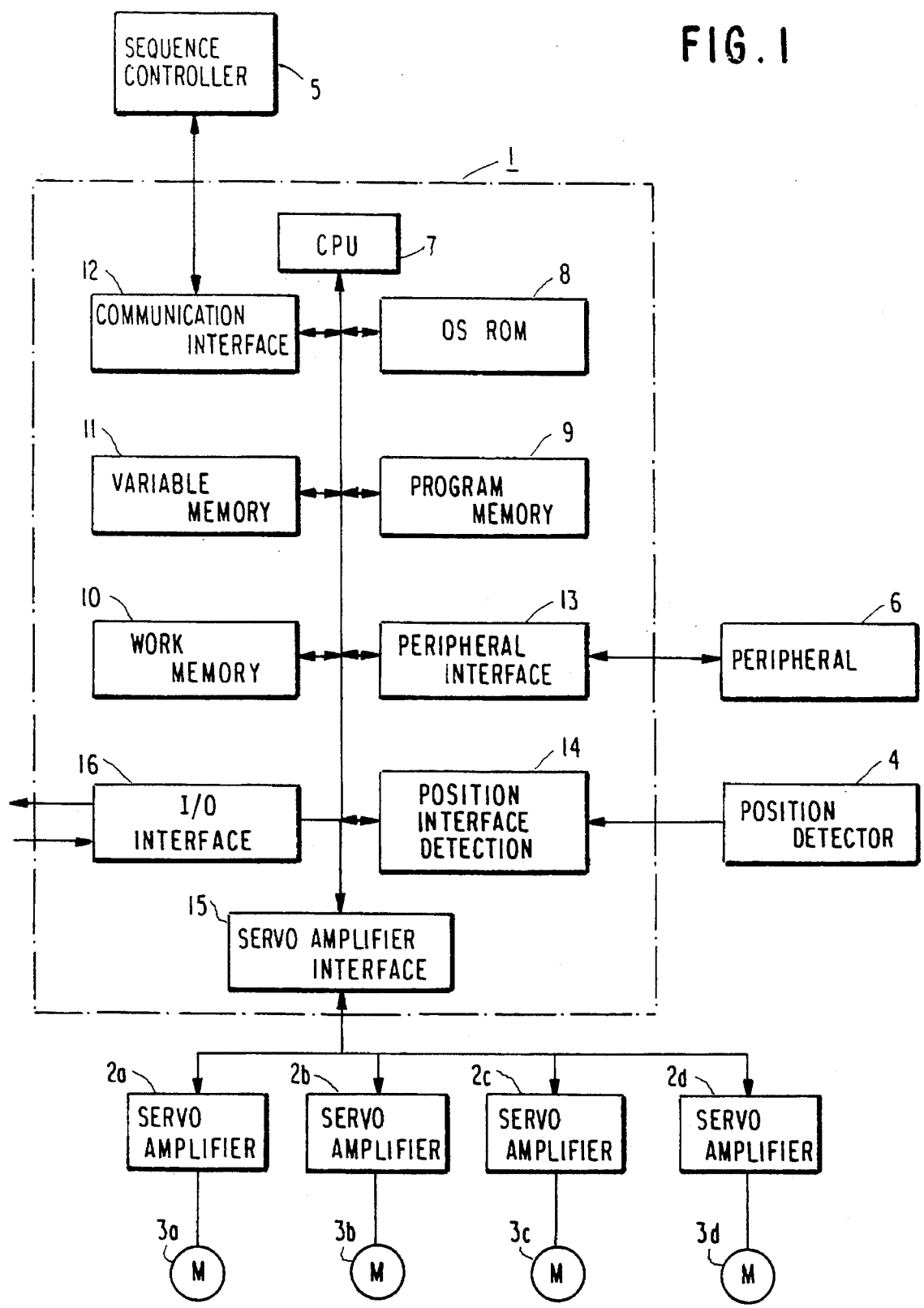
FIG. 1 is a block diagram showing the system arrangement of a positioning controller concerned with a preferred embodiment of a first embodiment of the invention.

FIG. 1 is a general arrangement diagram showing the system arrangement of a positioning controller, wherein the numeral 1 indicates a positioning controller, 2a, 2b, 2c and 2d servo amplifiers, 3a, 3b, 3c and 3d servo motors, 4 a position detector, such as an encoder, for detecting an optional machine position, 5 a sequence controller for communicating information, e.g., variables, with the positioning controller 1, 6 a peripheral for programming and monitoring of the positioning controller 1, 7 a CPU for executing positioning operation, 8 an OS ROM storing an operating system (OS) for operating the positioning controller 1, 9 a program memory for storing application programs, 10 a work memory for the CPU 7, 11 a variable memory for storing parameters, etc., required for positioning, 12 a communication interface between the sequence controller 5 and positioning controller 1, 13 a peripheral interface between the peripheral 6 and positioning controller 1, 14 a position detection interface for entering the output of the position detector 4 into the positioning controller 1, 15 a servo amplifier interface between the servo amplifiers 2a, 2b, 2c, 2d and the positioning controller 1, and 16 an input/output interface for transferring signals to and from an external device.

Figure 2:
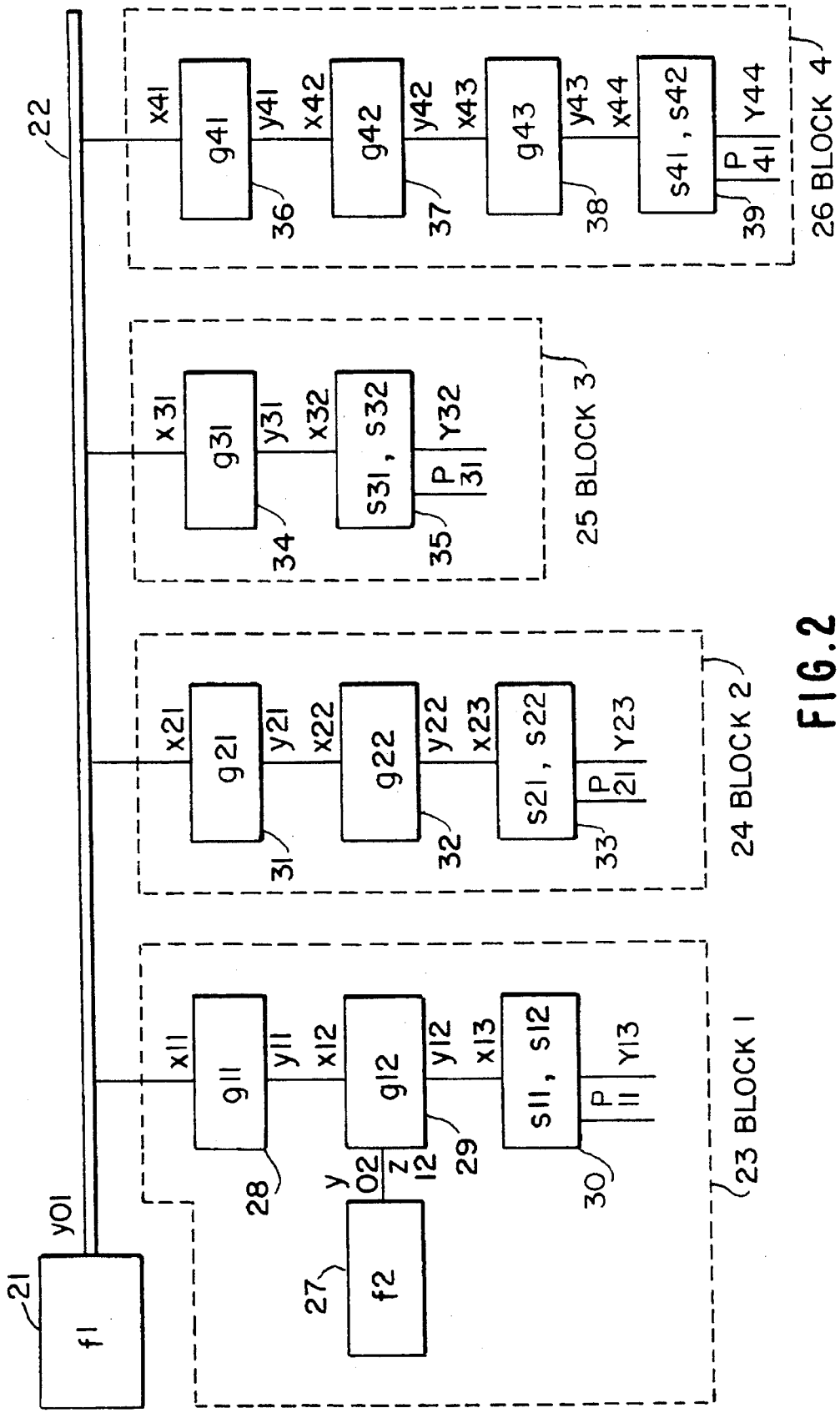
FIG. 2 shows an example of a program employing virtual mechanical modules in a positioning apparatus according to the first preferred embodiment of the invention.
Figure 121:
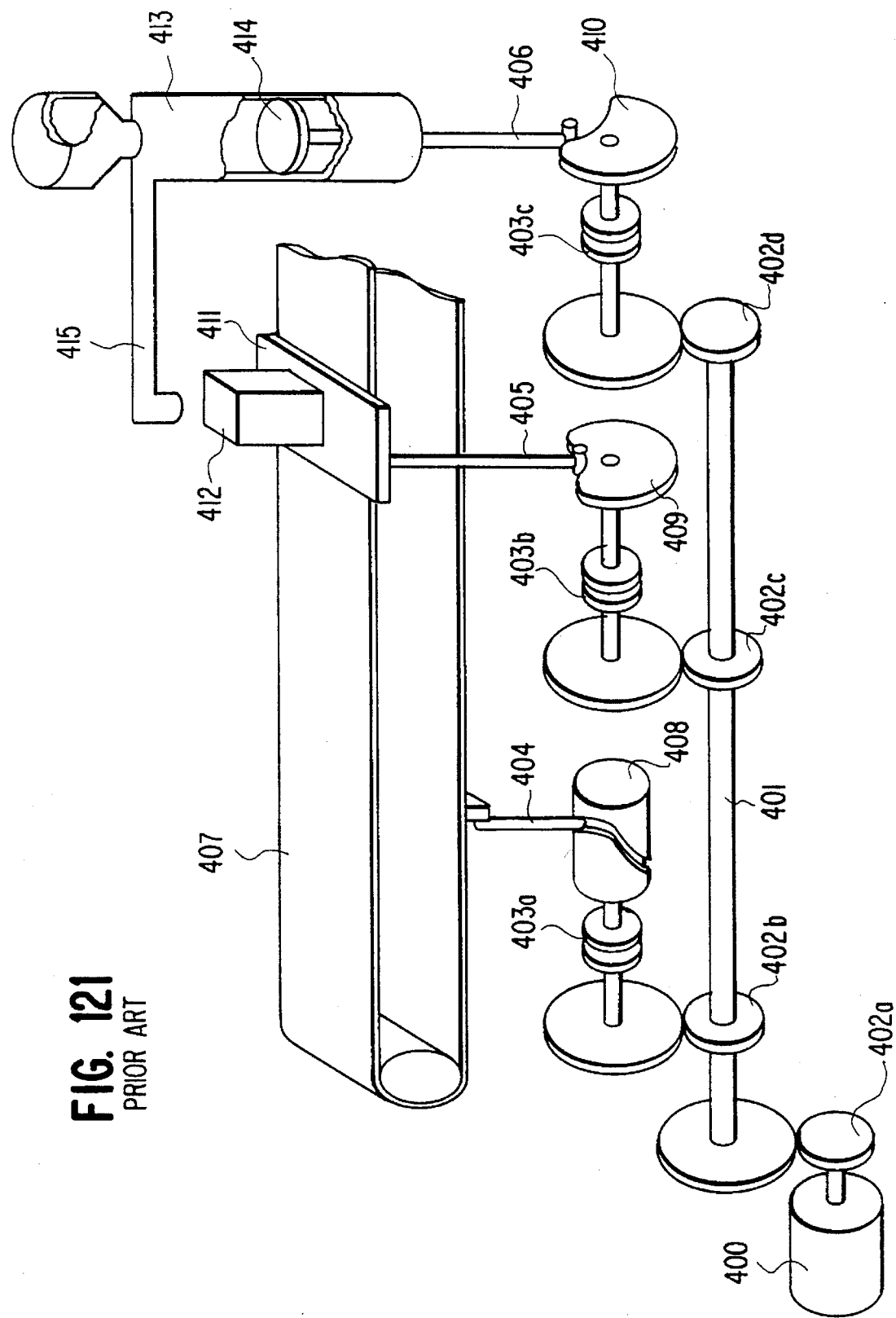
Figure 122:
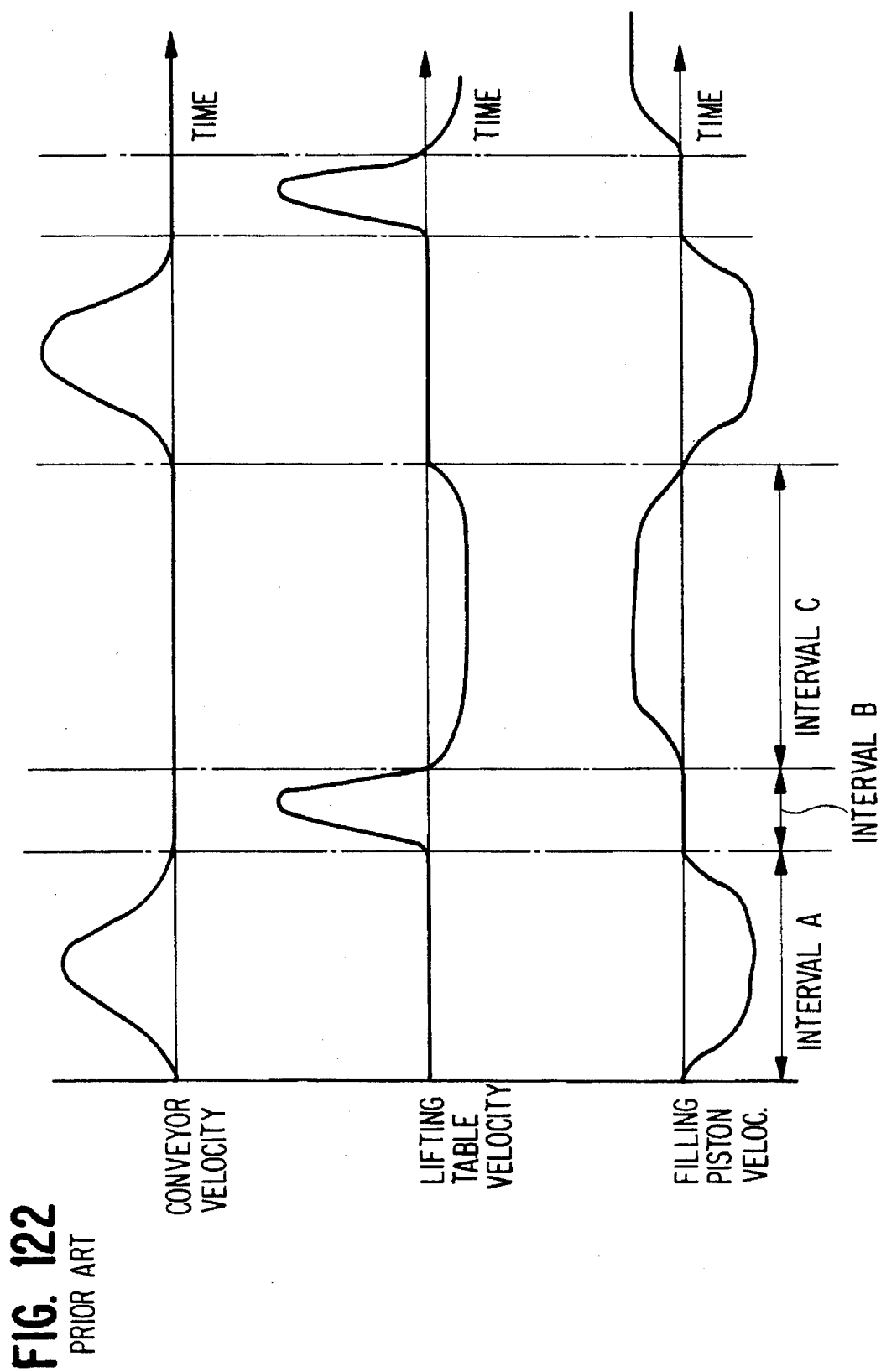
Figure 123:
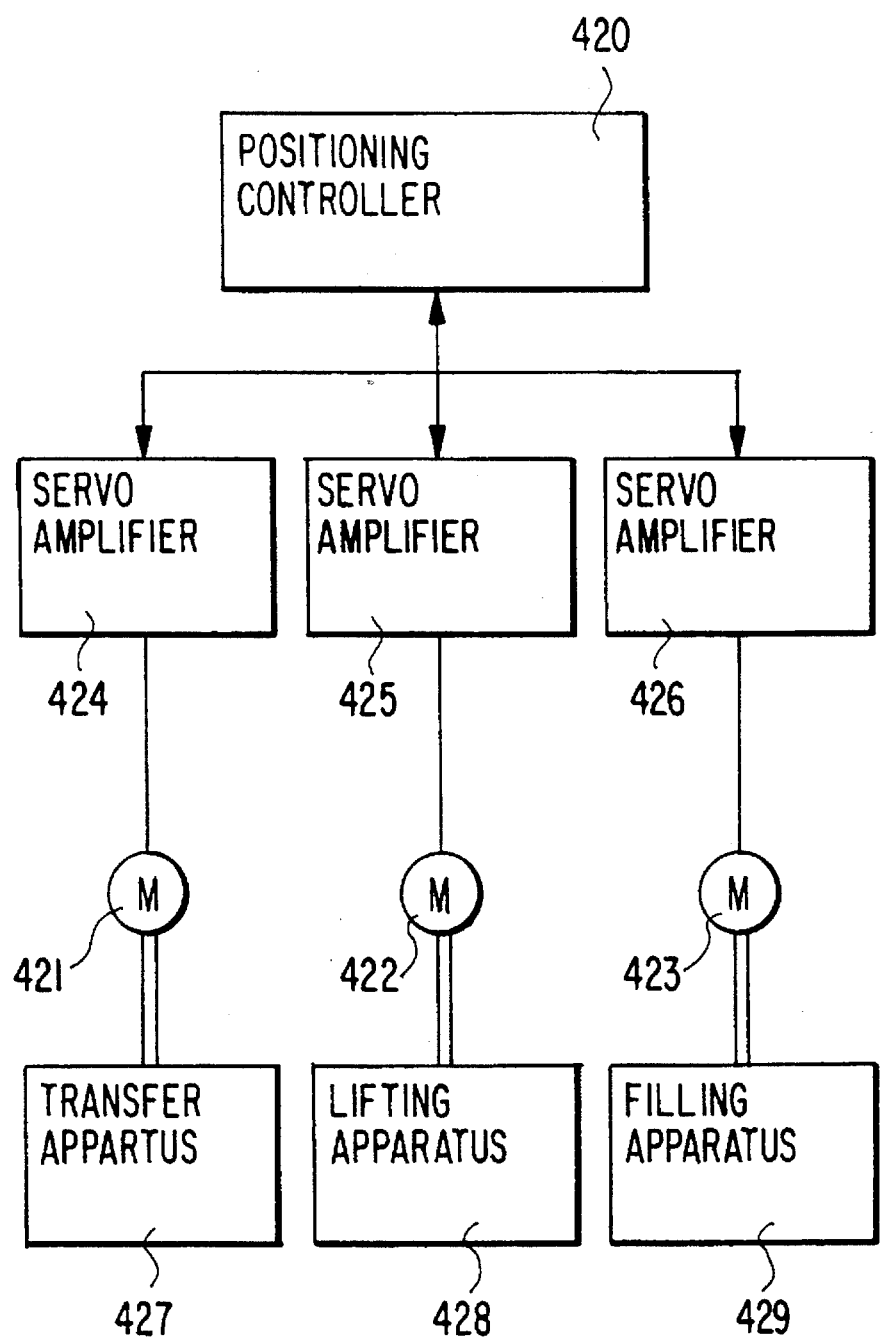

FIG. 2 illustrates an example of the combination of program modules which output position information to the servo amplifiers 2a–2d in FIG. 1 by employing software modules (programs) showing an embodiment of the present invention. 21 and 27 indicate drive software modules (hereinafter referred to as the "virtual drive modules") for generating and outputting position information referenced to drive servo motors, e.g., programs which simulate the motor 400 in FIG. 121 in a conventional embodiment and output position information (rotation in the case of motors). 22 indicates a connecting shaft software module (hereinafter referred to as the "virtual connecting shaft") for synchronizing a plurality of servo motors, e.g., a program which simulates the connecting shaft 401 in FIG. 121 and transmits the output information of the virtual drive module 27. 23 to 26 indicate blocks 1 to 4 representing the sets of software modules for one axis. 28, 31, 34 and 36 indicate transmission software modules (hereinafter referred to as the "virtual transmission modules") representing equivalents of the mechanical transmission mechanisms like gears in software, e.g., programs which simulate transmission mechanisms, such as the gear 402, clutch 403 and cams 408, 409 in FIG. 121, and transmit the information of the virtual connecting shaft. 29 indicates a virtual transmission module corresponding to a differential gear, 32 and 37 virtual transmission modules corresponding to clutches, 38 a virtual transmission module corresponding to a speed changer, and 30, 33, 35 and 39 output software modules (hereinafter referred to as the "output modules") for outputting commands to servo motors.

Figure 3:
FIG. 3 shows a virtual connecting shaft in the positioning apparatus according to the first preferred embodiment of the invention.
Figure 4:
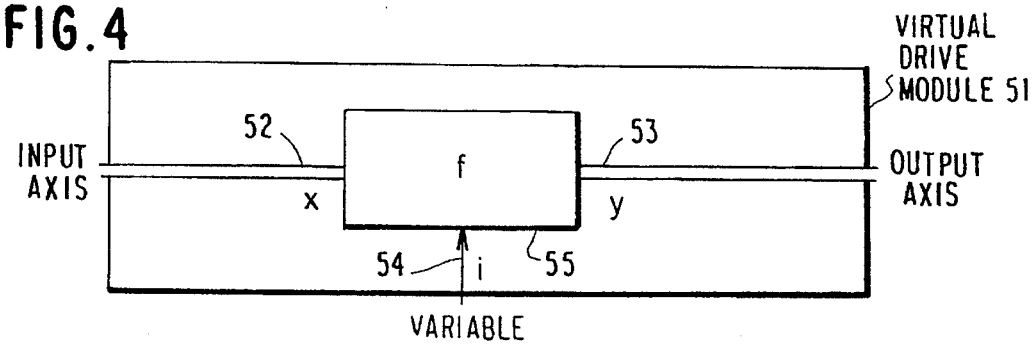
FIG. 4 shows a virtual drive module in the positioning apparatus according to the first preferred embodiment of the invention.
Figure 5:
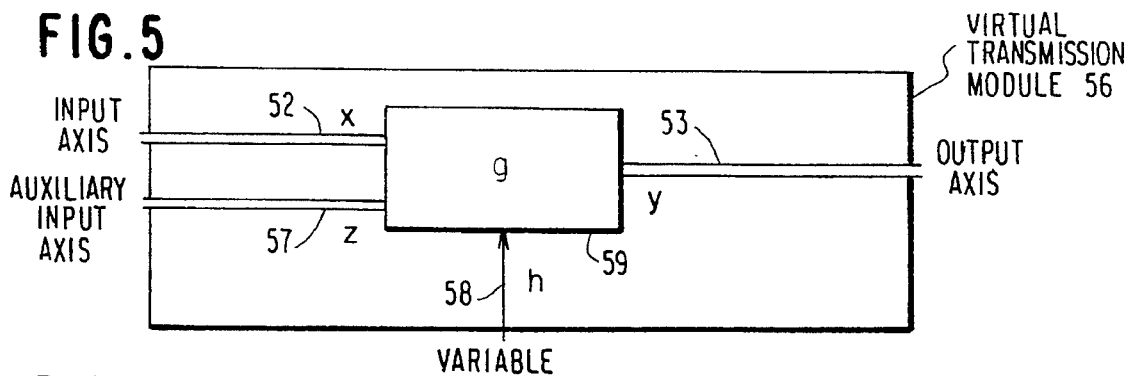
FIG. 5 shows a virtual transmission module in the positioning apparatus according to the first preferred embodiment of the invention.
Figure 6:
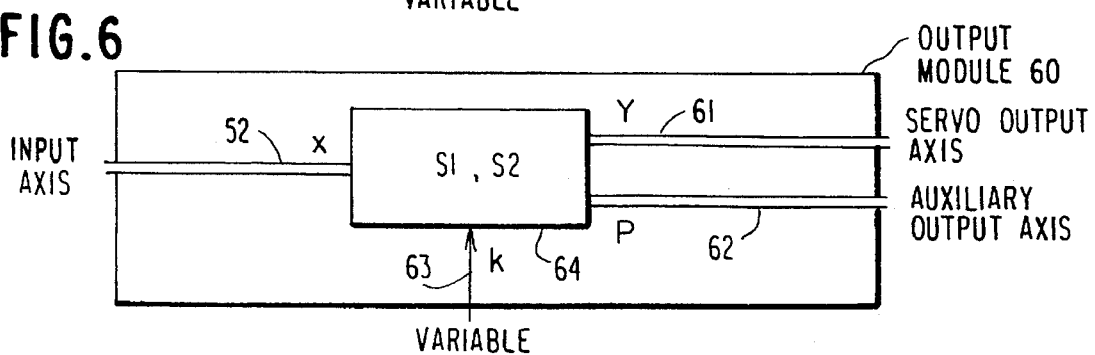
FIG. 6 shows an output module in the positioning apparatus according to the first preferred embodiment of the invention.

FIG. 3 shows a virtual connecting shaft 50. The virtual connecting shaft 22 in FIG. 2 consists of a plurality of virtual connecting shafts 50 Joined with each other. FIG. 4 shows a virtual drive module 51, FIG. 5 illustrates a virtual transmission module 56, and FIG. 6 shows an output module 60.

The virtual connecting shaft 50, virtual drive module 51, virtual transmission module 56 and output module 60 are generically referred to as the virtual mechanical modules.

The virtual connecting shaft 50 is connected to a plurality of non-existing virtual axes. The same position information is passed to all the virtual transmission modules 56 connected to the link 22 of the virtual connecting shafts 50. Without using the virtual connecting shafts 50, the parallel connection of virtual transmission modules to the virtual drive module allows identical position information to be passed to all the virtual transmission modules. Hence, the virtual connecting shafts may be omitted.

As shown in FIG. 3, the virtual connecting shaft 50 is represented by a single axis connecting each virtual mechanical module.

The virtual drive module 51 is a software module comprising a program for generating and outputting position information for driving a non-existing virtual motor, and position information generated here is passed to the virtual connecting shaft 50.

As shown in FIG. 4, the virtual drive module 51 is represented as an input axis (since the axis simulates a virtual motor, gear, cam, or the like, it is represented like the shaft of a rotator, but actually being software, it indicates any input, as understood hereafter). 52 for providing input x, an output axis (since the axis simulates a virtual motor, gear, cam, or the like, it is represented like the shaft of a rotator, but actually being software, it indicates any output. This applies hereafter). 53 for providing output y, and a black box 55 represented by a function f having a variable i 54, and contains a module number 71, connection information 72, an operation expression or positioning program 73 for generating position information, one or more variables i 74, and one or more parameters 75 as shown in a memory map shown in FIG. 7.

The virtual transmission module 56 is a software module which simulates a non-existing, virtual machine transmission mechanism, e.g., clutch, gear and cam, and incorporates operation expressions corresponding to respective machine transmission mechanisms.

As shown in FIG. 5, the virtual transmission module 56 is represented as an input axis 52 for providing input x, an auxiliary input axis 57 for providing auxiliary input z, an output axis 53 for providing output y, and a black box 59 represented by a function g having a variable h 58, and contains a module number 71, connection information 72 and auxiliary input axis connection information 76 indicating which virtual mechanical module is connected, an operation expression 77, one or more variables h 78, and one or more parameters 75. Ordinarily, the input axis 52 will have only one direction of movement, e.g., a rotation direction in a usual case. The output axis, however, may be operable in a selectable direction, e.g., either of two rotational direction in the usual case. However, as would be apparent, either or both of the input and output axis directions e.g., clockwise or counter-clockwise rotation, may be made selectable.

The output module 60 is a software module which outputs a command to an actual hardware element, e.g., a servo amplifier.

As shown in FIG. 6, the output module 60 is represented as an input axis 52 for providing input x, an output axis 61 for providing output Y, an auxiliary output axis 62 for providing auxiliary output P, and a black box 64 represented by functions s1 and s2 having variables k 58, and contains a module number 71, connection information 72, operation expressions 77, one or more variables k 79, and one or more parameters 75.

The module number 71 is a program number assigned to each virtual mechanical module. The connection information 72 indicates which virtual mechanical module the corresponding virtual mechanical module is connected to. The module number 71 of a connection source is entered into this area.

The virtual drive module, virtual transmission module and output module have different programs and memories, but those having similar functions are designated by identical characters to reduce the character types. This applies hereafter.

The virtual drive module 51, virtual transmission module 56 and output module 60 are represented by the following expressions:

| Virtual drive module: | $y = f(x,i)$ | Ex. 1 |
| Virtual transmission module: | $y = g(x,z,h)$ | Ex. 2 |
| Output module: | $Y = s1(x,k)$ | Ex. 3 |
|  | $P = s2(x,k)$ | Ex. 4 | where
y: output
Y: servo output
x: input
z: auxiliary input i, h, k: variables
P: auxiliary output FIG. 2 shows an embodiment of an application program employing the virtual mechanical modules. A set of virtual mechanical modules for controlling a single servo motor is referred to as a "block". Each of the blocks 1 to 4 controls an actual corresponding servo motor. When the block 1 is represented as in Expressions 1 to 4, Virtual transmission module 28:

$$y11 = g11(x11, h11) \qquad \text{Ex. 5}$$

Virtual transmission module 29:

$$y12 = g12(x12, z12, h12) \qquad \text{Ex. 6}$$

Output module 30:

$$Y13 = s11(x13, k11) \qquad \text{Ex. 7}$$

$$P11 = s12(x13, k11) \qquad \text{Ex. 8}$$

Since the virtual transmission module 28, virtual transmission module 29 and output module 30 are connected, the output and input of the connected modules are equal. Hence;

$$x11=y01 \quad \text{Ex. 9}$$

$$y11=x12 \quad \text{Ex. 10}$$

$$y12=x13 \quad \text{Ex. 11}$$

$$Z12=y02 \quad \text{Ex. 12}$$

When Expressions 5 to 12 are rearranged, the expression for the entire block 1 is as follows:

Servo output:

$$Y13=s11(g12(g11(y01, h11), y02, h12), k11) \quad \text{Ex. 13}$$

Auxiliary output:

$$P11=s12(g12(g11(y01, h11), y02, h12), k11) \quad \text{Ex. 14}$$

Similarly, the expressions for the entire blocks 2 to 4 are as follows:

Block 2
Servo output:

$$Y23=s21(g22(g21(y01, h21), h22), k21) \quad \text{Ex. 15}$$

Auxiliary output:

$$P21=s22(g22(g21(y01, h21), h22), k21) \quad \text{Ex. 16}$$

Block 3
Servo output:

$$Y32=s31(g31(y01, h31), k31) \quad \text{Ex. 17}$$

Auxiliary output:

$$P31=s32(g31(y01, h31), k31) \quad \text{Ex. 18}$$

Block 4
Servo output:

$$Y44=s41(g43(g42(g41(y01, h41), h42), h43), k41) \quad \text{Ex. 19}$$

Auxiliary output:

$$P41=s42(g43(g42(g41(y01, h41), h42), h43), k41) \quad \text{Ex. 20}$$

Figure 7:
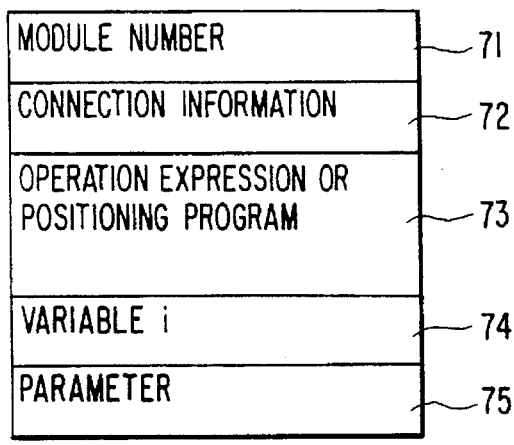
FIG. 7 is a detail program memory map for the virtual drive module in the positioning apparatus according to the first preferred embodiment of the invention.
Figure 8:
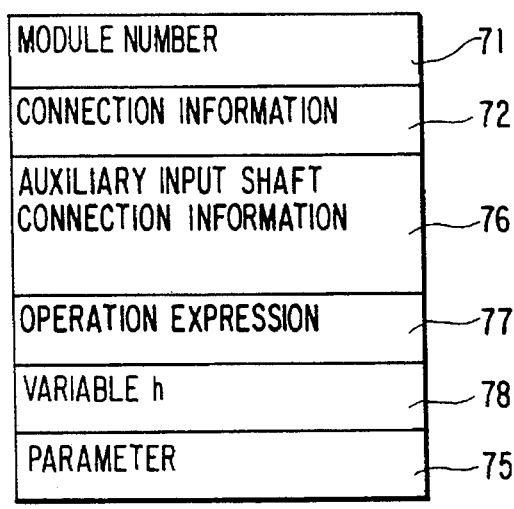
FIG. 8 is a detail program memory map for the virtual transmission module in the positioning apparatus according to the first preferred embodiment of the invention.
Figure 9:
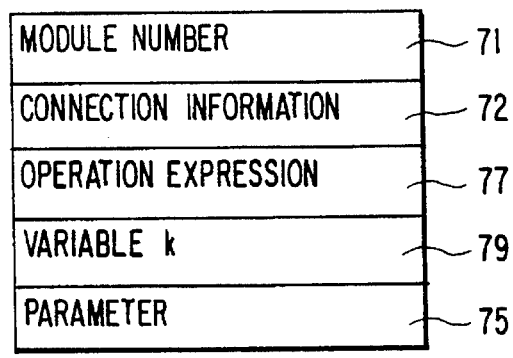
FIG. 9 is a detail program memory map for the output module in the positioning apparatus according to the first preferred embodiment of the invention.

FIG. 10 shows the data format of the module number, connection information and auxiliary input axis connection information in the memory map shown in FIGS. 7 to 9. The module number, connection information and auxiliary input axis connection information each comprises module segmentation 80 and a module segmentation number 81. In the area of the module segmentation 80, an identification character indicating the virtual drive module, virtual transmission module, output module or no segmentation is entered. In the area of the module segmentation number 81, an integral number assigned to each of the virtual drive module, virtual transmission module and output module is entered. When there is no virtual mechanical module connected, no segmentation is entered.

Figure 11:
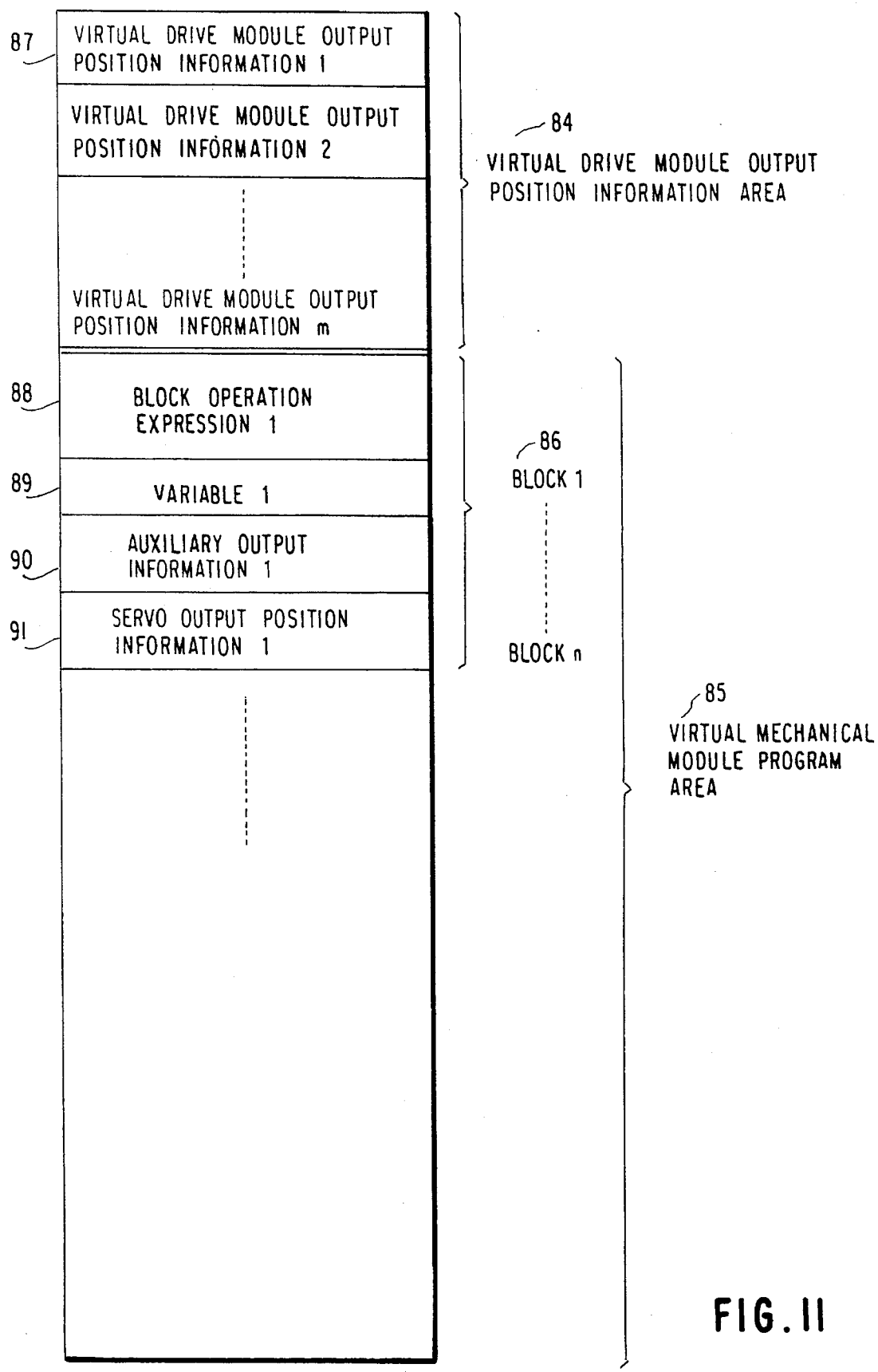
FIG. 11 is a detail work memory map for a program composed into an execution format in the positioning apparatus according to the first preferred embodiment of the invention.
Figure 12:
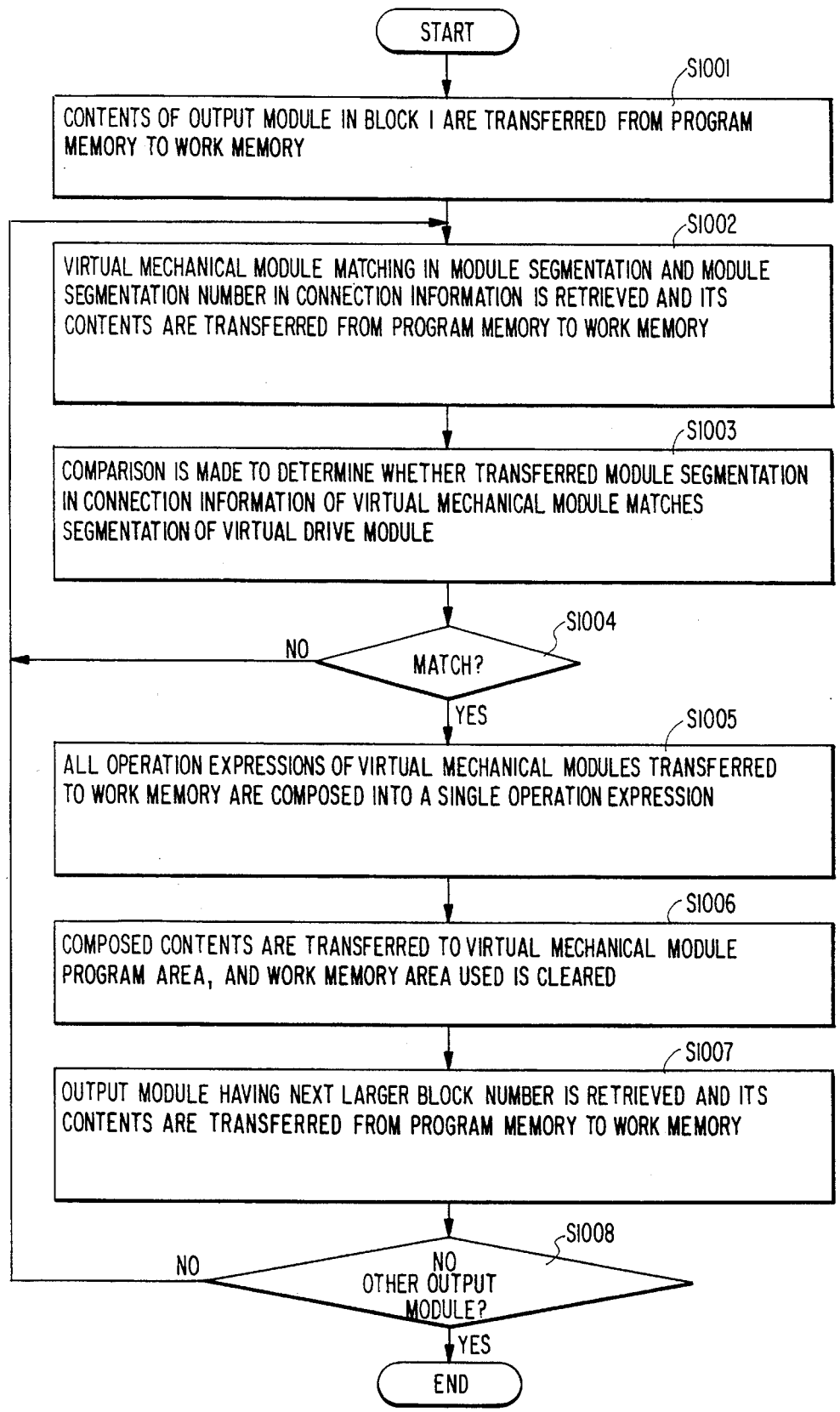
FIG. 12 is a flowchart illustrating a method of composing the virtual mechanical modules into the execution format of the program in the positioning apparatus according to the first preferred embodiment of the invention.

FIG. 11 shows a memory map for actual control. FIG. 12 is a flowchart indicating a procedure of exercising control.

Figure 124:
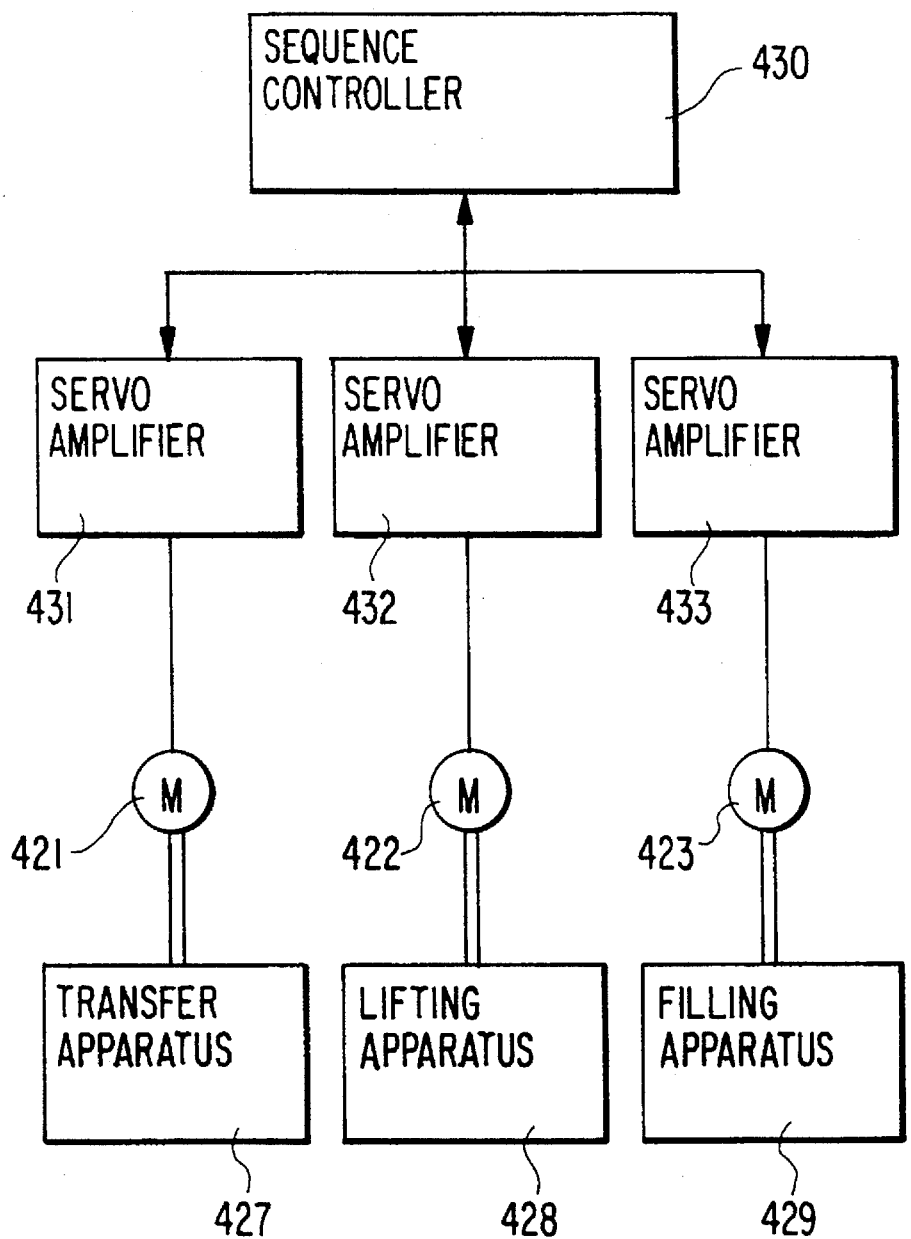
Figure 125:
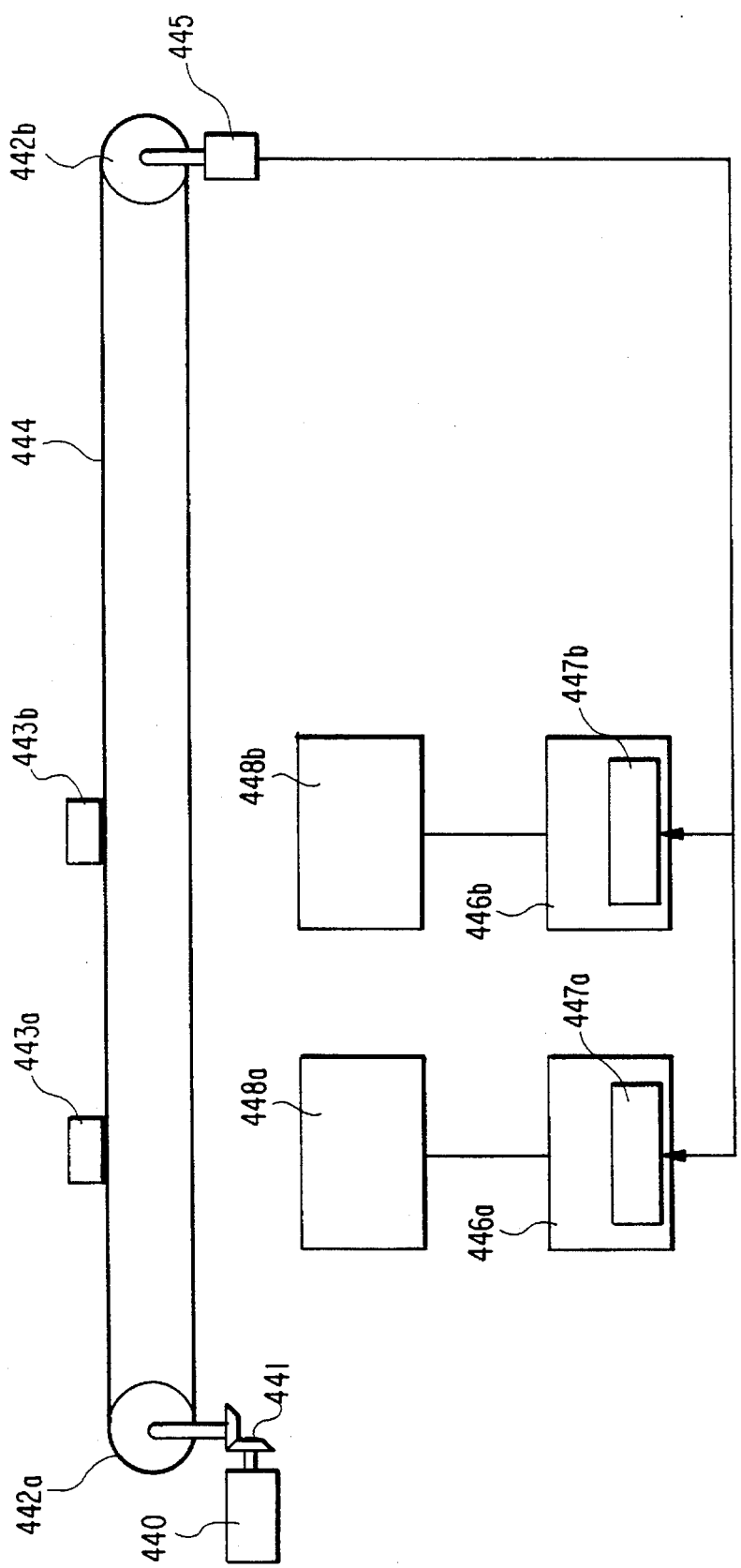

The operation of the system shown in FIG. 1 will now be described. The positioning controller 1 gives position command values to the servo amplifiers 2a–2d. Following receipt of the position command values, the servo amplifiers 2a–2d control the servo motors 3a–3d. It is assumed that the four servo motors 3a–3d must operate in synchronization with each other like the transferring servo motor 421, lifting servo motor 422 and filling servo motor 423 in the liquid filling machine shown in FIG. 124 as the third conventional embodiment.

Supposing that the output module 30 in FIG. 2 is a software module giving commands to the servo amplifier 2a, the output module 33 is the one giving commands to the servo amplifier 2b, the output module 35 is the one giving commands to the servo amplifier 2c, and the output module 39 is the one giving commands to the servo amplifier 2d, the servo motors 3a–3d operate in synchronization with each other in accordance with the position information of the mechanically non-existing, virtual connecting shaft which has been generated by the virtual drive module 21.

This operation will now be described in further detail.

In initial processing at power-on, the virtual mechanical modules created by the peripheral 6 and stored in the formats shown in FIGS. 7 to 9 are connected on a block basis in accordance with the module number 71 and connection information 72, and their functions including the variables and parameters are composed in the formats indicated by Expressions 13 to 20 and stored into the area of a block operation expression 88 shown in FIG. 11.

When the virtual mechanical modules have been composed, the number of calculation times is small and processing time can therefore be reduced. However, operation may be carried out intact in the formats in FIGS. 7 to 9 without making such composition.

This composition processing will now be described in accordance with the flowchart shown in FIG. 12. At step S1001, the contents of the output module 30 in the block 1 out of the virtual mechanical module group stored in the program memory 9 are transferred to the work memory 10. At step S1002, the virtual mechanical module 29 which matches in module segmentation 80 and module segmentation number 81 of the connection information 72 of the output module 30, i.e., connection source, is retrieved and its contents are transferred to the work memory 10.

At steps S1003 and S1004, the transfer of the virtual mechanical module 29 to the work memory 10 is repeated until the module segmentation 80 in the connection information 72 of the virtual mechanical module matches that of the virtual drive module 21. When the virtual transmission module 29 having the auxiliary input axis exists midway, all the virtual mechanical modules connected thereto are also transferred retroactively. Since the position information starts at the virtual drive modules 21, 27, modules from the subsequent virtual mechanical module to the output module are defined as a block. Up to these steps, therefore, the contents of the virtual mechanical modules in the whole block 1 should have been collected in the work memory 10.

At step S1005, the operation expressions of the virtual mechanical modules collected are composed in the composition method of Expressions 2–4 into Expressions 13–14. At step S1006, the result of this composition is transferred to the virtual mechanical module program area of the work memory 10, and the virtual mechanical modules for one block employed above are cleared. At step S1007, such composition processing is repeated in order of block numbers until there is no block to be composed. When there is no further block, the processing is terminated.

The processing in the flowchart may be executed beforehand by the peripheral 6 and the results stored.

Figure 13:
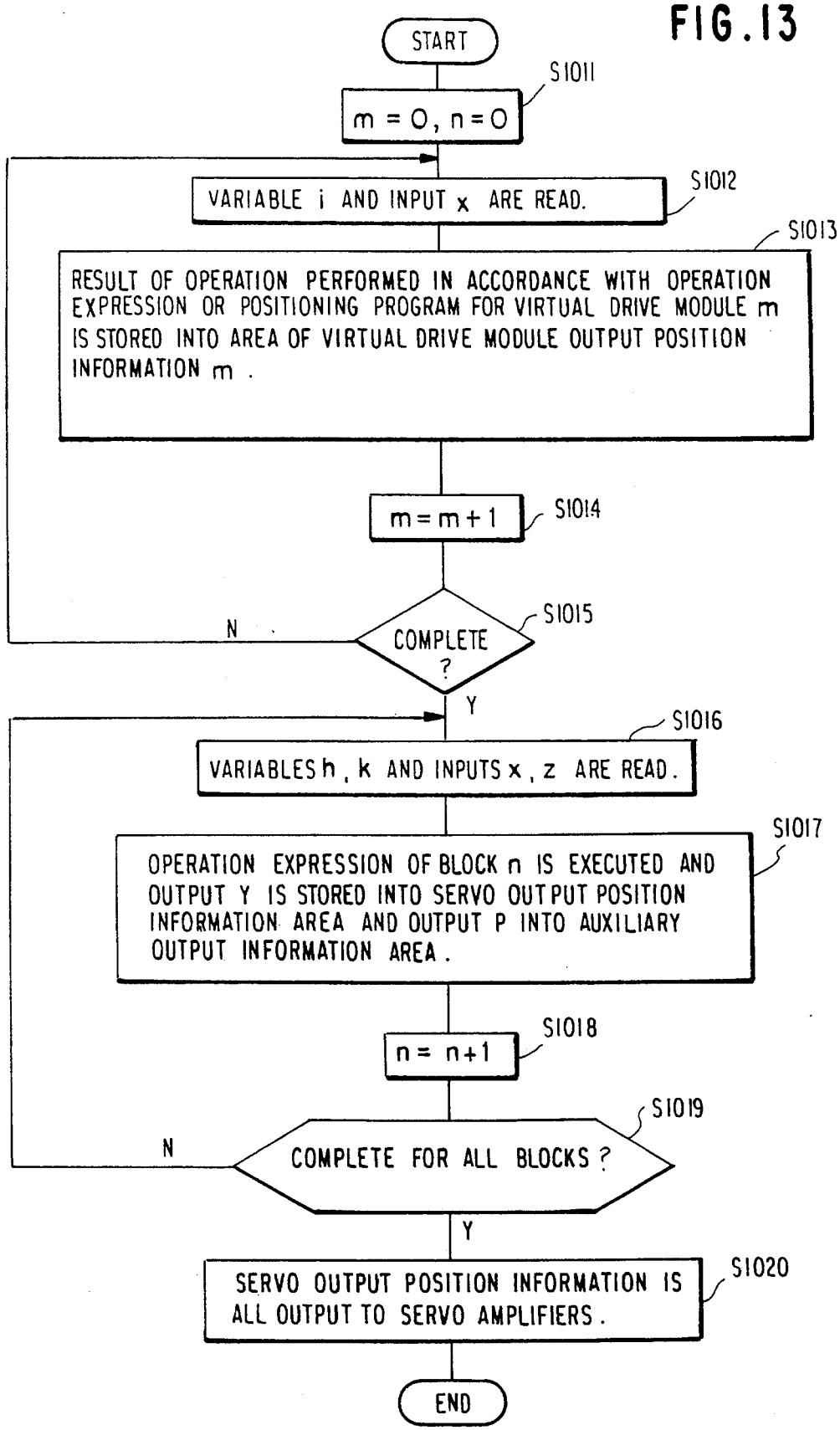
FIG. 13 is a flowchart indicating control operation in the positioning apparatus according to the first preferred embodiment of the invention.

Actual control is then initiated. FIG. 13 shows a control flowchart. This sequence of processing is repeated at predetermined intervals by real-time interrupt. At steps S1011 to S1015, the output position information of the virtual drive modules are operated on by the operation expressions of all the virtual drive modules or a positioning program described in G codes, BASIC, dedicated language, etc. (position information generating and outputting means for generating and outputting the position information in a procedure programmed in G codes, BASIC and dedicated terms), and the results are stored into a virtual drive module output position information area 84.

At steps S1016 to S1019, all the blocks are then operated on in accordance with the block operation expressions stored in a virtual mechanical module program area 85, and resultant servo outputs are stored into a servo output position information area 91 and the auxiliary outputs into an auxiliary output information area 90. At step S1020, the data of the servo output position information is output to each servo amplifier. By transmitting the auxiliary output information 90 to the peripheral 6, the position and other data of the machine driven by the servo motors can be monitored.

The number of servo amplifiers connected to the positioning controller 1 in this embodiment is not limited to four and may further be increased according to the operation capability of the CPU 7.

Figure 14:
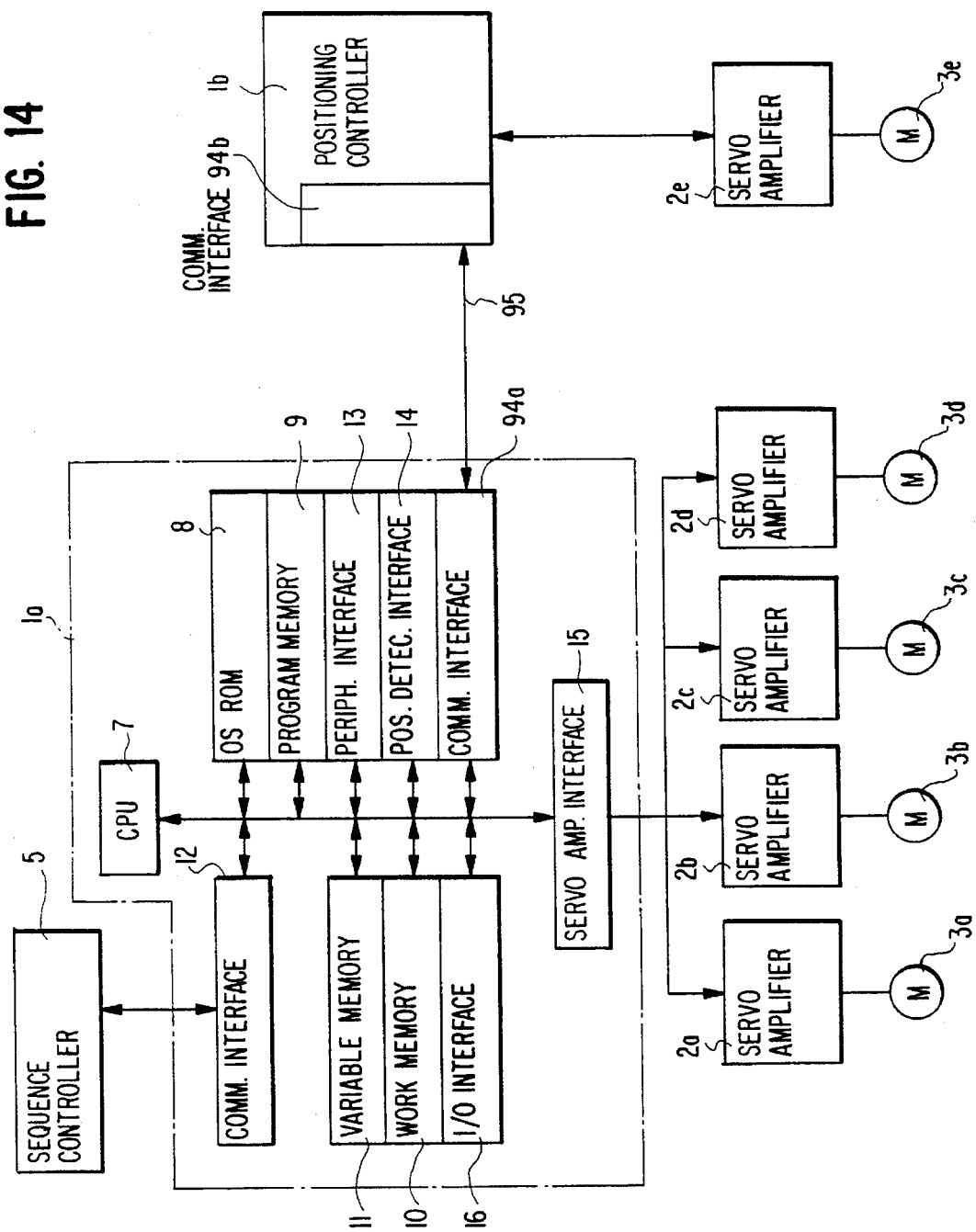
FIG. 14 is a block diagram showing the system arrangement of positioning controllers concerned with a second preferred embodiment of the invention.

An embodiment which shares synchronous information between a plurality of positioning controllers will be described. FIG. 14 is a system configuration diagram having two positioning controllers, wherein the numeral 94a and 94b indicate communication interfaces for communication between positioning controllers 1a and 1b, and 95 a data communication line. The positioning controllers 1a, 1b are equivalent to the positioning controller 1 in FIG. 1, the positioning controller 1a is connected to four servo amplifiers 2a–2d and four servo motors 3a–3d, and the positioning controller 1b is connected to one servo amplifier 2e and one servo motor 3e. The sequence controller 5 communicates information, such as parameters, with the positioning controller 1a, and a position detector 4 and peripheral 6 have been omitted. Also, 7 to 16 are identical to those in FIG. 1.

The operation of the system in FIG. 14 will now be described. It is assumed that the servo motors 3a to 3e controlled by the positioning controllers 1a, 1b should operate in synchronization with each other.

It should be assumed that the positioning controller 1a is a master positioning controller, the positioning controller 1b is a slave positioning controller, virtual drive modules exist in the master positioning controller 1a, and virtual drive module output position information is created by the master positioning controller 1a.

At this time, in order to synchronize the operations of the servo motors 3a–3e with each other which span the two positioning controllers 1a, 1b, data transmission is made via the communication interfaces 94a, 94b and data communication line 95, and identical data is stored into the virtual drive module output position information 87 of the positioning controller 1a and the virtual drive module output position information of the positioning controller 1b.

As described above, data transmission is performed and the virtual drive module output position information is shared between the two positioning controllers 1a and 1b, thereby achieving the synchronous drive control of the servo motors 3a–3e spanning the two positioning controllers 1a, 1b.

The number of positioning controllers connected through communication in this embodiment is not limited to two and may be increased as required, and identical virtual drive module output information may be shared between the positioning controllers connected.

It will also be recognized that the number of servo motors controlled by the positioning controller 1b in this embodiment is not limited to one and may be increased as required.

Figure 15:
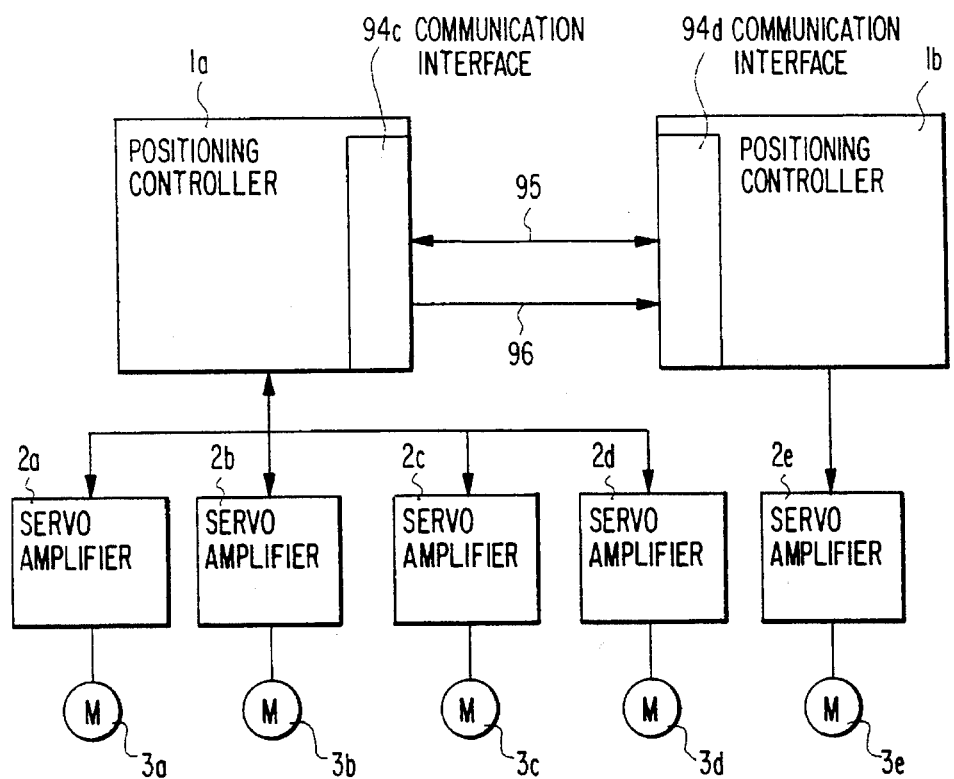
FIG. 15 is a block diagram showing the system arrangement of positioning controllers concerned with a third preferred embodiment of the invention.

Another embodiment which shares synchronous information between a plurality of positioning controllers will be described. FIG. 15 is a system configuration diagram wherein positioning controllers 1a and 1b are connected by a data communication line 95 and a synchronous clock line 96. The numerals 94c and 94d indicate communication interfaces. Other components are identical to those in FIG. 14, and a sequence controller 5 has been omitted.

Figure 16:
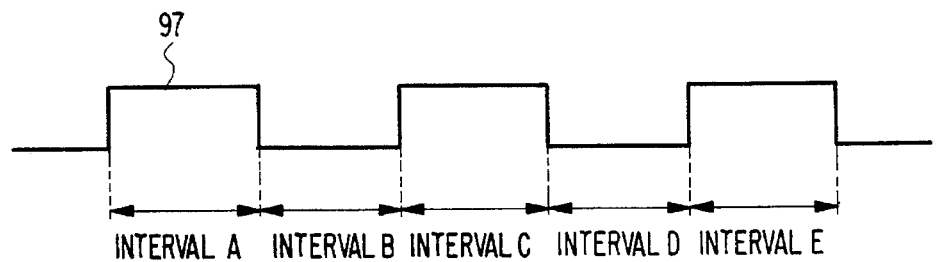
FIG. 16 illustrates a synchronous clock waveform concerned with the third preferred embodiment of the invention.

FIG. 16 shows a synchronous clock on the synchronous clock line 96, wherein 97 indicates a synchronous clock waveform.

The operation of the system in FIG. 15 will now be described with reference to FIG. 16. The meaning of sharing virtual drive module output position information between the two positioning controllers 1a and 1b and the data map of each positioning controller are as described in embodiment 2.

It should be assumed that the positioning controller 1a is a master positioning controller, the positioning controller 1b is a slave positioning controller, virtual drive modules exist in the master positioning controller 1a, and virtual drive module output position information is created by the master positioning controller 1a.

The synchronous clock 97 is common to all the positioning controllers connected by the synchronous clock line 96 and is generated by the master positioning controller 1a and given to the slave positioning controller 1b.

Each of the positioning controllers 1a, 1b communicates servo output position information with the servo amplifiers 2a–2e in interval A in FIG. 16, and further the master positioning controller 1a communicates the virtual drive module output position information with the slave positioning controller 1b via the data communication line 95.

In interval B in FIG. 16, each of the positioning controllers 1a, 1b executes a positioning program in accordance with the virtual drive module output position information to be obtained in the interval A, and calculates the servo output position information transmitted to the servo amplifiers 2a–2e. The results found here are output to the servo amplifiers 2a–2e in interval C.

Whereas the positioning program is executed in the interval B in FIG. 16 and the results are transmitted to the servo amplifiers 2a–2e in the interval C in this embodiment, synchronization may be made optionally, e.g., the positioning program may be executed in the intervals B and C and the result transmitted to each servo amplifier in interval E.

The number of positioning controllers connected by the synchronous clock line 96 in this embodiment is not limited to two and may be increased as required.

Figure 19:
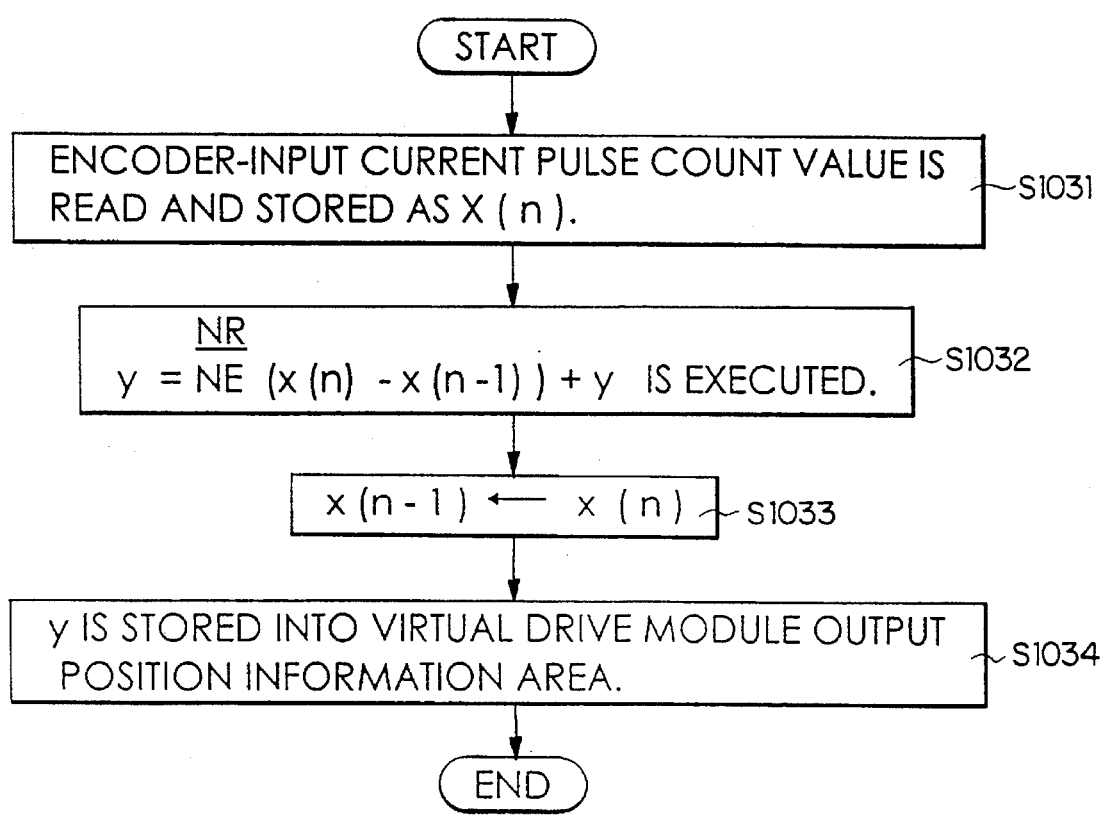
FIG. 19 is a flowchart showing the operation of the virtual drive module in the positioning apparatus according to the fourth preferred embodiment of the invention.

An embodiment of the virtual drive module will be described. FIG. 17 shows a memory map of the program memory where the virtual drive module is stored, consisting of a module number 71, connection information 72, an operation expression 100, and parameters, i.e., the number of pulses per virtual connecting shaft revolution 102 and the number of pulses per encoder revolution 103. In this case, a variable i 101 does not exist. FIG. 18 shows a work area required to perform operation, illustrating how an area for a preceding value of an input pulse count 104 from the encoder 4 and an area for a current value of an input pulse count 105 from the encoder 4 are secured in the work memory 10. FIG. 19 is a flowchart for the independent operation of the virtual drive module.

Operation will now be described. Though the virtual drive module is used with other virtual mechanical modules, its independent operation will only be described here. The encoder 4 mounted to the machine ordinarily outputs a two-phase rectangular wave 90 degrees out of phase in correspondence with the rotation of the encoder 4. Since the number of pulses per encoder revolution has been predetermined, the counting of this number of pulses tells the position of the machine. The position detection input interface 14 comprises a two-phase input counter, counts a two-phase rectangular wave from the encoder 4, and holds it as a digital value.

The operation will be described in accordance with the flowchart in FIG. 19. At step S1031, an input pulse count value from the encoder 4 is read and stored into an encoder-input pulse count current value 105. At step S1032, a value found by dividing one parameter, i.e., the number of pulses per virtual connecting shaft revolution, by the other parameter, i.e., the number of pulses per encoder revolution, is multiplied by a value obtained by subtracting the encoder-input pulse count preceding value 104 from the encoder-input pulse count current value 105, and the result of multiplication is added to the preceding output position information. At step S1033, the encoder-input pulse count current value 105 is transferred to the area of the encoder-input pulse count preceding value 104. At step S1034, the operation result is stored into the area 84 of the virtual drive module output position information shown in FIG. 11. When there are a plurality of virtual drive modules, the module numbers 71 are assigned to the virtual drive modules in order of program entry, and the virtual drive module output position information area corresponding to that number is selected.

While the number of pulses per revolution has been used in this embodiment for ease of understanding, the position information to be output may be operated on by taking into account the set ratio (constant) of the position information generated by the virtual drive module and the detected position information of the machine in order to synchronize such two position information.

Figure 21:
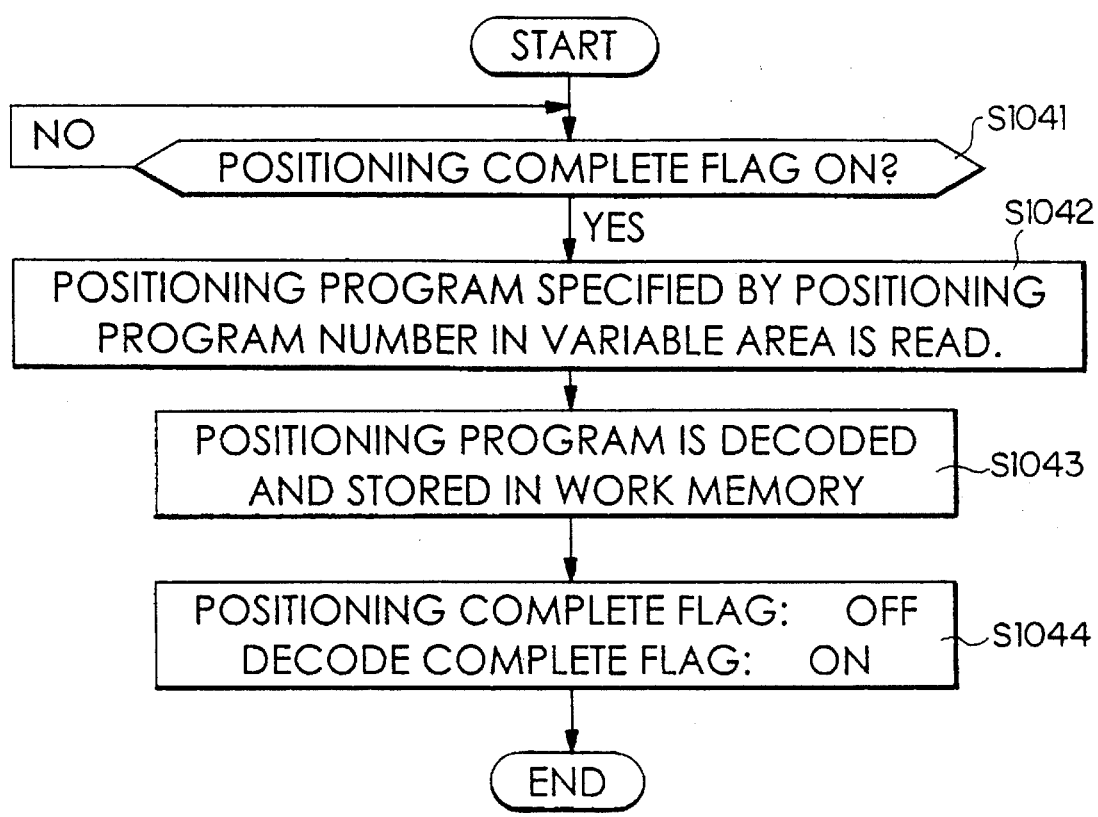
FIG. 21 is a flowchart illustrating the positioning program decoding operation of the virtual drive module in the positioning apparatus according to the fifth preferred embodiment of the invention.
Figure 22:
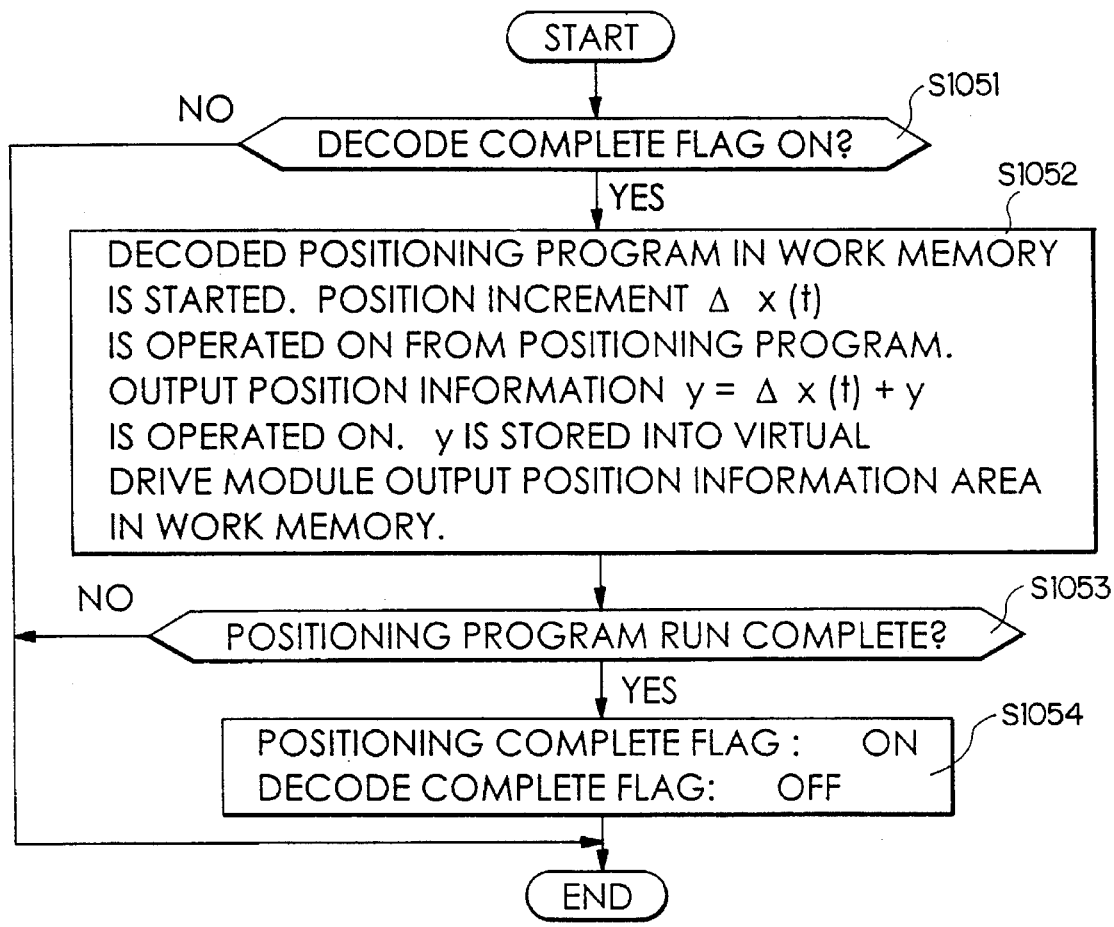
FIG. 22 is a flowchart showing the positioning program running operation of the virtual drive module in the positioning apparatus according to the fifth preferred embodiment of the invention.

Another embodiment of the virtual drive module will be described. FIG. 20 shows a memory map of the program memory where the virtual drive module is stored, consisting of a module number 71, connection information 72, conventional positioning programs 110 not using operation expressions and described in G codes, BASIC, dedicated language, etc., a positioning program starting command 111 as a variable, an executed positioning program number 112, a variable 113 employed in the positioning program, and parameters used in the positioning program as parameters. Since there is no virtual mechanical module connected before this virtual drive module, the connection information includes no segmentation. FIGS. 21 and 22 are flowcharts showing how the virtual drive module executes the positioning program. FIG. 21 shows a procedure of decoding the positioning program and FIG. 22 shows that of executing the positioning program decoded.

Operation will now be described in accordance with the flowcharts in FIGS. 21 and 22. FIG. 21 shows a procedure of decoding the positioning program and is designed to be a program which runs only once when the positioning program starting command 111 as a variable changes, for example, from 0 to 1. At step S1041, the processing waits until the positioning program shown in the flowchart of FIG. 22 completes its execution. After the completion, the positioning program specified in the executed positioning program number 112 in the variable area is read at step S1042, and is decoded and stored into the work memory 10 at step S1043. The positioning program starting command 111 and executed positioning program number 112 in the variable area are rewritten via the communication interface 12 from the sequence controller 5. At step S1044, a positioning complete flag is switched off and a decode complete flag which indicates that the decoding of the positioning program shown in the flowchart of FIG. 22 is complete is switched on. The processing is then terminated.

The procedure of executing the positioning program decoded will now be described in accordance with the flowchart of FIG. 22. This flowchart shows the details of the steps S1011 to S1015 in the flowchart of FIG. 13 and its processing is similarly repeated per predetermined time by real-time interrupt. At step S1051, it is confirmed that the decoding of the positioning program is complete. Then, at step S1052, the execution of the decoded positioning program on the work memory is started, and the result of adding a position increment during the predetermined time operated on by the positioning program to the preceding position information is stored into an address corresponding to the module number in the virtual drive module output position information area 84 on the work memory. At step S1053, this processing is repeated at predetermined intervals until positioning is complete. Upon completion, the positioning complete flag is switched on and the decode complete flag is switched off at step S1054 to prepare for the next positioning starting command.

An embodiment of the virtual transmission module will be described. FIG. 23 shows a memory map of the program memory 9 where the virtual transmission module equivalent to a gear (hereinafter referred to as the "virtual gear module") is stored. Referring to FIG. 23, the numeral 71 indicates a module number, and 72 connection information in accordance with which the position address data of the input axis is referred to. 76 indicates auxiliary input axis connection information where the information of "none" is stored for the virtual gear module. 120 stores an operation expression for finding output axis position address data. 121 indicates a variable and stores the information of "none." 122 indicates the number of teeth of the virtual gear connected to the input axis Gi, 123 the number of teeth of the virtual gear connected to the output axis Go, and Gi/Go denotes a gear ratio. 124 indicates number-of-gears information Gs on the virtual gears connected. When it is even, the direction of rotation of the input axis is opposite to that of the output axis and −1 is stored into that area. When it is odd, the directions are identical and +1 is stored. As previously noted, ordinarily the input direction is fixed and the output direction selectable, but either or both may be made selectable.

FIG. 24 shows a memory map of the work memory 10 where data required for the virtual gear module to operate on the output axis position address is saved. 125 indicates an input axis position address data preceding value x(n−1) area, 126 an input axis position address data current value x(n) area, and 127 an output axis position address data y, i.e., operation result, area.

An operation expression for finding the output axis position address is represented as follows:

$$y=(x(n)-x(n-1))*Gi/Go*Gs+y \qquad \text{Ex. 21}$$

"y" on the left-hand side in Expression 21 indicates a current value and "y" on the right-hand side indicates a preceding value. The above expression indicates that a value found by adding the term without y on the right-hand side to the preceding value y is used as the current value y. This notation also applies to subsequent expressions.

Figure 25:
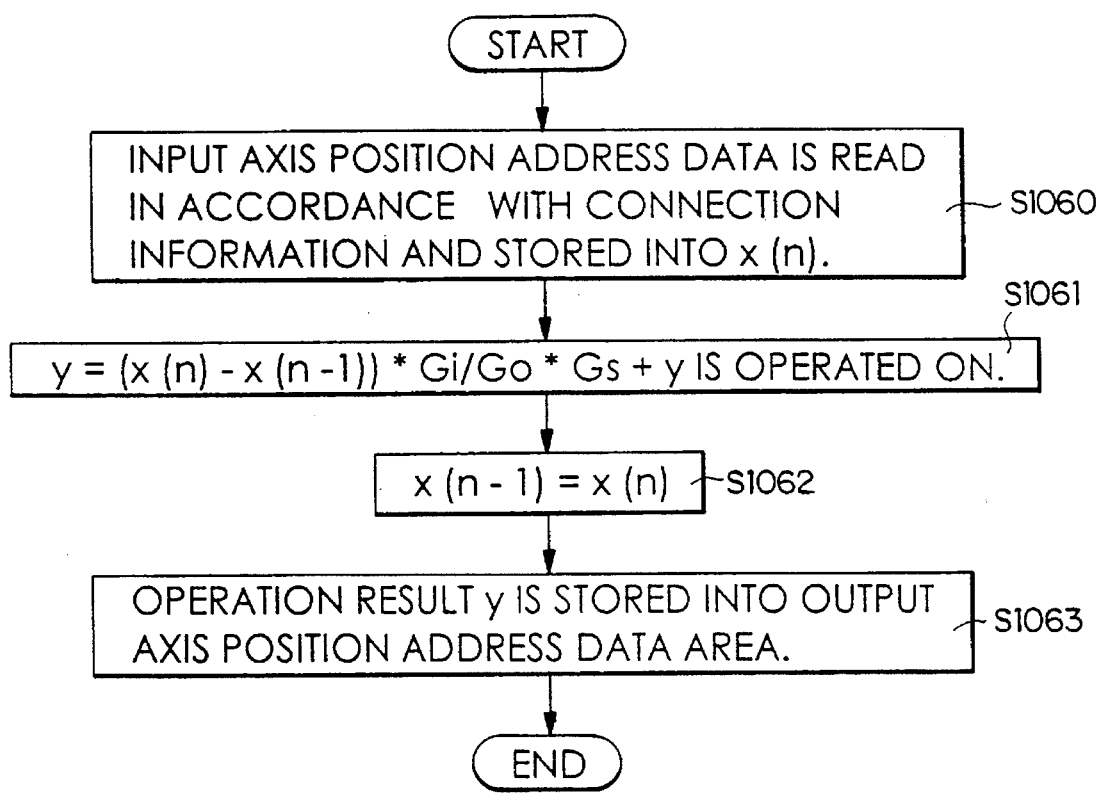
FIG. 25 is a flowchart showing the operation of the virtual gear module in the positioning apparatus according to the sixth preferred embodiment of the invention.

FIG. 25 is a flowchart showing the operation of the virtual gear module, and is a part of the real-time interrupt processing operation illustrated in FIG. 13.

Operation will now be described with reference to FIG. 25. Although the virtual gear module does not operate independently and is used with other virtual mechanical modules, its independent operation will be described here. When the virtual gear module is implemented, the input axis position address data is read in accordance with the connection information 72 and stored into the x(n) area 126 at step S1060. At step S1061, operation is then executed in accordance with Expression 21. At step S1062, the input axis position address data current value x(n) is defined as the preceding value x(n−1) and stored into the input axis position address data preceding value area 125. Finally, at step S1063, the operation result y is stored into the output axis position address data area 127, and the processing is terminated.

While the above description employed the input axis/output axis gear ratio and the number of gears and the input position information was described to be changed in number and rotation direction to facilitate the understanding of the virtual transmission module simulating the gear, the above description indicates that the input position information is output as an operating direction set by multiplying it by a set transmission constant.

Another embodiment of the virtual gear module will be described, particularly for an intermittent or sectored gear. FIG. 26 shows a memory map of the program memory 9 where the virtual gear module is stored. The numerals 71, 72, 76, 122, 123 and 124 are identical to those in FIG. 23 illustrating embodiment 6, 130 indicates an area where an expression for defining output axis position address data is stored. 131 indicates a variable and stores the address of the variable memory 11 where a time constant t is set, and 132 indicates a data table which stores the valid range of the input axis side gear teeth and stores a valid starting position address Gaj and a valid end position address Gbj as position address data within one input axis revolution. The addresses define the intermittent operation of the gear.

The memory map of the work memory 10 where data required for the virtual gear module to operate on the output axis position address is saved is identical to the one in FIG. 24 illustrating embodiment 6.

Output axis position address:

$$y=T((x(n)-x(n-1))*Gi/Go*Gs*i+y, t) \quad \text{Ex. 22}$$

Figure 28:
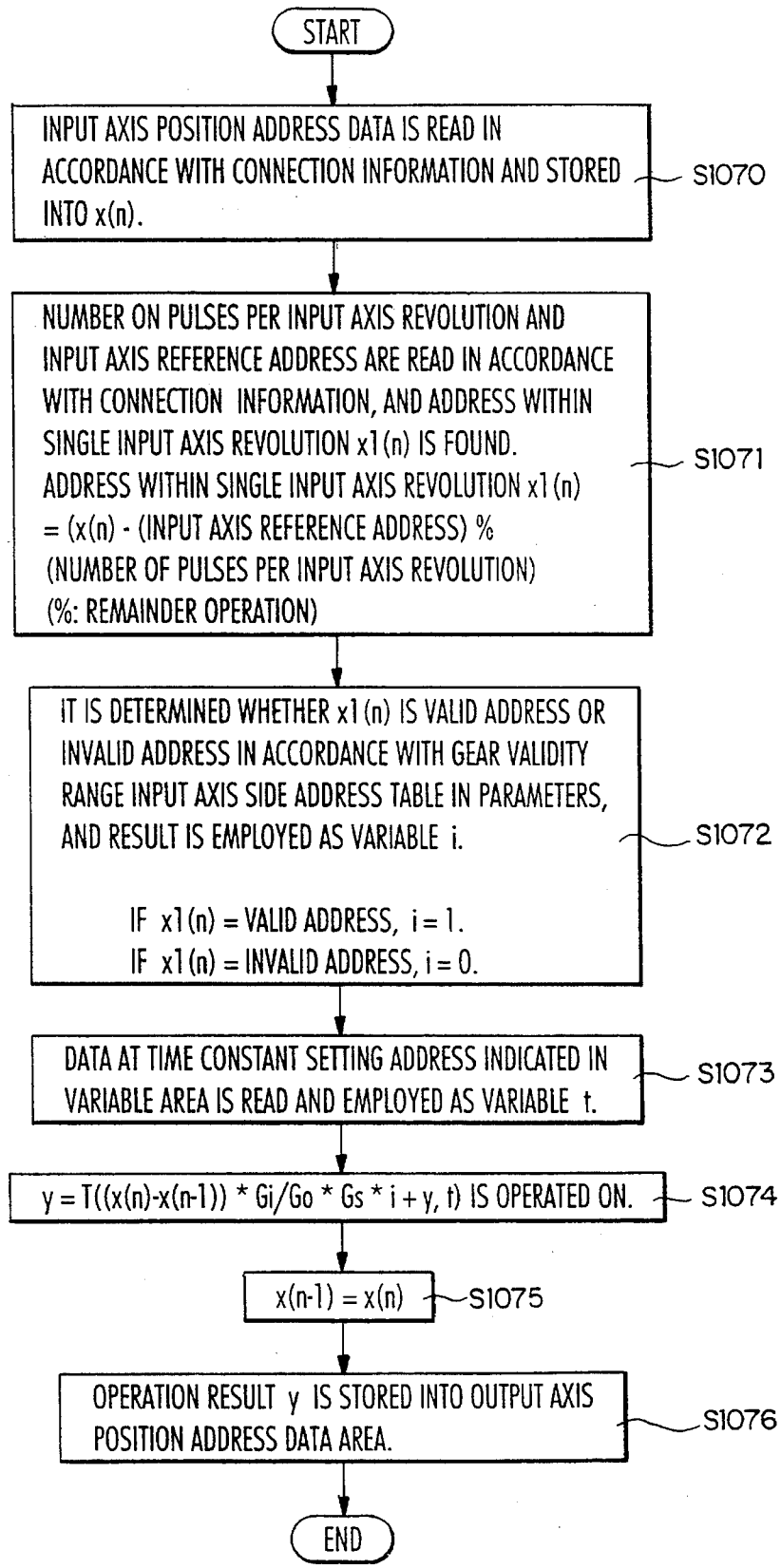
FIG. 28 is a flowchart illustrating the operation of the virtual gear module in the positioning apparatus according to the seventh preferred embodiment of the invention.
Figure 29:
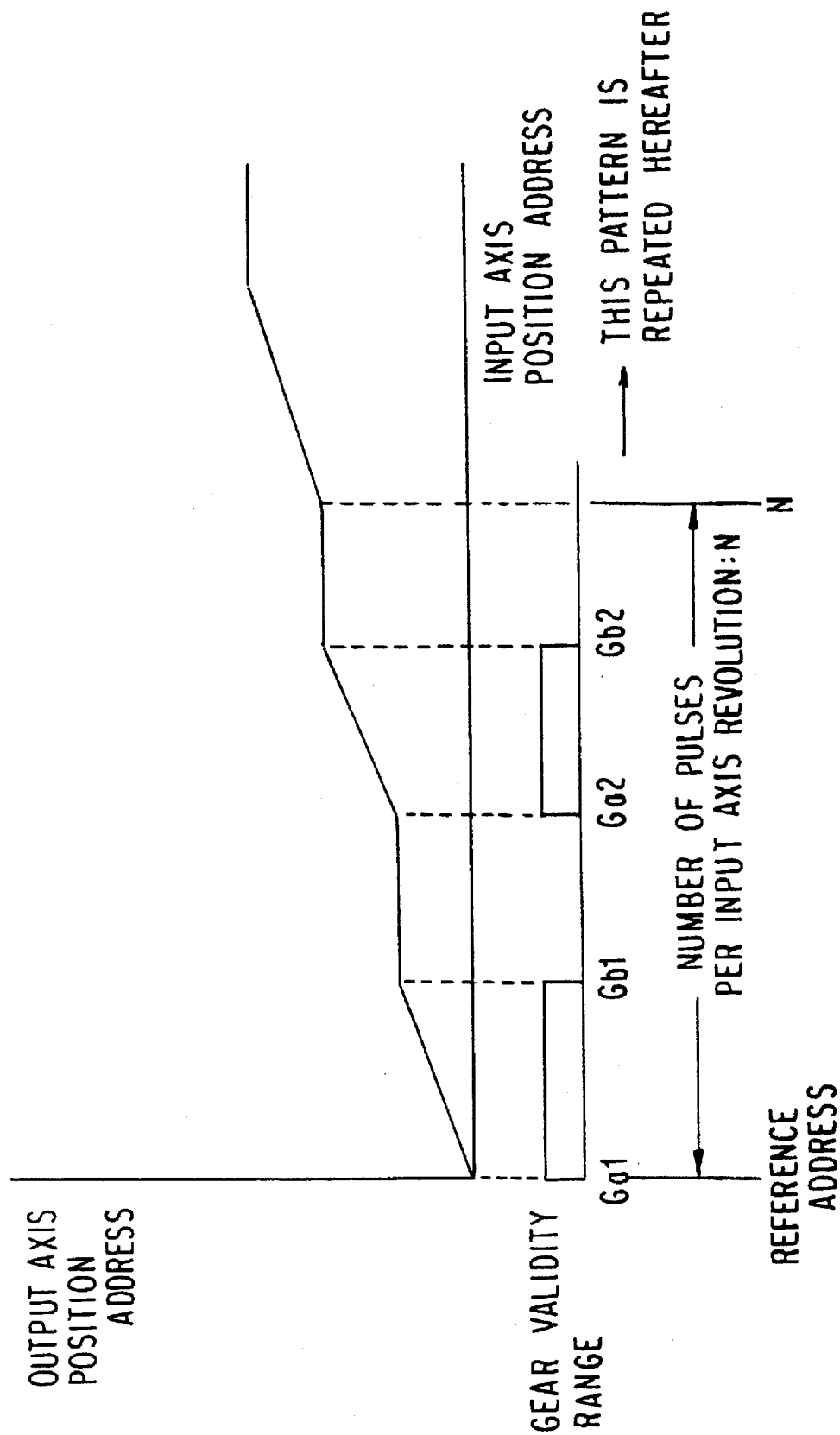
FIG. 29 shows the operation example of the virtual gear module in the positioning apparatus according to the seventh preferred embodiment of the invention.

FIG. 28 is a flowchart illustrating the operation of the virtual gear module and is a part of the real-time interrupt processing operation shown in FIG. 13. FIGS. 29 and 30 show operation examples.

Operation will now be described with reference to FIG. 28. When the virtual gear module is implemented, the input axis position address data is read in accordance with the connection information 72 and stored into the x(n) area 126 at step S1070. Then, at step S1071, the number of pulses per input axis revolution and input axis reference address are read in accordance with the connection information 72 and the address within one input axis revolution x1(n) is found in accordance with Expression 22.

Address within one input axis revolution:

$$x1\ (n)=(x(n)-(\text{input axis reference address}))\%(\text{number of pulses per input axis revolution}) \quad \text{Ex. 23}$$

where % is the remainder operator, operation symbol employed to calculate the remainder of division Then, at step S1072, it is determined whether x1(n) found at the step S1071 is a valid range address or an invalid range address in accordance with the gear validity range input axis side address table 132. If the result of determination is valid, the variable i=1. If it is invalid, i=0. Then, at step S1073, time constant setting address data indicated in the variable area 131 is read and defined as a variable t. Then, at step S1074, operation is executed in accordance with Expression 22. And, at step S1075, the input axis position address data current value x(n) is defined as the preceding value x(n−1) and stored into the input axis position address data preceding value area 125. Finally, at step S1076, the operation result y is stored into the output axis position address data area 127, and the processing is terminated.

Output axis position address:

$$y1(n)=(x(n)-x(n-1))*Gi/Go*Gs*i30\ y1(n-1) \quad \text{Ex. 24}$$

where Expression 24 is an operation expression for finding the output axis position address y1(n) when not filtered, i.e., when time constant value t=0. According to this expression, the variation between the operation result y1(n) and preceding operation result y1(n−1) is large when the input axis side gear valid/invalid variable i changes from 0 to 1 or from 1 to 0, and if output intact to the output axis, it will give impact to the machine connected to the actual output axis, adversely affecting the machine. Hence, a filter function T(y1(n), t) has been designed by employing the operation result y1(n) and set time constant value t as inputs to output a smooth variation in response to a large variation, i.e., when the input axis side gear valid/invalid variable has been switched over. A smooth acceleration/deceleration curve is achieved by implementing the filter function T( ). Alternatively, the filter function may employ a linear acceleration/deceleration filter, an exponential acceleration/deceleration filter, an S-pattern acceleration/deceleration filter or the like, or it may be a filter function which employs a filter coefficient as an input in place of the time constant.

FIG. 29 shows the operation of the present embodiment. FIG. 29 is the result of output axis position address operation at a time when the number of pulses per input axis revolution is equal to N, and the valid range of the input axis side gear teeth is between the input axis position addresses Ga1 and Gb1 and between Ga2 and Gb2, and illustrates how an intermittent run is implemented.

FIG. 30 shows the operation of the present embodiment, indicating relationships between output axis velocity and time where the gear validity range is between Ga1 and Gb1 and between Ga2 and Gb2 as shown in FIG. 29. In FIG. 30, a indicates a relationship if the filter time constant t=0, b a relationship if the time constant t≠0 and a linear acceleration/deceleration filter is used, c a relationship if the time constant t≠0 and an exponential acceleration/deceleration filter is employed, and d a relationship if the time constant t≠0 and an S-pattern acceleration/deceleration filter is used. Namely, the embodiment 7 outputs through the filter the result of multiplying the input position information by the set transmission constant if the position information is within the preset valid range of the output of the virtual transmission module in embodiment 6, and outputs through the filter the result of preserving the position information as it had been if the position information is outside the valid range.

Another embodiment of the virtual transmission module will be described. FIGS. 31 to 34 illustrate the virtual transmission module equivalent to a clutch (hereinafter referred to as the "virtual clutch module"). Although the virtual clutch module does not operate independently and is used with other virtual mechanical modules, its independent operation will be described here.

FIG. 31 shows a memory map for the virtual clutch module stored in the program memory 9 in the positioning apparatus 1. Referring to FIG. 31, the numeral 71 indicates a module number area, 72 a connection information area storing the identification information of other virtual mechanical modules of which input axis position address data required for the virtual clutch module to execute operation is stored, and 76 an auxiliary input axis connection information area which is not used for the virtual clutch module. 150 indicates an area where an operation expression executed by the virtual clutch module is stored, 151 a variable memory address area storing the ON/OFF command information of the virtual clutch module, and 152 a parameter area which is not employed by the virtual clutch module.

FIG. 32 is a detail work memory map for the virtual clutch module saved into the work memory 10 of the positioning apparatus 1. In FIG. 32, 153 to 156 indicate an input axis position address data preceding value, its current value, an output axis position address data preceding value, and its current value areas employed by the virtual clutch module for the execution of operation.

FIG. 33 is a detail variable memory map for the virtual clutch module stored in the variable memory 11 of the positioning apparatus 1. In FIG. 33, 157 indicates an ON/OFF command information area of the virtual clutch module.

Figure 34:
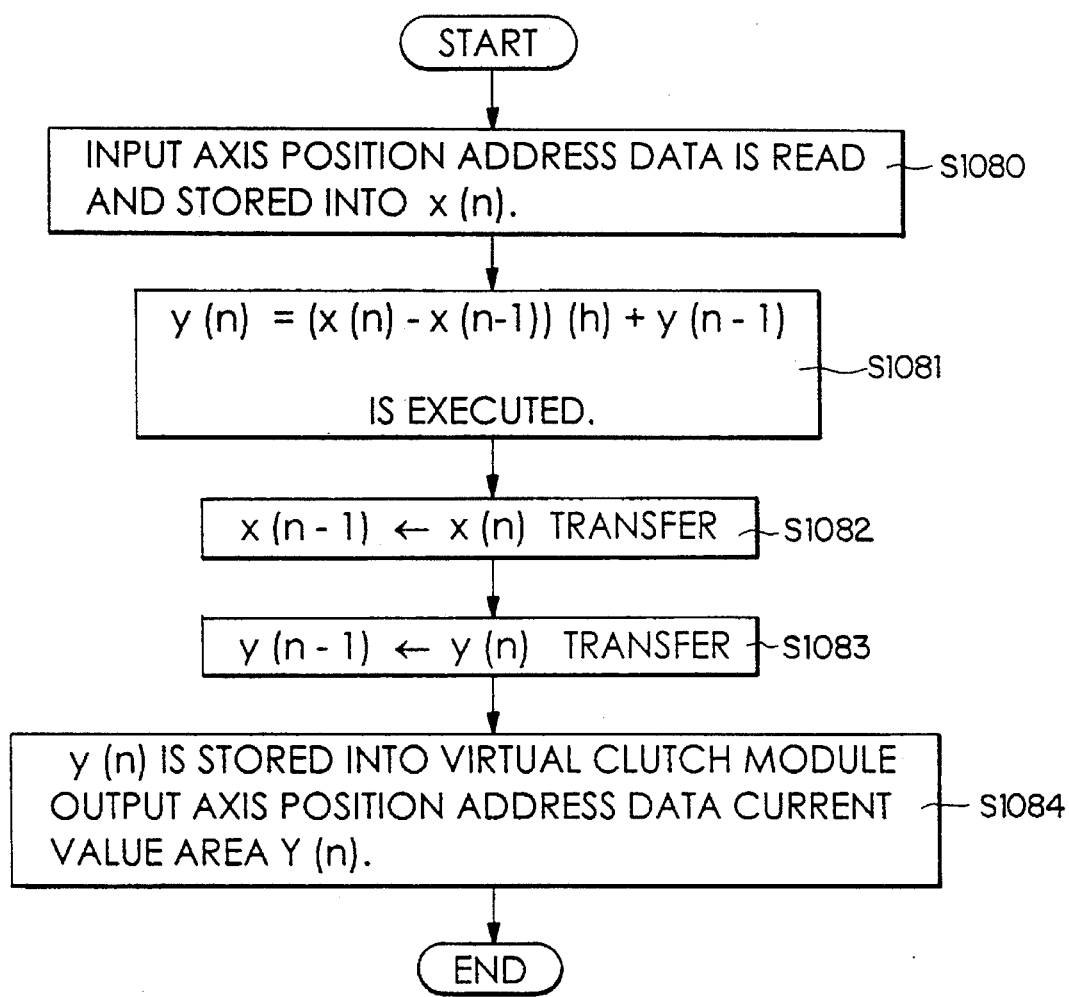
FIG. 34 is a flowchart illustrating the operation of the virtual clutch module in the positioning apparatus according to the eighth preferred embodiment of the invention.

FIG. 34 is a flowchart for virtual clutch module operation processing stored in the OS ROM 8 of the positioning apparatus 1 and executed by the CPU 7.

Operation will now be described. Internal processing executed by the CPU 7 of the positioning apparatus 1 through real-time processing will be described in accordance with the flowchart shown in FIG. 34. At step S1080, the connection information stored in the connection information area 72 of the program memory 9 assigned to the virtual clutch module is read, and the input axis position address data is read from the other virtual mechanical module specified as the input of the virtual clutch module and is transferred to the input axis position address data current value area x(n) 154 in the work memory 10.

Then, at step S1081, data x(n−1) stored in the input axis position address data preceding value area 153 of the work memory 10 is subtracted from data x(n) stored in the input axis position address data current value area 154 to calculate a travel per unit time. A variable memory address where the ON/OFF command information of the virtual clutch module is stored is then read from the variable area 151 in the program memory 9, an ON/OFF command h 157 of the virtual clutch module in the variable memory 11 corresponding to this address is read and multiplied by the result of such subtraction. Data y(n−1) stored in the output axis position address data preceding value area 155 of the work memory 10 is then added to the result of such multiplication to calculate an output axis position address data current value y(n). It should be noted that the virtual clutch module ON/OFF command data defined as a variable indicates the value of 1 or 0. Hence, when it is 1, the result of adding the difference of x(n)−x(n−1) to the output axis position address data preceding value y(n−1) is the output of the virtual clutch module. When it is 0, the output axis position address data preceding value y(n−1) is preserved intact as the output of the virtual clutch module.

Steps S1082 and S1083 are then executed, i.e., the input axis position address data current value x(n) in the work memory 10 is transferred to the input axis position address data preceding value x(n−1) and the output axis position address data current value y(n) calculated in the step S1081 is transferred to the output axis position address data preceding value y(n−1) to prepare for the next operation. At step S1084, the output axis position address data current value y(n) calculated at the step S1081 is stored into the output axis position address data current value area 156 of the work memory 10 as the output of the virtual clutch module. By executing the flowchart in FIG. 34 by real-time processing, consecutive position address data is output.

Figure 37:
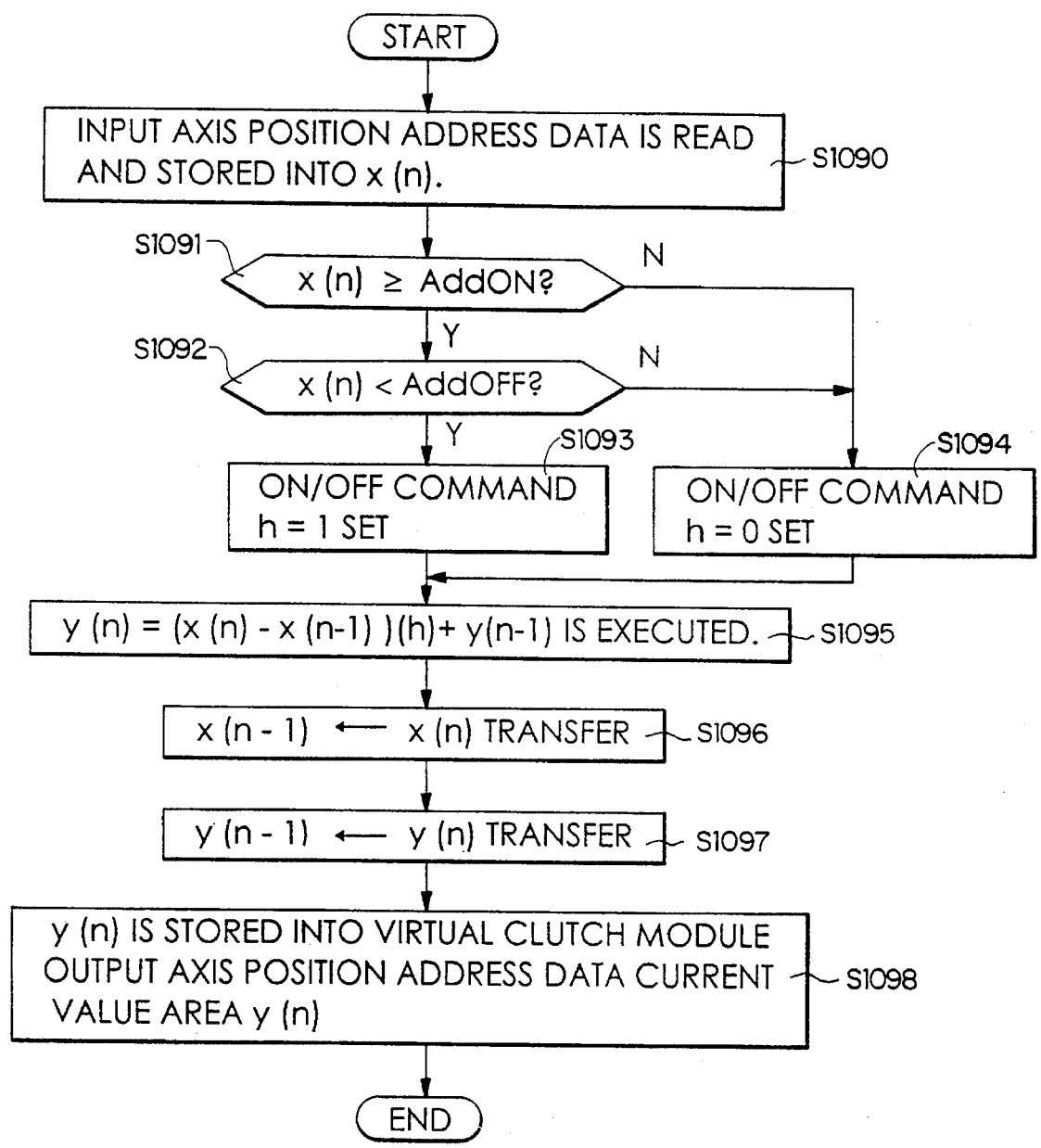
FIG. 37 is a flowchart illustrating the operation of the virtual clutch module in the positioning apparatus according to the ninth preferred embodiment of the invention.

Another embodiment of the virtual clutch module will be described. FIGS. 35 to 37 illustrate another embodiment of the virtual clutch module.

FIG. 35 is a detail program memory map for the virtual clutch module stored in the program memory 9 of the positioning apparatus 1. In FIG. 35, the numerals 71, 72 and 76 are identical to those in FIG. 31. 160 indicates an area where an operation expression executed by the virtual clutch module is stored, 162 and 163 parameter areas storing the ON address information and OFF address information of the virtual clutch module, and 161 a variable area which is not used by the virtual clutch module.

FIG. 36 is a detail work memory map for the virtual clutch module saved in the work memory 10 of the positioning apparatus 1. Referring to FIG. 36, 164 to 167 indicate an input axis position address data preceding value, its current value, an output axis position address data preceding value, and its current value areas used by the virtual clutch module to execute operation, and 168 a virtual clutch module ON/OFF command information area.

FIG. 37 is a flowchart for virtual clutch module operation processing stored in the OS ROM 8 of the positioning apparatus 1 and executed by the CPU 7.

Operation will now be described. Internal processing executed by the CPU 7 of the positioning apparatus 1 through real-time processing will be described with reference to the flowchart shown in FIG. 37. At step S1090, the connection information stored in the connection information area 72 of the program memory 9 assigned to the virtual clutch module is read, and the input axis position address data is read from the other virtual mechanical module specified as the input of the virtual clutch module and is transferred to the input axis position address data current value area x(n) 165 in the work memory 10.

Then, at step S1091, the input axis position address data x(n) transferred at the step S1091 and an ON address Add ON of the virtual clutch module stored in the parameter area 162 of the program memory 9 assigned to the virtual clutch memory are read and compared. If x(n) is smaller than Add ON as a result of comparison, the processing judges it as a clutch OFF area and jumps to step S1094. If x(n) is equal to or greater than Add ON, the processing judges it as a clutch ON area, does not make a jump, and implements step S1092, wherein an OFF address Add OFF of the virtual clutch module stored in the parameter 2 area 163 of the program memory 9 is read and compared with the input axis position address data x(n). If x(n) is equal to or greater than Add OFF as a result of comparison, the processing judges it as a clutch OFF area and jumps to the step S1094. If x(n) is smaller than Add OFF, the processing Judges it as a clutch ON area, does not make a jump, and implements step S1093, wherein the ON command data h=1 is stored into the virtual clutch module ON/OFF command area 168 of the work memory 10 and a jump is made to step S1095. The step S1094 is a jump destination after the judgement of the clutch OFF area at the steps S1091 and S1092. At the step S1094, the OFF command data h=0 is stored into the virtual clutch module ON/OFF command area 168 and the processing then Jumps to the step S1095.

Then, at the step S1095, data x(n−1) stored in the input axis position address data preceding value area 164 of the work memory 10 is subtracted from data x(n) stored in the input axis position address data current value area 165 to calculate a travel per unit time. The virtual clutch module ON/OFF command h in the virtual clutch module ON/OFF command area 168 of the work memory 10 is then read and multiplied by the result of such subtraction. Data y(n−1) stored in the output axis position address data preceding value area 166 of the work memory 10 is then added to the result of such multiplication to calculate an output axis position address data current value y(n). It should be noted that the virtual clutch module ON/OFF command data defined in the work memory 10 indicates the value of 1 or 0. Hence, when it is 1, the result of adding the difference of x(n)−x(n−1) to the output axis position address data preceding value y(n−1) is the output of the virtual clutch module. When it is 0, the output axis position address data preceding value y(n−1) is preserved intact as the output of the virtual clutch module.

Steps S1096 and S1097 are then executed, i.e., the input axis position address data current value x(n) in the work memory 10 is transferred to the input axis position address data preceding value x(n−1) and the output axis position address data current value y(n) calculated at the step S1095 is transferred to the output axis position address data preceding value y(n−1) to prepare for the next operation. At step S1098, the output axis position address data current value y(n) calculated at the step S1095 is stored into the output axis position address data current value area 167 of the work memory 10 as the output of the virtual clutch module. By executing the flowchart in FIG. 37 by real-time processing, consecutive position address data is output.

Another embodiment of the virtual clutch module will be described. FIGS. 38 to 41 show another embodiment of the virtual clutch module.

FIG. 38 is a detail program memory map for the virtual clutch module stored in the program memory 9 in the positioning apparatus 1. Referring to FIG. 38, the numerals 71, 72 and 76 are identical to those in FIG. 31 illustrating embodiment 8. 170 indicates an area storing a virtual clutch module operation expression executed by the virtual clutch module, 171 a filter operation expression area employed by the virtual clutch module to filter such operation result, 172 a variable memory address area where the ON/OFF command information of the virtual clutch module is stored, 173 a variable memory address area where the filter constant of the virtual clutch module is stored, and 174 a parameter area that is not used by the virtual clutch module.

Figure 39:
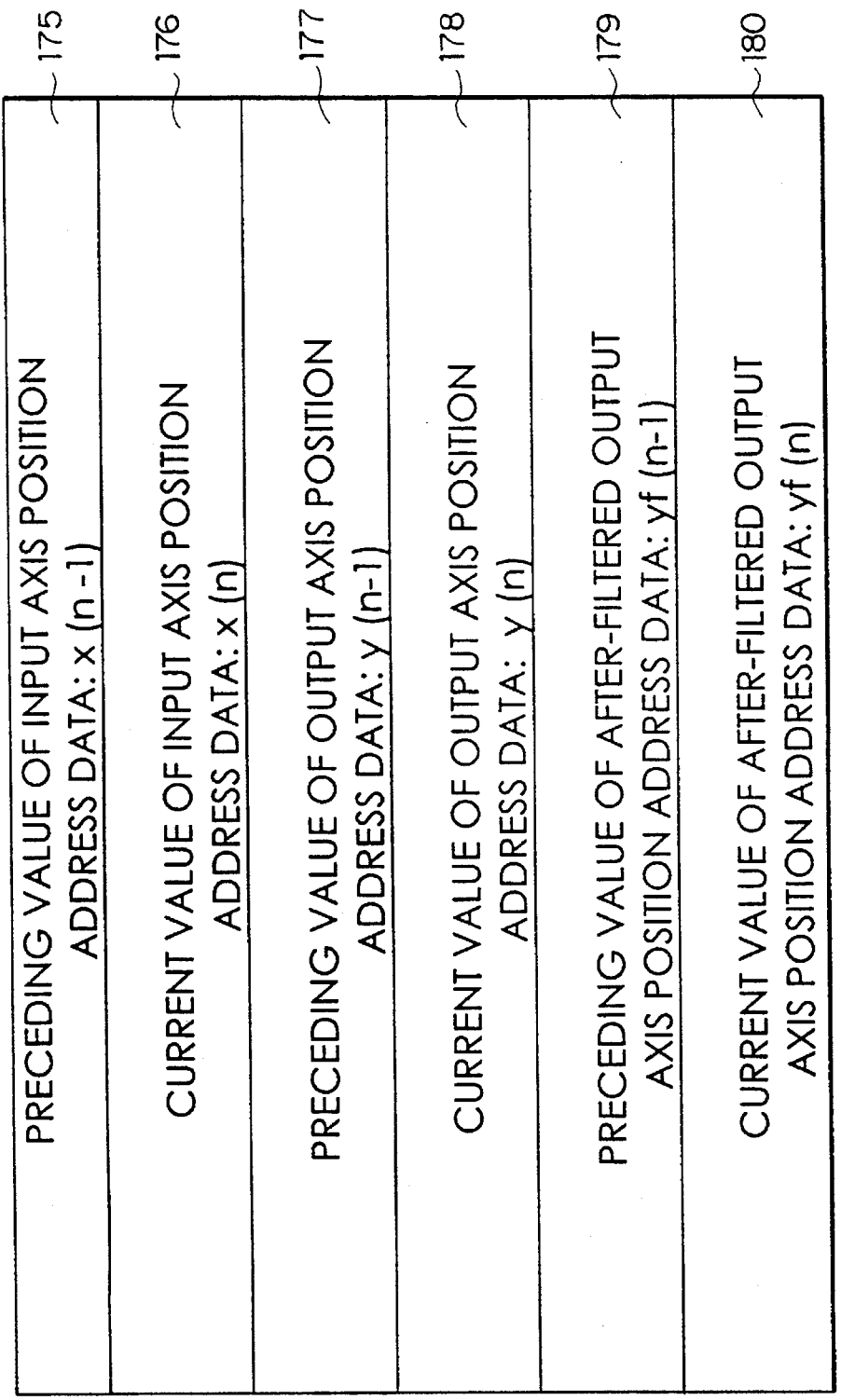
FIG. 39 is a detail work memory map for the virtual clutch module in the positioning apparatus according to the tenth preferred embodiment of the invention.

FIG. 39 is a detail work memory map for the virtual clutch module saved into the work memory 10 of the positioning apparatus 1. Referring to FIG. 39, 175 to 178 indicate input axis position address data preceding value, its current value, output axis position address data preceding value, and its current value areas employed by the virtual clutch module for the execution of operation. 179 and 180 indicate after-filtered output axis position address data preceding value and current value areas used at the time of performing filter operation.

FIG. 40 is a detail variable memory map for the virtual clutch module stored in the variable memory 11 of the positioning apparatus 1. In FIG. 40, 181 indicates a virtual clutch module ON/OFF command information area, and 182 a virtual clutch module filter constant area.

Figure 41:
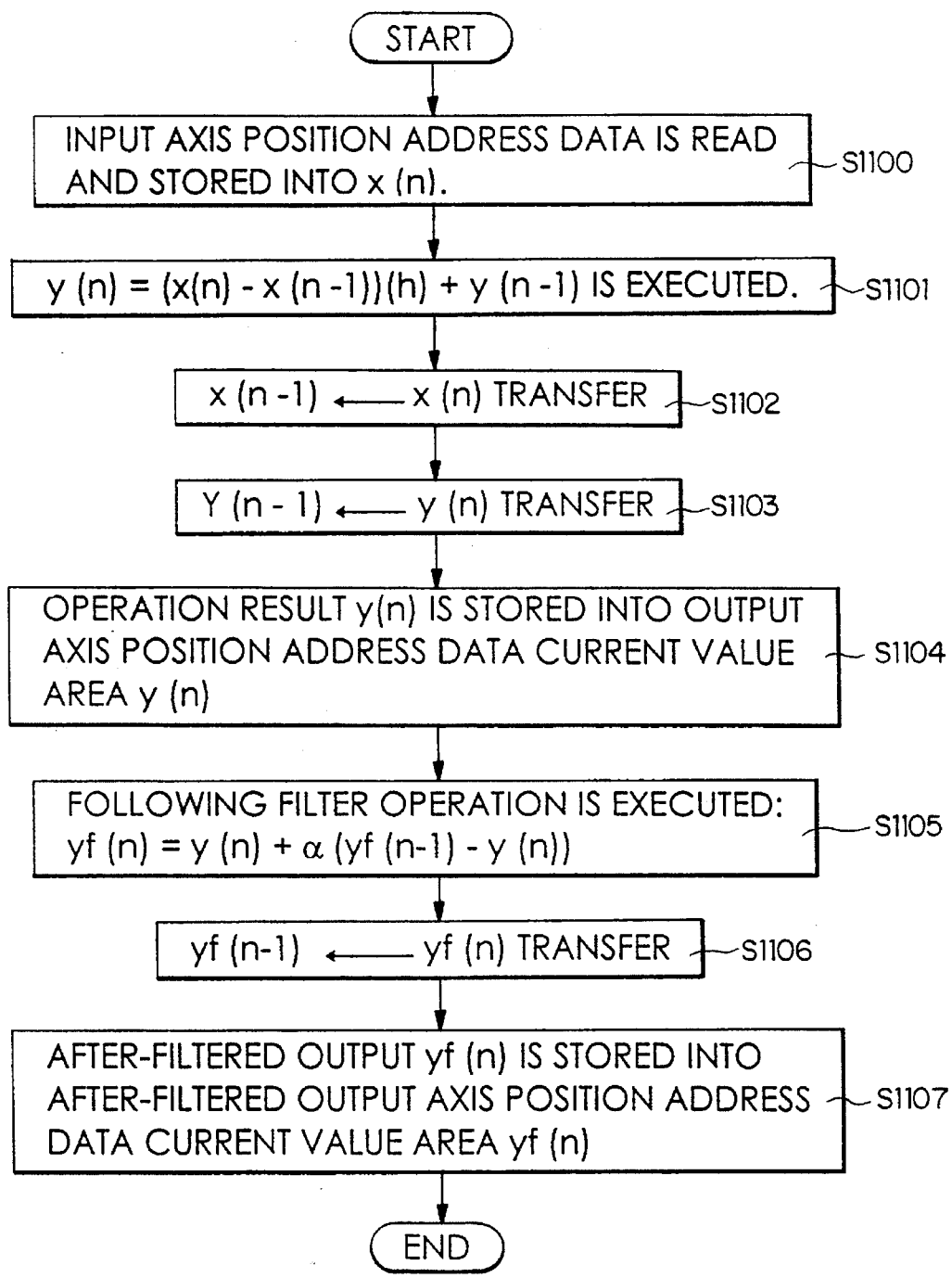
FIG. 41 is a flowchart illustrating the operation of the virtual clutch module in the positioning apparatus according to the tenth preferred embodiment of the invention.

FIG. 41 is a flowchart for virtual clutch module operation processing stored in the OS ROM 8 of the positioning apparatus 1 and executed by the CPU 7.

Operation will now be described. Internal processing executed by the CPU 7 of the positioning apparatus 1 through real-time processing will be described in accordance with the flowchart shown in FIG. 41. At step S1100, the virtual clutch module connection information stored in the connection information area 72 of the program memory 9 assigned to the virtual clutch module is read, and the input axis position address data is read from the other virtual mechanical module specified as the input of the virtual clutch module and is transferred to the input axis position address data current value area x(n) 176 in the work memory 10.

Then, at step S1101, data x(n−1) stored in the input axis position address data preceding value area 175 of the work memory 10 is subtracted from data x(n) stored in the input axis position address data current value area 176 to calculate a travel per unit time. A variable memory address where the ON/OFF command information of the virtual clutch module is stored is then read from the variable 1 area 172 in the program memory 9, an ON/OFF command h 181 of the virtual clutch module in the variable memory 11 corresponding to the address is read and multiplied by the result of such subtraction. Data y(n−1) stored in the output axis position address data preceding value area 177 of the work memory 10 is then added to the result of such multiplication to calculate an output axis position address data current value y(n). It should be noted that the virtual clutch module ON/OFF command data defined as a variable indicates the value of 1 or 0. Hence, when it is 1, the result of adding the difference of x(n)−x(n−1) to the output axis position address data preceding value y(n−1) is the output of the virtual clutch module. When it is 0, the output axis position address data preceding value y(n−1) is preserved intact as the output of the virtual clutch module.

Steps S1102 and S1103 are then executed, i.e., the input axis position address data current value x(n) in the work memory 10 is transferred to the input axis position address data preceding value x(n−1) and the output axis position address data current value y(n) calculated at the step S1101 is transferred to the output axis position address data preceding value y(n−1) to prepare for the next operation. At step S1104, the output axis position address data current value y(n) calculated at the step S1101 is stored into the output axis position address data current value area 178 of the work memory 10 as the output of the virtual clutch module.

Then, at step S1105, data y(n) stored in the output axis position address data current value area 178 of the work memory 10 as the output of such virtual clutch module is subtracted from data yf(n−1) stored in the after-filtered output axis position address data preceding value area 179 of the work memory 10, a variable memory address where the filter constant of the virtual clutch module is stored is then read from the variable 2 area 173 in the program memory 9, a filter constant α is read from the virtual clutch module filter constant area 182 of the variable memory 11 corresponding to the read address, multiplied by the result of such subtraction, and added to the output axis position address data current value y(n), thereby calculating an after-filtered output axis position address data current value yf(n). It will be recognized that the filter operation expression stored in the program memory 9 is not limited to the general example indicated here and may be a filter operation expression in another method.

Step S1106 is then executed, i.e., the after-filtered output axis position address data current value yf(n) calculated at the step S1105 is transferred to the after-filtered output axis position address data preceding value yf(n−1). At step S1107, the after-filtered output axis position address data current value yf(n) calculated at the step S1105 is stored into the after-filtered output axis position address data current value area 180 of the work memory 10 as the output of the virtual clutch module. By executing the flowchart in FIG. 41 by real-time processing, filtered position address data having a time constant is output.

Figure 50:
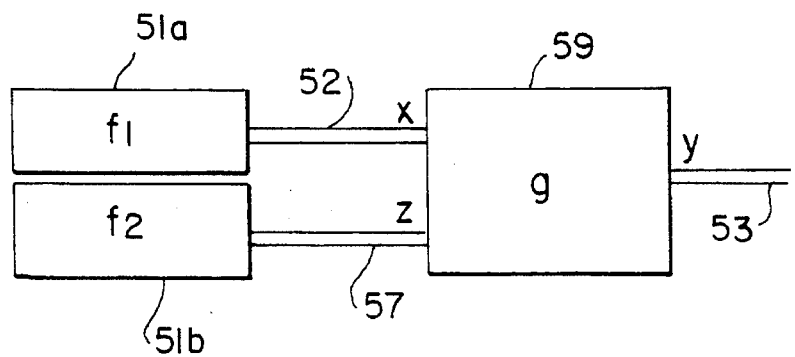
FIG. 50 is an arrangement diagram illustrating a positioning apparatus according to an eleventh preferred embodiment of the invention.

Another embodiment of the virtual transmission module will be described. FIG. 50 shows the virtual transmission software module equivalent to a differential gear (hereinafter referred to as the "virtual differential gear module"). Referring to FIG. 50, the numeral 52 indicates an input axis, 53 an output axis, 57 an auxiliary input axis, 59 a virtual transmission module defined in embodiment 6, and 51a and 51b virtual drive modules defined in embodiment 4.

FIG. 54 shows a memory map preset by the peripheral 6, wherein 71, 72 and 76 are identical to those shown in FIG. 47. 220 indicates an operation expression for the virtual differential gear module, and 221 and 222 parameters comprising an input axis/output axis gear ratio 221 and an auxiliary input axis/output axis gear ratio 222 for the virtual differential gear module.

FIG. 55 shows a work area for processing, wherein 223 indicates the preceding value of input axis position address data, 224 the current value of the input axis position address data, 225 the preceding value of auxiliary input axis position address data, 226 the current value of the auxiliary input axis position address data, and 227 output axis position address data.

Operation will now be described. To assume a differential gear, the virtual transmission module is represented by the following operation expressions:

$$y = g(x,z) \qquad \text{Ex. 25}$$
$$= Ga*(x(n)-x(n-1))/(Ga+Gb)- \qquad \text{Ex. 26}$$
$$\quad Ge*(z(n)-z(n-1))/(Ga+Gb)+y$$
$$= CMX1*(x(n)-x(n-1))/CDV1- \qquad \text{Ex. 27}$$
$$\quad CMX2*(z(n)-z(n-1))/CDV2+y$$
$$CMX1 = Ga \qquad \text{Ex. 28}$$
$$CDV1 = Ga+Gb \qquad \text{Ex. 29}$$
$$CMX2 = Ge \qquad \text{Ex. 30}$$
$$CDV2 = Ga+Gb \qquad \text{Ex. 31}$$

where

Ga: number of teeth of gear a

Gb: number of teeth of gear b

Ge: number of teeth of gear e x: position information generated by virtual drive module 51a z: position information generated by virtual drive module 51b y: position information of output axis

CMX1/CDV1: gear ratio between input axis and output axis

CMX2/CDV2: gear ratio between auxiliary input axis and output axis

Figure 57:
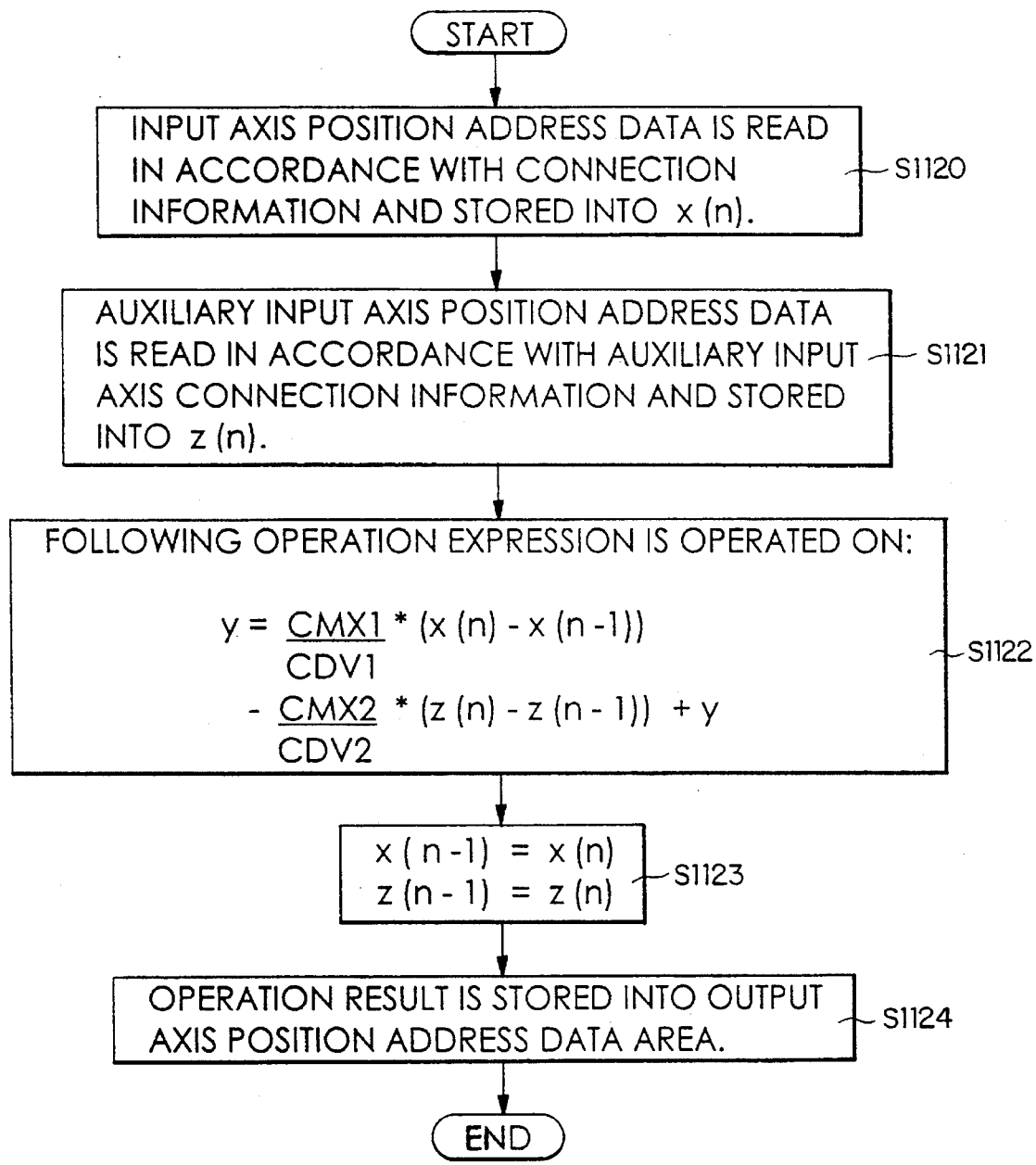
FIG. 57 is a flowchart illustrating processing operation according to the eleventh preferred embodiment of the invention.

Processing operation will now be described with reference to FIG. 57. The position information generated by the virtual drive module 51a, for example, is read to the input axis 52 in accordance with the connection information and stored into x(n) 224 in the work area (step S1120). The position information generated by the virtual drive module 51b, for example, is read to the auxiliary input axis 57 in accordance with the auxiliary input axis connection information and stored into z(n) 226 in the work area (step S1121). Operation is then performed in accordance with Expression 27 (step S1122). To prepare for the next processing, x(n) and z(n−1) are updated (step S1123). Such operation result is stored into the work area (step S1124). This processing is repeated at intervals of predetermined time T to output data.

Figure 51:
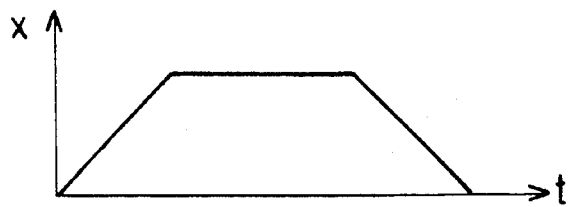
FIG. 51 shows position information x generated by a virtual drive module 51a according to the eleventh preferred embodiment of the invention.
Figure 52:
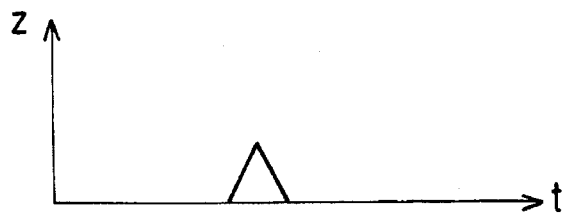
FIG. 52 shows position information z generated by a virtual drive module 51b according to the eleventh preferred embodiment of the invention.
Figure 53:
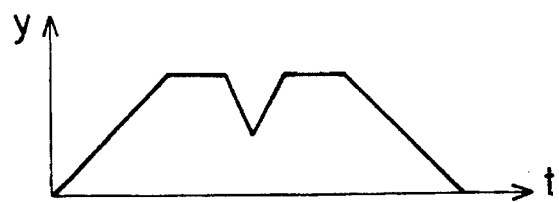
FIG. 53 shows output y of a virtual transmission module 59 according to the eleventh preferred embodiment of the invention.

The position information x generated by the virtual drive module 51a is shown in FIG. 51, the position information z generated by the virtual drive module 51b is shown in FIG. 52, and the output y of the virtual transmission module 59 at that time is shown in FIG. 53.

Supposing that the cam 486 (FIG. 128) has been connected to the output axis y 53, when it is desired to adjust the phase of the displacement curve of the cam 486, outputting merely an adjustment value from only the virtual drive module 51b to the virtual transmission module 59 allows an output as in the following Expression 32 to be provided from the virtual transmission module 59, whereby the cam 486 can be rotated to adjust the starting position. One cycle of the cam 486 should be designed to be output only from the virtual drive module 51a.

$$y = -CMX2*(z(n)-z(n-1))/CDV2+y \qquad \text{Ex. 32}$$

To rotate the cam 486 without rotating the input axis 52 during adjustment, it is only necessary to cause an output to be provided only from the virtual drive module 51b as indicated in Expression 32.

In addition to this embodiment, since the direction of rotation of the output axis changes according to the number of gears, the number of gears between input axis and output axis 228 and the number of gears between auxiliary input axis and output axis 229 in the parameters shown in FIG. 56 may be increased to change Expression 27 as indicated below, thereby accomplishing a different gear structure:

$$y = CMX1*(x(n)-x(n-1))*P1/CDV1 - CMX2*(z(n)-z(n-1))*P2/CDV2+y \qquad \text{Ex. 33}$$

where, the number of gears between input axis and output axis = even ... P1 = 1
= odd ... P1 = −1 the number of gears between auxiliary input axis and output axis = even ... P2 = 1
= odd ... P2 = −1

Figure 42:
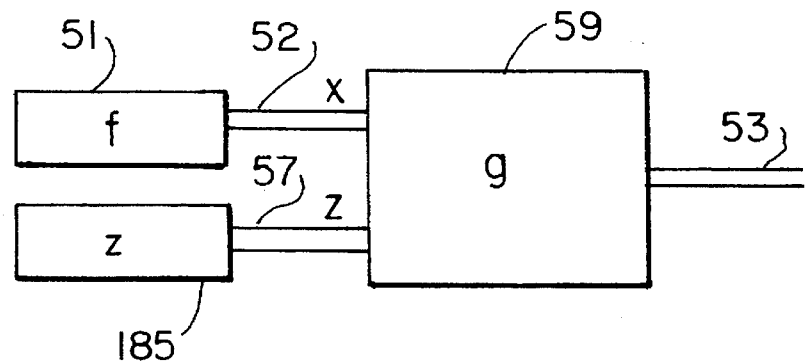
FIG. 42 is an arrangement diagram of a positioning apparatus according to a twelfth preferred embodiment of the invention.
Figure 43:
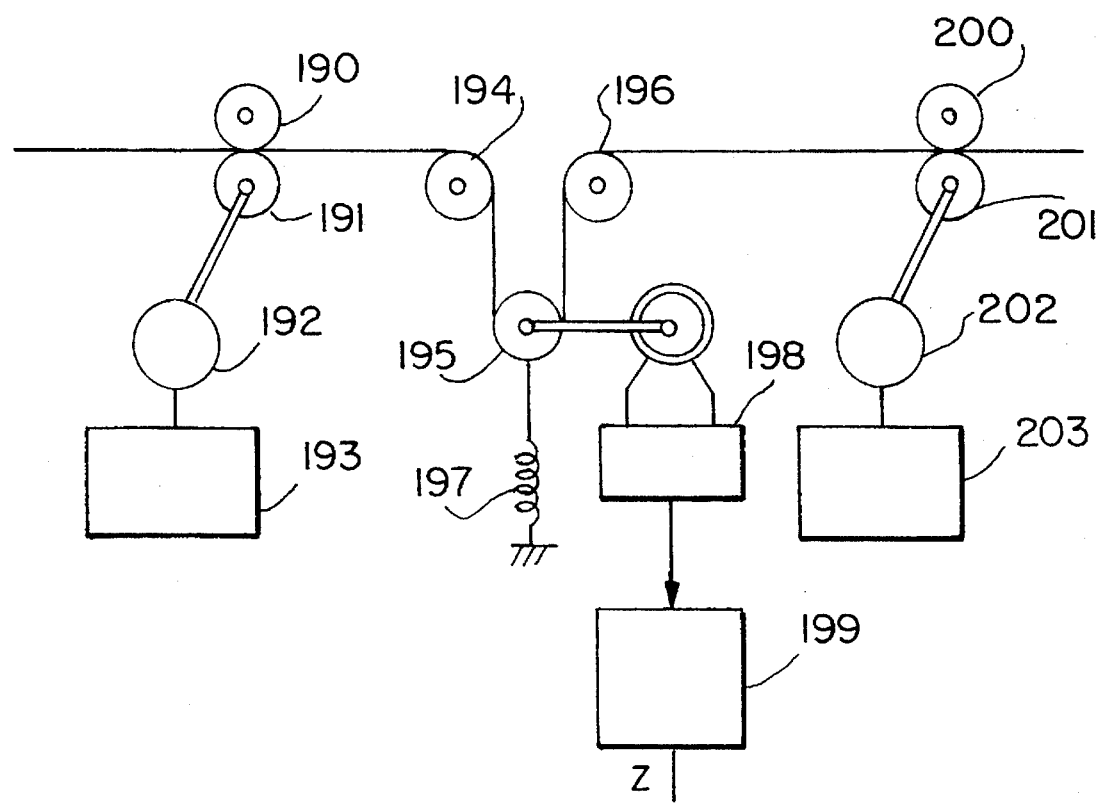
FIG. 43 is a dancer roll arrangement diagram for employing the twelfth preferred embodiment of the invention for the tension control of the dancer roll.

Another embodiment of the virtual differential gear module will be described. FIG. 42 shows an embodiment of the virtual differential gear module. Referring to FIG. 42, the numeral 52 indicates an input axis, 53 an output axis, 57 an auxiliary input axis, 59 a virtual transmission module defined in the sixth embodiment, 51 a virtual drive module defined in the fourth embodiment, and 185 a velocity command which defines the velocity of the auxiliary input axis 57 and is the output of a digital-to-analog converter 199 in FIG. 43. FIG. 47 shows a memory map preset by the peripheral 6, wherein 71 indicates a virtual differential gear module number, 72 connection information of a module connected to the input axis of the virtual differential gear module, 210 an operation expression for the virtual differential gear module, and 211 and 212 parameters comprising an input axis/output axis gear ratio 211 and an auxiliary input axis/output axis gear ratio 212 for the virtual differential gear module.

FIG. 48 shows a work area for processing, wherein 213 indicates a preceding value of input axis position address data, 214 a current value of the input axis position address data, 215 a travel of the auxiliary input axis, 216 output axis position address data, and 217 a velocity command of the auxiliary input axis.

Operation will now be described. Position information is a velocity command for rotating rollers 191 and 201 at an identical speed. The velocity information of the auxiliary input axis is input to the auxiliary input axis 57. This velocity information is a velocity command obtained by multiplying a value, which has been found by converting a compensation velocity command from a displacement detector 198 by means of the analog-to-digital converter 199, by a constant. To assume a differential gear, the virtual transmission module 59 is represented by the following operation expressions:

$$
\begin{aligned}
y &= g(X, Z) & \text{Ex. 34}\\
&= Za*(x(n)-x(n-1))/(Za+Zb) - & \text{Ex. 35}\\
&\quad Ze*z/(Za+Zb)+y\\
&= CMX1*(x(n)-x(n-1))/CDV1 - & \text{Ex. 36}\\
&\quad CMX2*z/CDV2+y\\
CMX1 &= Za & \text{Ex. 37}\\
CDV1 &= Za+Zb & \text{Ex. 38}\\
CMX2 &= Ze & \text{Ex. 39}\\
CDV2 &= Za+zb & \text{Ex. 40}
\end{aligned}
$$

where

Za: number of teeth of gear a

Zb: number of teeth of gear b

Ze: number of teeth of gear e

X: position information generated by virtual drive module 51

Z: velocity command y: position information of output axis

CMX1/CDV1: gear ratio between input axis and output axis

CMX2/CDV2: gear ratio between auxiliary input axis and output axis

Figure 49:
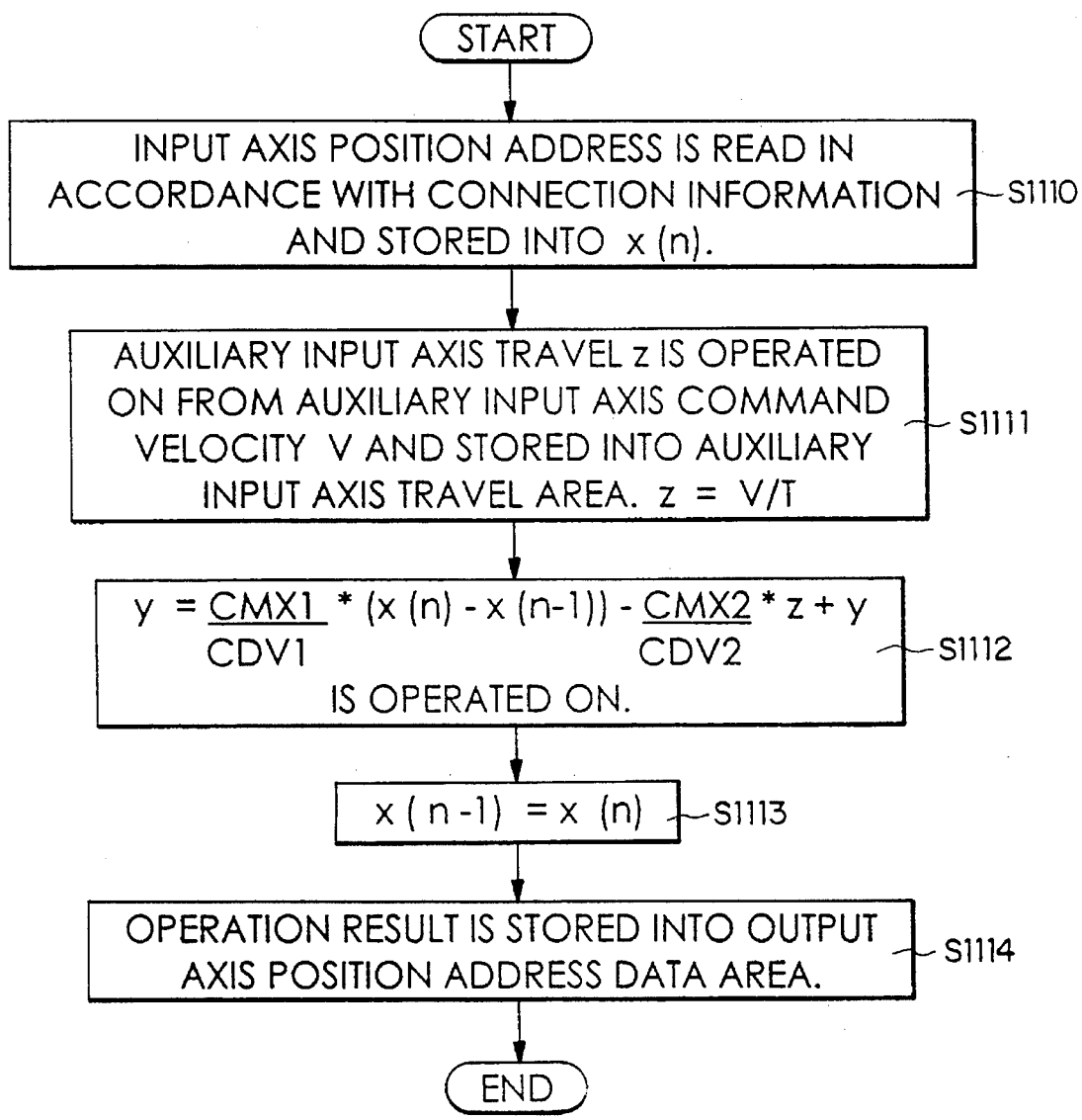
FIG. 49 is a flowchart illustrating the processing operation according to the twelfth preferred embodiment of the invention.

Processing operation will now be described with reference to FIG. 49. The position information generated by the virtual drive module 51, for example, is read to the input axis 52 in accordance with the connection information and stored into x(n) 214 in the work area (step S1110). The value z found by dividing the auxiliary input axis velocity command V 217 by a processing period T is read to the auxiliary input axis 57 and is stored into the work area 215 (step S1111). Operation is then performed in accordance with Expression 36 (step S1112). To prepare for the next processing, x(n–1) is updated (step S1113). The operation result is stored into the work area (step S1114). This processing is repeated at intervals of the predetermined time T to output data.

Figure 44:
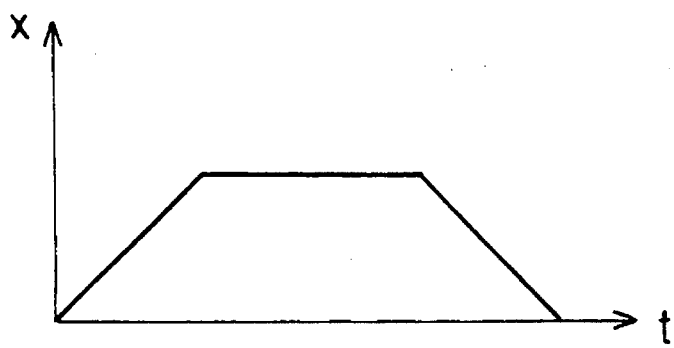
FIG. 44 shows position information x generated by a virtual drive module 51 according to the twelfth preferred embodiment of the invention.
Figure 45:
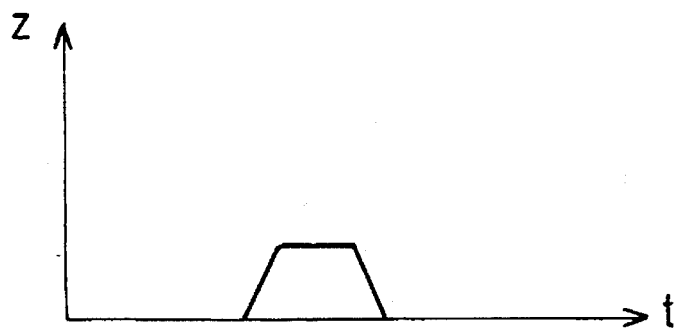
FIG. 45 shows command velocity information z of an auxiliary input axis according to the twelfth preferred embodiment of the invention.
Figure 46:
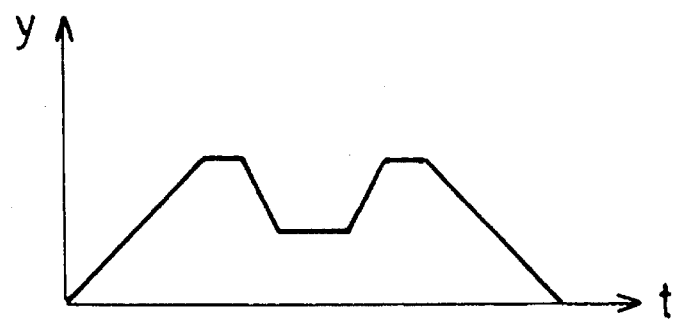
FIG. 46 shows output y of a virtual transmission module 59 according to the twelfth preferred embodiment of the invention.

The position information x generated by the virtual drive module 51 is shown in FIG. 44, the auxiliary input axis velocity command output z is shown in FIG. 45, and the output y of the virtual transmission module 59 at that time is shown in FIG. 46.

Figure 126:
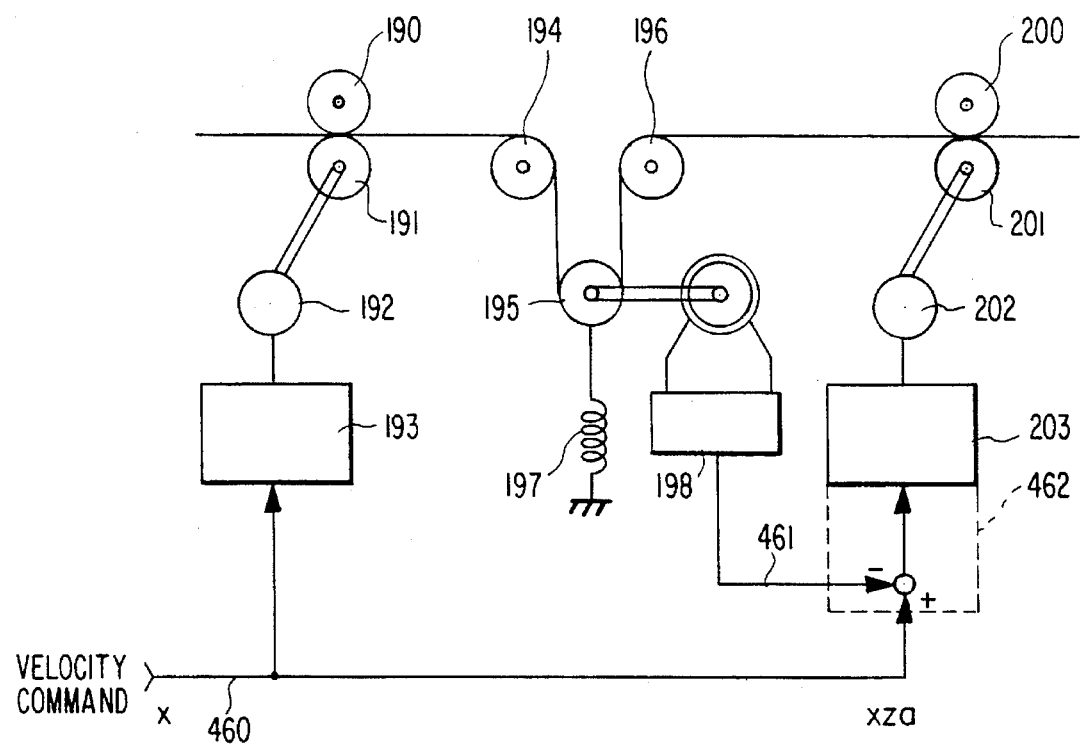

An instance will be described, which employs the virtual differential gear module 59 of the present invention to drive the roller 201 in FIG. 126, thereby achieving the tension control of a dancer roll.

The input axis 52 in FIG. 42 is given a command for rotating the rollers 191 and 201 at an identical speed, and the auxiliary input axis 57 in FIG. 42 is provided with a velocity command found by multiplying the displacement value of a dancer roll 195, which has been obtained by the analog-to-digital converter 199, by a constant. Such commands are set to the input axis position address data current value 214 and auxiliary input axis command velocity 217 in FIG. 48, respectively, and processed in accordance with the flowchart in FIG. 49, thereby finding the output axis position address data y to be given to a servo amplifier 203 for driving the roller 201. Hence, the velocity of the roller 201 can be fine-adjusted according to the displacement value of the dancer roll 195.

Figure 58:
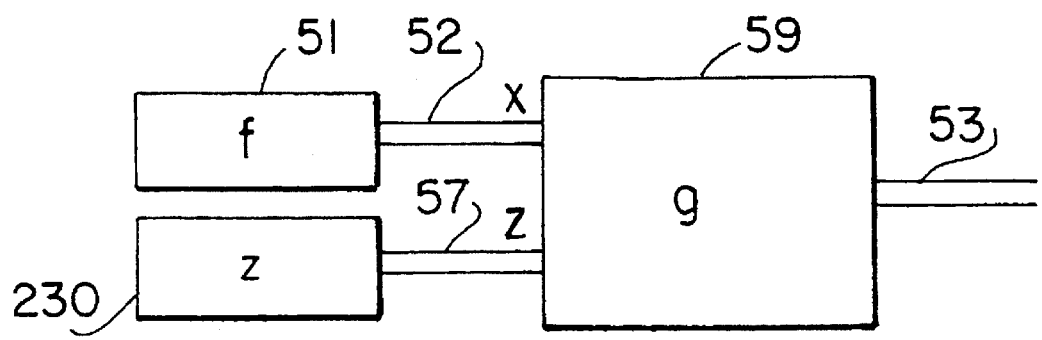
FIG. 58 is an arrangement diagram illustrating a positioning apparatus according to a thirteenth preferred embodiment of the invention.

Another embodiment of the virtual differential gear module will be described. FIG. 58 shows another embodiment of the virtual differential gear module, wherein the numeral 52 indicates an input axis, 57 an auxiliary input axis, 53 an output axis, 51 a virtual drive module defined in the fourth embodiment, 230 an address data table of the auxiliary input axis, and 59 a virtual transmission module defined in the sixth embodiment.

Figure 59:
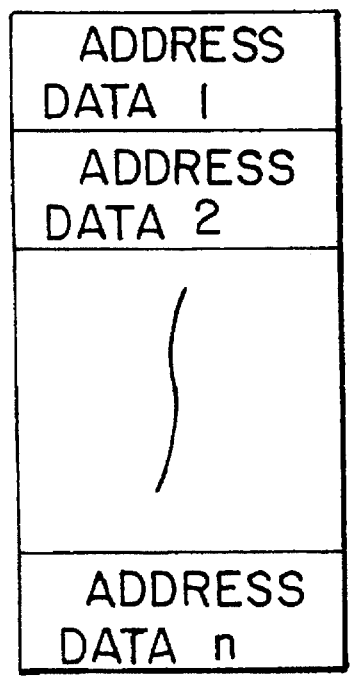
FIG. 59 is a data map illustrating the output address data table of an auxiliary input axis according to the thirteenth preferred embodiment of the invention.

FIG. 59 shows the address data table of the auxiliary input axis which stores the required output address data of the auxiliary input axis per predetermined time T. FIG. 60 shows a memory map preset by the peripheral 6, wherein a module number 71 indicates a number for this virtual differential gear module, connection information 72 indicates the information of a virtual mechanical module connected to the input axis of this virtual differential gear module, auxiliary input axis connection information 76 indicates the information of a virtual mechanical module connected to the auxiliary input axis thereof, an operation expression 235 indicates the contents of operation for this virtual differential gear module, and parameters 236 and 237 comprise an input axis/output axis gear ratio and an auxiliary input axis/output axis gear ratio for the virtual differential gear module.

FIG. 61 shows a work area for processing, which consists of a preceding value of input axis position address data 238, a current value of the input axis position address data 239, an address data table number of the auxiliary input axis 240, a current value of the address data of the auxiliary input axis 241 and output axis position address data 242.

Operation will now be described. First the virtual transmission module 59 is represented by the following operation expressions to assume a differential gear:

$$
\begin{aligned}
y &= g(X, Z) & \text{Ex. 41}\\
&= Za*(x(n)-x(n-1))/(Za+Zb) - & \text{Ex. 42}\\
&\quad Ze*z(i)/(Za+Zb)+y\\
&= CMX1*(x(n)-x(n-1))/CDV1 - & \text{Ex. 43}\\
&\quad CMX2*z(i)/CDV2+y\\
CMX1 &= Za & \text{Ex. 44}\\
CDV1 &= Za+Zb & \text{Ex. 45}\\
CMX2 &= Ze & \text{Ex. 46}\\
CDV2 &= Za+Zb & \text{Ex. 47}
\end{aligned}
$$

where

Za: number of teeth of gear a

Zb: number of teeth of gear b

Ze: number of teeth of gear e

X: position information generated by virtual drive module 51

Figure 65:
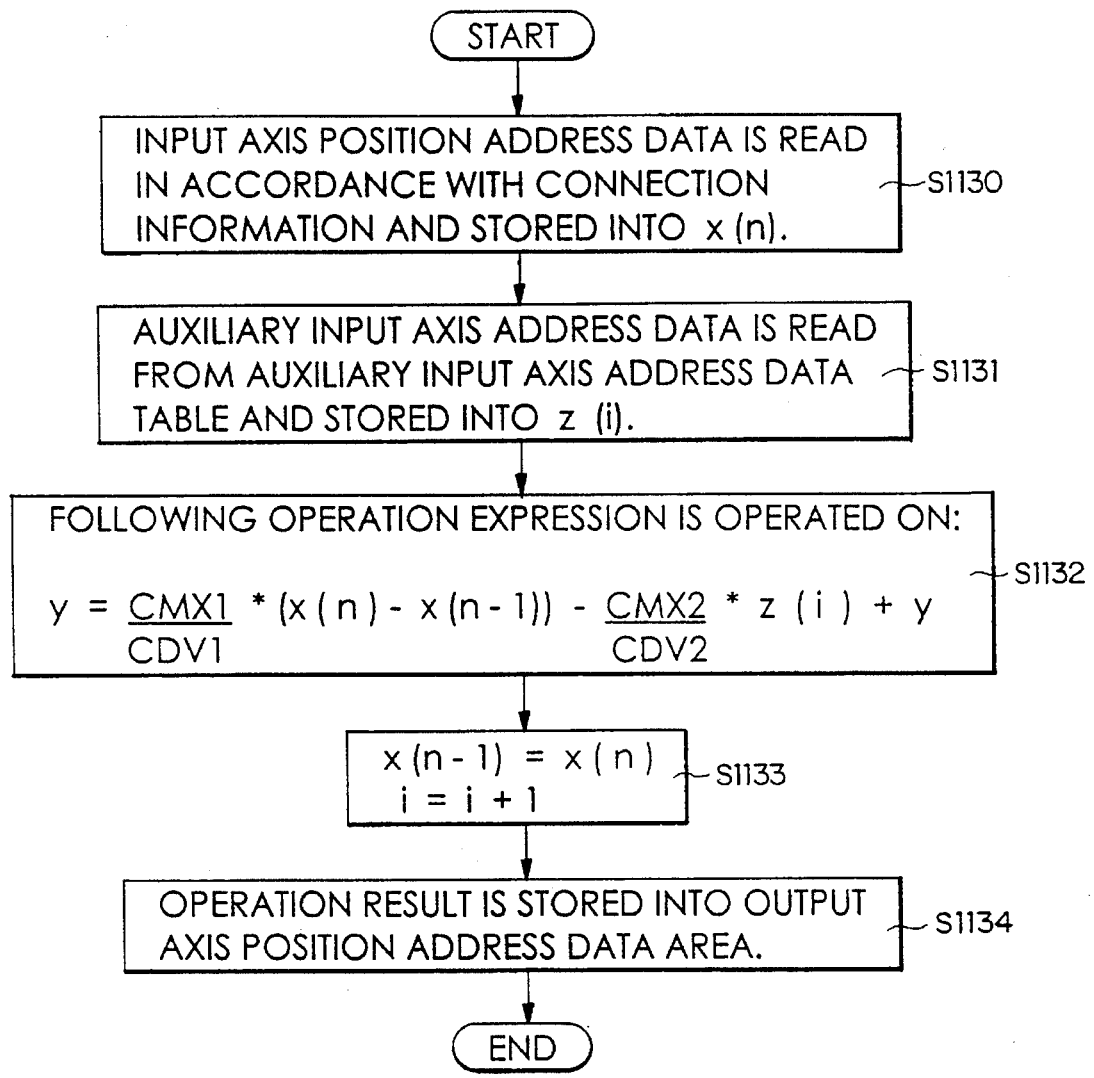
FIG. 65 is a flowchart illustrating a processing operation per predetermined time according to the thirteenth preferred embodiment of the invention.

Z: address data read from output address data table sequentially y: position information of output axis CMX1/CDV1: gear ratio between input axis and output axis CMX2/CDV2: gear ratio between auxiliary input axis and output axis Processing operation will now be described with 20 reference to FIG. 65. The position information generated by the virtual drive module 51, for example, is read to the input axis 52 in accordance with the connection information and stored into x(n) in the work area (step S1130). Address data is read sequentially from the auxiliary input axis-address data table 230, which stores address data (1 to n) to be output per predetermined time T, to the auxiliary input axis 57 and is stored into z(i) in the work area (step S1131). Operation is then performed in accordance with Expression 43 (step S1132). To prepare for the next processing, x(n−1) and i are updated (step S1133). The operation result is stored into the work area (step S1134). This processing is repeated at intervals of the predetermined time T to output data.

Figure 62:
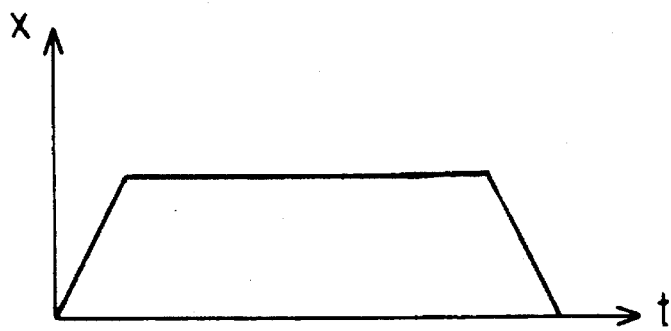
FIG. 62 shows position information x generated by a virtual drive module 1404 according to the thirteenth preferred embodiment of the invention.
Figure 63:
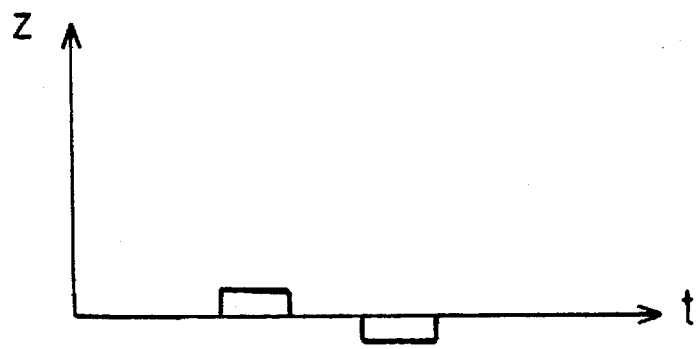
FIG. 63 shows address data z read sequentially from the auxiliary input axis output address data table according to the thirteenth preferred embodiment of the invention.
Figure 64:
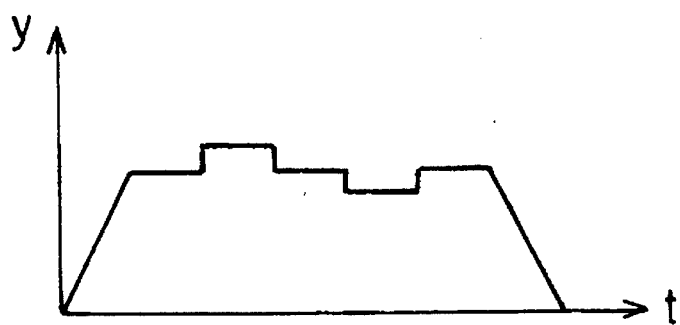
FIG. 64 shows output y of a virtual transmission module 1406 according to the thirteenth preferred embodiment of the invention.

The position information x generated by the virtual drive module 51 is shown in FIG. 62, the address data z read sequentially from the output axis address data table 59 is shown in FIG. 63, and the output y of the virtual transmission module 59 at that time is shown in FIG. 64.

Another embodiment of the virtual transmission module will be described. FIGS. 66 to 69 illustrate the virtual transmission module equivalent to a speed changer (hereinafter referred to as the "virtual speed changer module"). Although the virtual speed changer module does not operate independently and is used with other virtual mechanical modules, its independent operation will be described here.

FIG. 66 is a detail program memory map for the virtual speed changer module stored in the program memory 9 in the positioning apparatus 1. Referring to FIG. 66, the numeral 71 indicates a virtual speed changer module number area, 72 a connection information area storing the identification information of other virtual mechanical modules of which input axis position address data required for the virtual speed changer module to perform operation is stored, and 76 an auxiliary input axis connection information area which is not used by the virtual speed changer module. 250 indicates an area where an operation expression executed by the virtual speed changer module is stored, 251 a variable memory address area storing the speed change ratio information of the virtual speed changer module, and 252 a parameter area which is not employed by the virtual speed changer module.

FIG. 67 is a detail work memory map for the virtual speed changer module saved into the work memory 10 of the positioning apparatus 1. In FIG. 67, 253 to 256 indicate input axis position address data preceding value, its current value, output axis position address data preceding value, and its current value areas employed by the virtual speed changer module for the execution of operation.

FIG. 68 is a detail variable memory map for the virtual speed changer module stored in the variable memory 11 of the positioning apparatus 1. In FIG. 68, 257 indicates a speed change ratio information area of the virtual speed changer module.

Figure 69:
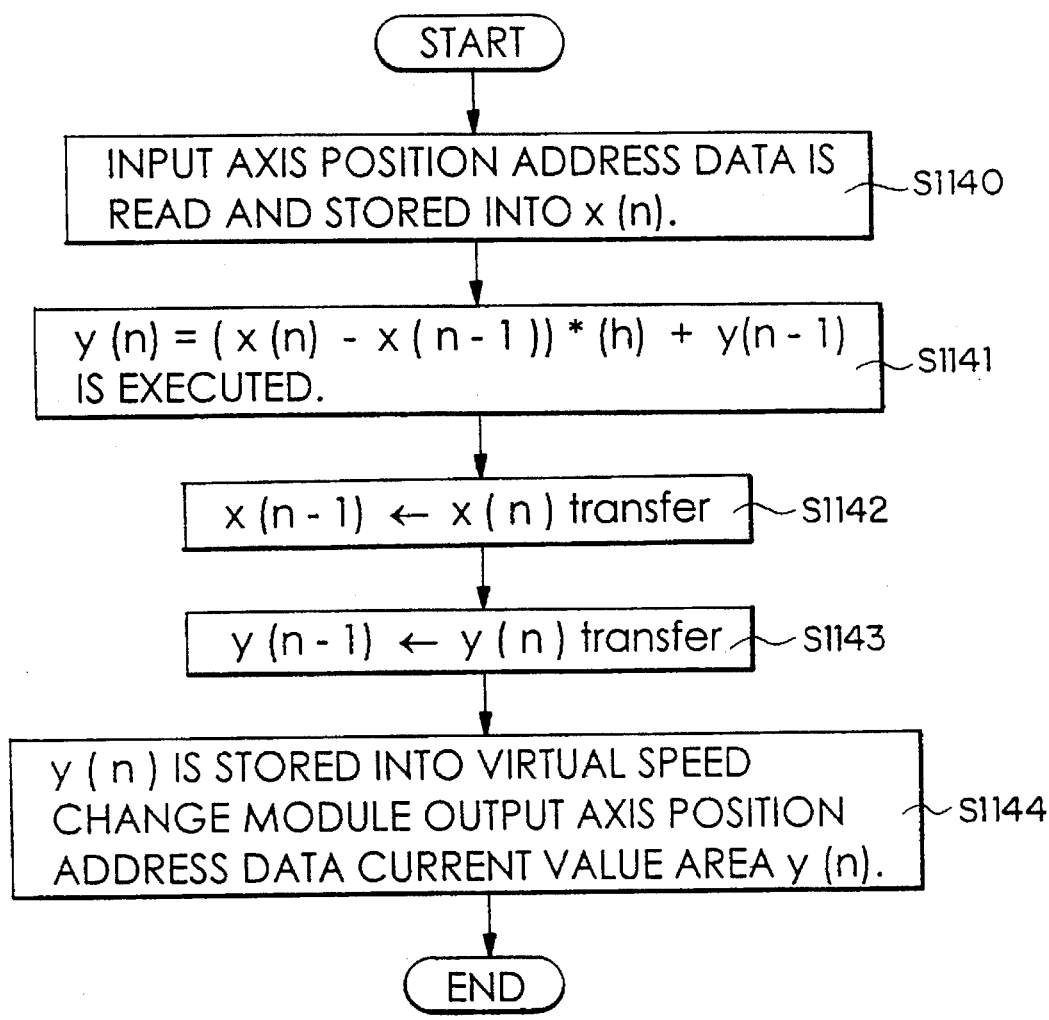
FIG. 69 is a flowchart illustrating the operation of the virtual speed changer module in the positioning apparatus according to the fourteenth preferred embodiment of the invention.

FIG. 69 is a flowchart for virtual speed changer module operation processing stored in the OS ROM 8 of the positioning apparatus 1 and executed by the CPU 7.

Operation will now be described. Internal processing executed by the CPU 7 of the positioning apparatus 1 through real-time processing will be described in accordance with the flowchart shown in FIG. 69. At step S1140, the virtual speed changer module connection information stored in the connection information area 72 of the program memory 9 assigned to the virtual speed changer module is read, and the input axis position address data is read from the other virtual mechanical module specified as the input of the virtual speed changer module and is transferred to the input axis position address data current value area x(n) 254 in the work memory 10.

Then, at step S1141, data x(n−1) stored in the input axis position address data preceding value area 253 of the work memory 10 is subtracted from data x(n) stored in the input axis position address data current value area 254 to calculate a travel per unit time. A variable memory address where the speed change ratio information of the virtual speed changer module is stored is then read from the variable area 251 in the program memory 9, a speed change ratio h 257 of the virtual speed changer module in the variable memory 11 corresponding to such address is read and multiplied by the result of such subtraction. Data y(n−1) stored in the output axis position address data preceding value area 255 of the work memory 10 is then added to the result of such multiplication to calculate an output axis position address data current value y(n).

Steps S1142 and S1143 are then executed, i.e., the input axis position address data current value x(n) in the work memory 10 is transferred to the input axis position address data preceding value x(n−1), and the output axis position address data current value y(n) calculated at the step S1141 is transferred to the output axis position address data preceding value y(n−1) to prepare for the next operation. At step S1144, the output axis position address data current value y(n) calculated at the step S1141 is stored into the output axis position address data current value area 256 of the work memory 10 as the output of the virtual speed changer module. By executing the flowchart in FIG. 69 by real-time processing, consecutive position address data resulting from multiplying the input axis position address data by the speed change ratio is output.

Another embodiment of the virtual speed changer module will be described. FIGS. 70 to 73 show another embodiment of the virtual speed changer module.

FIG. 70 is a detail program memory map for the virtual speed changer module stored in the program memory 9 of the positioning apparatus 1. In FIG. 70, the numerals 71, 72 and 76 are identical to those in FIG. 66, 260 indicates a virtual speed changer module operation expression area where an operation expression executed by the virtual speed changer module is stored, 261 a filter operation expression area where an operation expression employed by the virtual speed changer module to filter such operation result is stored, 262 a variable memory address area storing the speed change ratio information of the virtual speed changer module, 263 a variable memory address area storing the filter constant of the virtual speed changer module, and 264 a parameter area which is not employed by the virtual speed changer module.

FIG. 71 is a detail work memory map for the virtual speed changer module saved into the work memory 10 of the positioning apparatus 1. Referring to FIG. 71, 265 to 268 indicate input axis position address data preceding value, its current value, output axis position address data preceding value, and its current value areas employed by the virtual speed changer module for the execution of operation. 269 and 270 indicate after-filtered output axis position address data preceding value and its current value areas used when filter operation is carried out.

FIG. 72 is a detail variable memory map for the virtual speed changer module stored in the variable memory 11 of the positioning apparatus 1. In FIG. 72, 271 indicates a speed change ratio information area of the virtual speed changer module, and 272 a filter constant area of the virtual speed changer module.

Figure 73:
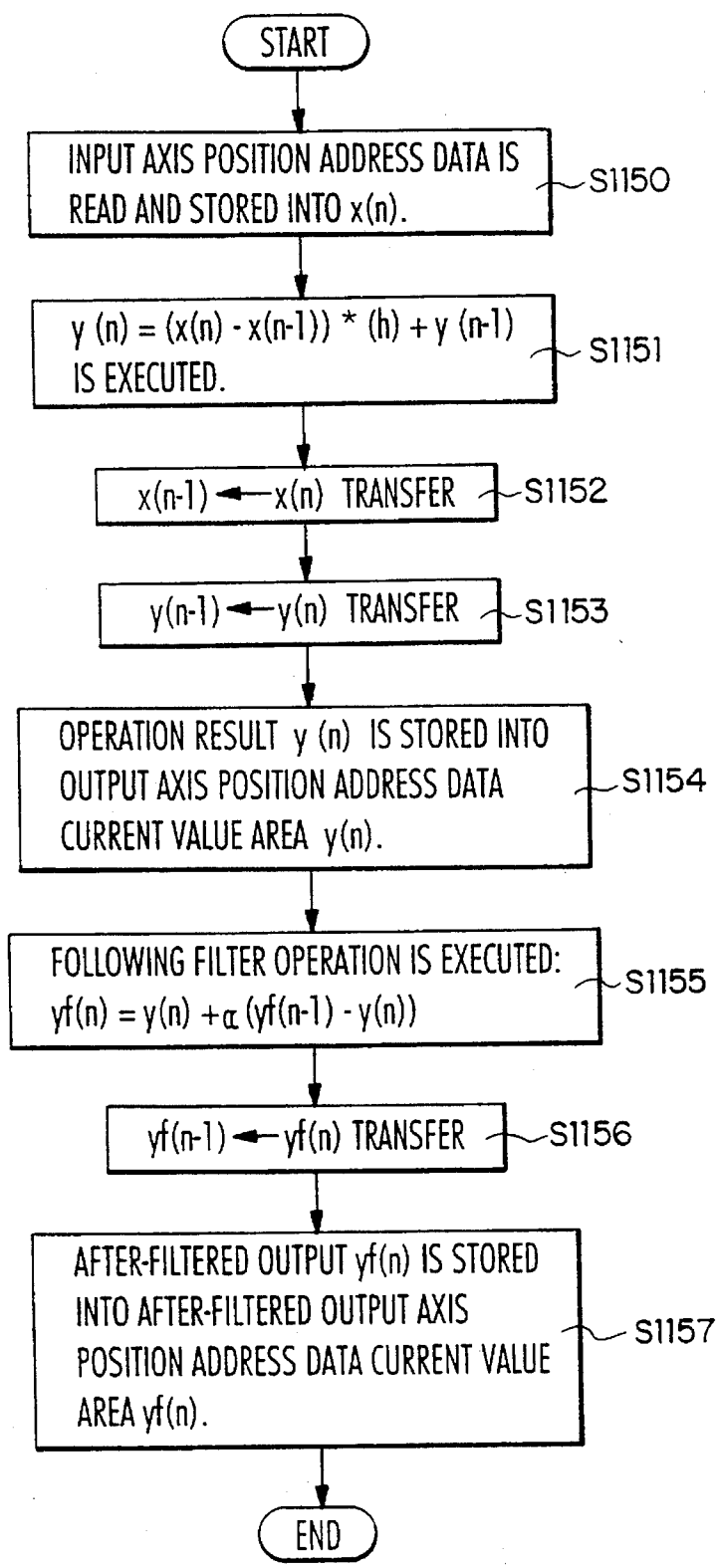
FIG. 73 is a flowchart illustrating the operation of the virtual speed changer module in the positioning apparatus according to the fifteenth preferred embodiment of the invention.

FIG. 73 is a flowchart for virtual speed changer module operation processing stored in the OS ROM 8 of the positioning apparatus 1 and executed by the CPU 7.

Operation will now be described. Internal processing executed by the CPU 7 of the positioning apparatus 1 through real-time processing will be described in accordance with the flowchart shown in FIG. 73. At step S1150, the virtual speed changer module connection information stored in the connection information area 72 of the program memory 9 assigned to the virtual speed changer module is read, and the input axis position address data is read from the other virtual mechanical module specified as the input of the virtual speed changer module and is transferred to the input axis position address data current value area x(n) 266 in the work memory 10.

Then, at step S1151, data x(n−1) stored in the input axis position address data preceding value area 265 of the work memory 10 is subtracted from data x(n) stored in the input axis position address data current value area 266 to calculate a travel per unit time. A variable memory address where the speed change ratio information of the virtual speed changer module is stored is then read from the variable 1 area 262 in the program memory 9, a speed change ratio h 271 of the virtual speed changer module in the variable memory 11 corresponding to such address is read and multiplied by the result of such subtraction. Data y(n−1) stored in the output axis position address data preceding value area 267 of the work memory 10 is then added to the result of such multiplication to calculate an output axis position address data current value y(n).

Steps S1152 and S1153 are then executed, i.e., the input axis position address data current value x(n) in the work memory 10 is transferred to the input axis position address data preceding value x(n−1), and the output axis position address data current value y(n) calculated at the step S1151 is transferred to the output axis position address data preceding value y(n−1) to prepare for the next operation. At step S1154, the output axis position address data current value y(n) calculated at the step S1151 is stored into the output axis position address data current value area 268 of the work memory 10 as the output of the virtual speed changer module.

Then, at step S1115, data y(n) stored in the output axis position address data current value area 268 of the work memory 10 as the output of the virtual speed changer module is subtracted from data y(n−1) stored in the after-filtered output axis position address data preceding value area 269 of the work memory 10, a variable memory address where the filter constant of the virtual speed changer module is stored is then read from the variable 2 area 263 in the program memory 9, a filter constant is read from the virtual speed changer module filter constant area 272 of the variable memory 11 corresponding to such address is read, multiplied by the result of such subtraction, and added to such output axis position address data current value y(n), thereby calculating an after-filtered output axis position address data current value yf(n). It will be recognized that the filter operation expression stored in the area 261 of the program memory 9 is not limited to the general example indicated here and may be a filter operation expression in another method.

Step S1156 is then executed, i.e., the after-filtered output axis position address data current value yf(n) calculated at the step S1155 is transferred to the after-filtered output axis position address data preceding value yf(n−1). At step S1157, the after-filtered output axis position address data current value yf(n) calculated at the step S1155 is stored into the after-filtered output axis position address data current value area 270 of the work memory 10 as the output of the virtual speed changer module. By executing the flowchart in FIG. 73 by real-time processing, filtered position address data found by multiplying the input axis position address data by the speed change ratio and having a time constant is output.

Figure 74:
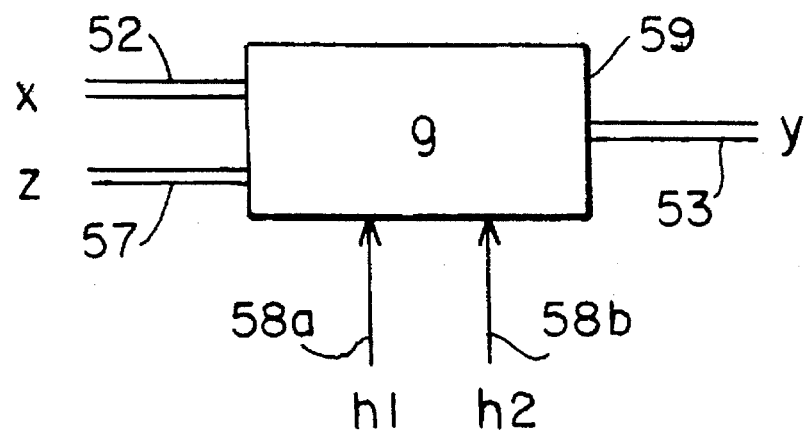
FIG. 74 illustrates a virtual cam module where reciprocative cam operation is performed continuously according to a sixteenth preferred embodiment of the invention.

Another embodiment of the virtual transmission module will be described. The virtual transmission module equivalent to a cam (hereinafter referred to as the "virtual cam module") will be described. FIG. 74 shows the virtual cam module, wherein the numeral 52 indicates an input axis, 57 an auxiliary input axis, 53 an output axis, 58a a stroke value set value h1, 58b a stroke lower limit position set value h2, and 59 a black box including functions (procedures).

Figure 75:
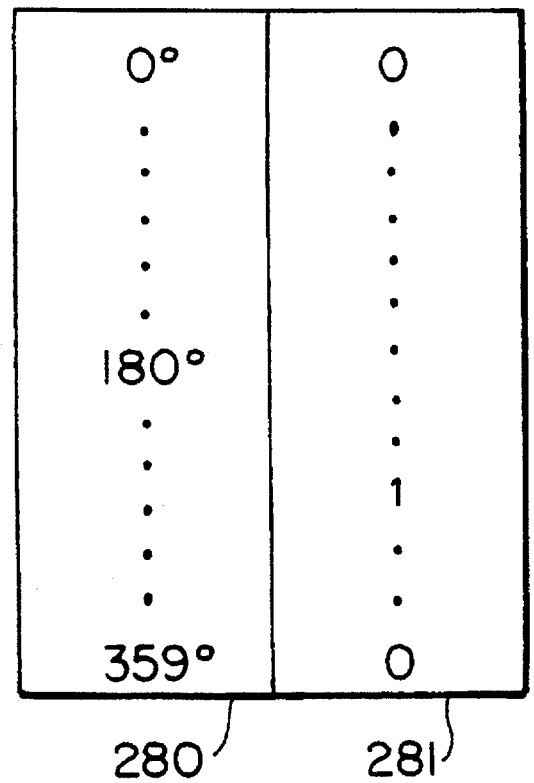
FIG. 75 is a memory map employed when the cam shape data table of the virtual cam module shown in FIG. 74 is stored into a memory according to the sixteenth preferred embodiment of the invention.

FIG. 75 shows a memory map where a cam shape data table is stored in the program memory 9, wherein 280 indicates a position address within one revolution of a virtual cam shaft, and 281 an operation value of a cam corresponding to such position address. The operation value of the cam indicates a position value assuming that the stroke bottom dead point of the cam operation is 0 and the stroke top dead point thereof is 1, and changes between 0 and 1 within one revolution of the virtual cam shaft. The position addresses within one revolution of the virtual cam shaft have been defined by dividing one revolution at equal intervals (e.g., 2000).

Figure 76:
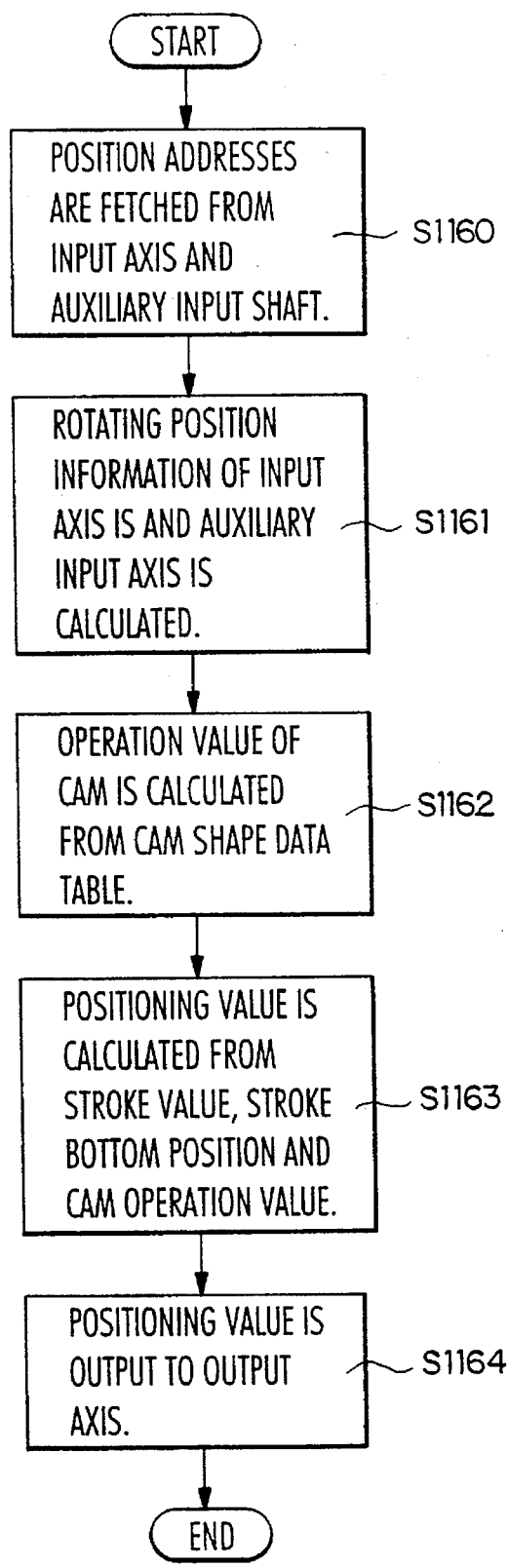
FIG. 76 is a flowchart (part 1) illustrating a function (procedure) included in the virtual cam module shown in FIG. 74 according to the sixteenth preferred embodiment of the invention.
Figure 77:
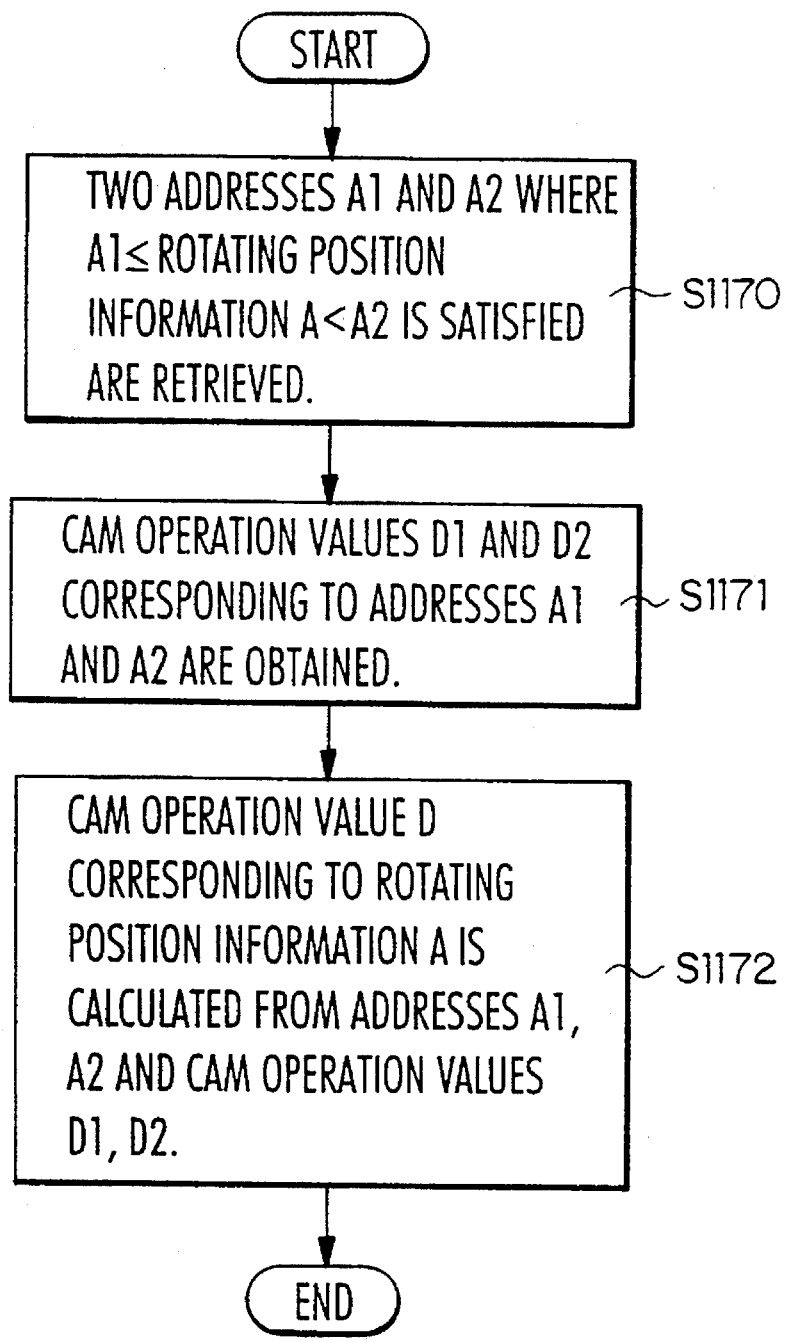
FIG. 77 is a flowchart (part 2) illustrating a function (procedure) included in the virtual cam module shown in FIG. 74 according to the sixteenth preferred embodiment of the invention.

FIGS. 76 and 77 are flowcharts indicating the functions (procedures) included in the black box 59.

FIG. 78 shows a memory map where the virtual cam module is stored in the program memory 9, wherein 71 indicates a module number, and 72 connection information in accordance with which the position address of the input axis is referred to. 76 indicates auxiliary input axis connection information in accordance with which the position address of the auxiliary input axis is referred to. 282 indicates operation expressions for finding a positioning value output to the output axis 53 and stores the functions (procedures) indicated in the flowcharts in FIGS. 76 and 77. 283 indicates a variable area which stores the stroke value set value 58a and stroke lower limit set value 58b.

Operation will now be described. The virtual cam module shown in FIG. 74 has the position address of the input axis 52 as a main input and that of the auxiliary input axis 57 as an auxiliary input. As the rotating position information of the virtual cam shaft, the position address from the other virtual mechanical module is input to the input axis 52. Also, as an offset value for compensating the rotating position information of the virtual cam shaft input from the input axis 52, the command address of operation written in a conventional positioning program format is input to the auxiliary input axis 57.

The virtual cam module outputs the positioning value for reciprocative cam operation to the output axis 53 after calculating it from the inputs, the stroke value set value 58a and stroke lower limit position set value 58b stored beforehand in the variable area 283, and the cam shape data table shown in FIG. 75 stored in the program memory 9. The output positioning value for reciprocative cam operation is passed to the output module connected to the next stage, thereby driving the servo motor.

The calculating method of the output positioning value for reciprocative cam operation included in the black box 59 as the functions (procedures) will now be described with reference to the flowcharts in FIGS. 76 and 77. In FIG. 76, the position address x of the input axis and the position address z of the auxiliary input axis are first fetched (S1160), and the sum of these addresses is then converted into the position address within one revolution (S1161). The position address within one revolution can be represented by a remainder found by dividing the sum of the position addresses of the input axis and auxiliary input axis by one revolution (360°). The value thus obtained is the rotating position information of the virtual cam shaft. The operation value of the cam corresponding to the rotating position information is then found with reference to the cam shape data table (S1162). This procedure is illustrated in FIG. 77 in detail.

In FIG. 77, position addresses A1 and A2 within one revolution of the virtual cam shaft, which satisfy the relationship of $A1 \leq A < A2$ in regards to the rotating position information A of the virtual cam shaft, are first retrieved from the cam shape data table in FIG. 75 (S1170). The operation values of the cam corresponding to the position addresses A1 and A2 within one revolution are obtained from the cam shape data table in FIG. 75 and defined as D1 and D2 (S1171). The operation value D of the cam corresponding to the rotating position information A of the virtual cam shaft is calculated from the position addresses A1 and A2 within one revolution and the operation values D1 and D2 of the cam as follows (S1172):

$$D=D1+(D2-D1)*(A-A1)/(A2-A1)$$

This is a proportional distribution calculation performed on the basis of the position addresses within one revolution because the cam operation values stored in the cam shape data table take discrete values with respect to the position addresses within one revolution of the virtual cam shaft.

The positioning value for continuously performing the reciprocative cam operation is calculated as follows from the cam operation value D corresponding to the rotating position information of the virtual cam shaft found in the procedure shown in FIG. 77 and the stroke value set value h1 and stroke lower limit set value h2 stored beforehand in the variable area (FIG. 76, S1163):

$$(h1 \times D)+h2$$

This is a reciprocating motion between the lower limit position h2 and upper limit position (h1+h2) of the cam operation. The positioning value found is output to the output axis (S1164) and passed to the output module connected to the next stage, thereby driving the servo motor.

In this embodiment, the cam operation stroke value and stroke lower limit position can be changed easily by rewriting from the external peripheral 6 the stroke value set value 58a and stroke lower limit position set value 58b stored beforehand in the variable area.

Also, in this embodiment, switching operation to a cam operation that will make a different motion can be carried out easily by selectively using any of a plurality of cam shape data tables shown in FIG. 75, if such table have been registered from the external peripheral 6.

Further, in this embodiment, the velocity characteristic and acceleration/deceleration characteristic of the cam operation can be changed easily by correcting and re-registering the cam shape data table from the external peripheral 6.

Further, in this embodiment, if an object to be synchronized is at a stop and the position address of the input axis 52 remains unchanged, an independent cam operation can be performed, irrespective of the object to be synchronized, by updating the command address of the operation written in the conventional format of positioning program and thereby changing the position address of the auxiliary input axis 57.

Figure 79:
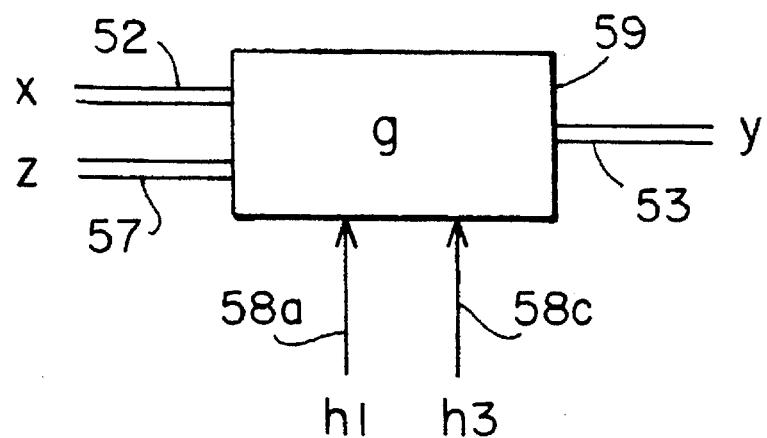
FIG. 79 shows a virtual cam module used when unidirectional position-feeding cam operation is performed continuously according to a seventeenth preferred embodiment of the invention.

Another embodiment of the virtual cam module will be described. FIG. 79 shows the virtual cam module, wherein the numeral 52 indicates an input axis, 57 an auxiliary input axis, 53 an output axis, 58a a stroke value set value h1, 58c a starting address of position feeding cam operation on virtual cam shaft h3, and 59 a black box including a function (procedure).

Figure 80:
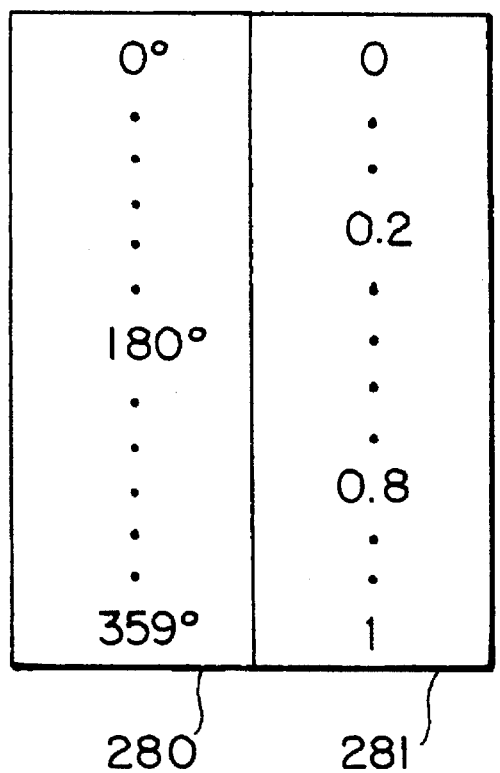
FIG. 80 is a memory map employed when the cam shape data table of the virtual cam module shown in FIG. 79 is stored into a memory according to the seventeenth preferred embodiment of the invention.

FIG. 80 shows a memory map where a cam shape data table is stored in the program memory 9, wherein 280 indicates a position address within one revolution of a virtual cam shaft, and 281 an operation value of a cam corresponding to such position address. The operation value of the cam indicates a position value assuming that the stroke bottom dead point of the cam operation is 0 and the stroke top dead point thereof is 1, and changes between 0 and 1 within one revolution of the virtual cam shaft. The position addresses within one revolution of the virtual cam shaft have been defined by dividing one revolution at equal intervals (e.g., 2000).

Where a unidirectional position feeding cam operation is to be performed, the cam operation value changes greatly at the starting point (end point) of the position feeding cam operation, without taking a consecutive value, in the cam shape data table. The position address within one revolution of the virtual cam shaft at this point is defined as the starting address 58c of the position feeding cam operation on the virtual cam shaft (0° in the example of FIG. 80).

Figure 81:
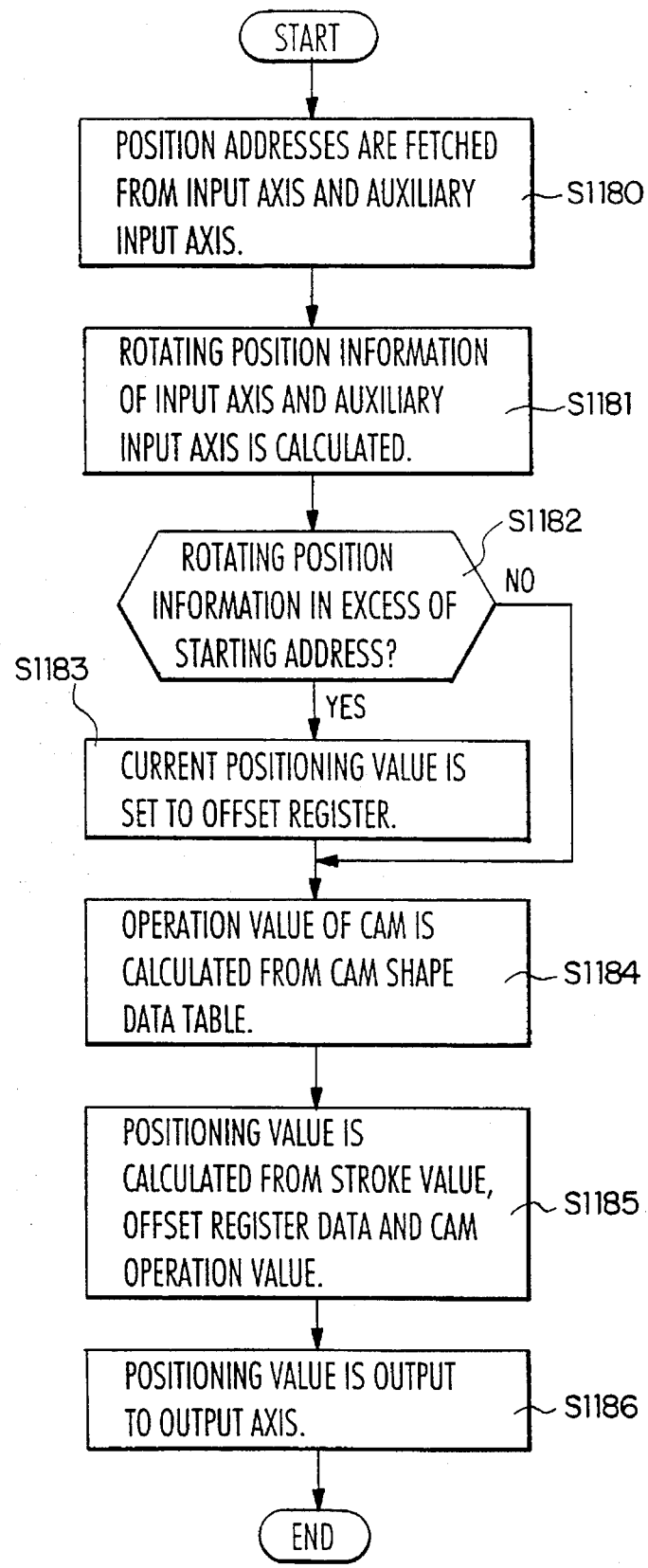
FIG. 81 is a flowchart showing a function (procedure) included in the virtual cam module shown in FIG. 79 according to the seventeenth preferred embodiment of the invention.

FIG. 81 is a flowchart indicating the function (procedure) included in the black box 59.

FIG. 82 shows a memory map the virtual cam module is stored in the program memory 9, wherein 71 indicates a module number, and 72 connection information in accordance with which the position address of the input axis is referred to. 76 indicates auxiliary input axis connection information in accordance with which the position address of the auxiliary input axis is referred to. 292 indicates operation expressions for finding a positioning value output to the output axis 53 and stores the function (procedure) indicated in the flowchart in FIG. 81. 293 indicates a variable area which stores the stroke value set value 58a and position feeding cam operation starting address on virtual cam shaft 58c.

FIG. 83 shows a memory map of the work memory 10 employed when finding the positioning value output to the output axis 53. 294 indicates an offset register.

Operation will now be described. The virtual cam module shown in FIG. 79 has the position address of the input axis 52 as a main input and that of the auxiliary input axis 57 as an auxiliary input. As the rotating position information of the virtual cam shaft, the position address from the other virtual mechanical module is input to the input axis 52. Also, as an offset value for compensating the rotating position information of the virtual cam shaft input from the input axis 52, the command address of operation written in a conventional format of positioning program is input to the auxiliary input axis 57.

The virtual cam module outputs the positioning value for unidirectional position feeding cam operation to the output axis 53 after calculating it from such inputs, the stroke value set value 58a and position feeding cam operation starting address on virtual cam shaft 58c stored beforehand in the memory, and the cam shape data table shown in FIG. 80 stored in the program memory 9. The output positioning value for unidirectional position feeding cam operation is passed to the output module connected to the next stage, thereby driving the servo motor.

The calculating method of the output positioning value for unidirectional position feeding cam operation included in the black box 59 as the function (procedure) will now be described with reference to the flowchart in FIG. 81.

In FIG. 81, the position address x of the input axis and the position address z of the auxiliary input axis are first fetched (S1180), and the sum of such addresses is then converted into the position address within one revolution (S1181). The position address within one revolution can be represented by a remainder found by dividing the sum of the position addresses of the input axis and auxiliary input axis by one revolution (360°). The value thus obtained is the rotating position information of the virtual cam shaft.

It is then determined whether or not the rotating position information of the virtual cam shaft has exceeded the position feeding operation starting address on virtual cam shaft h3 (S1182). If it has exceeded, the positioning value currently output to the output axis is set to the offset register 294 on the work memory 10 (S1183). If it has not exceeded, the data in the offset register 294 is not updated.

The operation value of the cam corresponding to the rotating position information of the virtual cam shaft is then found with reference to the cam shape data table (S1184). This procedure has already been described in FIG. 77.

The positioning value for continuously performing the unidirectional position feeding cam operation is calculated as (h1XD)+E from the cam operation value D corresponding to the rotating position information of the virtual cam shaft found, the stroke value set value h1 stored beforehand in the variable area, and data E in the offset register on the work memory 10 (FIG. 81, S1185). This is a continuous unidirectional motion which performs cam operation wherein a position feeding stroke value per operation is h1. The positioning value found is output to the output axis (S1186) and passed to the output module connected to the next stage, thereby driving the servo motor.

In this embodiment, the cam operation stroke value can be changed easily by rewriting from the external peripheral 6 the stroke value set value 58a stored beforehand in the variable area.

Also, in this embodiment, switching operation to a cam operation that will make a different motion can be done easily by selectively using any of a plurality of cam shape data tables shown in FIG. 80, if the cam shape data tables and position feeding cam operation starting addresses on virtual cam shaft 58c have been registered from the external peripheral 6.

Further, in this embodiment, the velocity characteristic and acceleration/deceleration characteristic of the cam operation can be changed easily by correcting and re-registering the cam shape data table and position feeding cam operation starting address on virtual cam shaft 58c from the external peripheral 6. At this time, if there is provided a function which allows the position feeding cam operation starting address on virtual cam shaft to be automatically retrieved and registered from the cam shape data table by the external peripheral 6, the operator can save the time and labor of setting the starting address.

Further, in this embodiment, if an object to be synchronized is at a stop and the position address of the input axis 52 remains unchanged, an independent cam operation can be performed, irrespective of the object to be synchronized, by updating the command address of the operation written in the conventional format of positioning program and thereby changing the position address of the auxiliary input axis 57.

Figure 84:
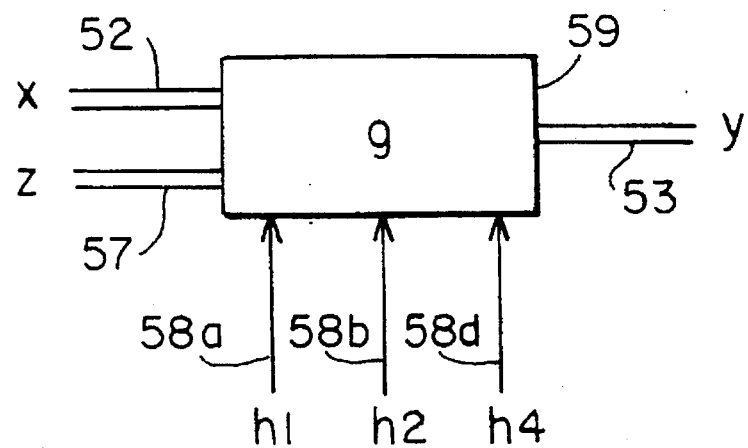
FIG. 84 shows a virtual cam module used when the stroke value of cam operation is changed during apparatus operation according to an eighteenth preferred embodiment of the invention.

Another embodiment of the virtual cam module will be described. FIG. 84 shows the virtual cam module, wherein the numeral 52 indicates an input axis, 57 an auxiliary input axis, 53 an output axis, 58a a stroke value set value h1, 58b a stroke lower limit position set value h2, 58d a virtual cam shaft updating address for updating the stroke value of the cam operation, and 59 a black box including a function (procedure).

Figure 85:
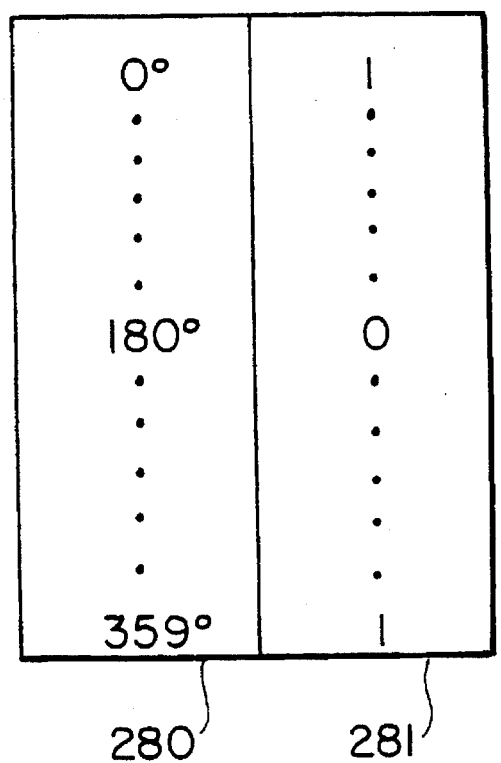
FIG. 85 is a memory map employed when the cam shape data table of the virtual cam module shown in FIG. 84 is stored into a memory according to the eighteenth preferred embodiment of the invention.

FIG. 85 shows a memory map where a cam shape data table is stored in the program memory 9, wherein 280 indicates a position address within one revolution of a virtual cam shaft, and 281 an operation value of a cam corresponding to such position address.

Since a set value must be fetched at the stroke bottom dead point to change the stroke value during cam operation, the position address within one revolution of the virtual cam shaft corresponding to the stroke bottom dead point is defined as the virtual cam shaft updating address for updating the stroke value of the cam operation (180° in the example of FIG. 85).

Figure 86:
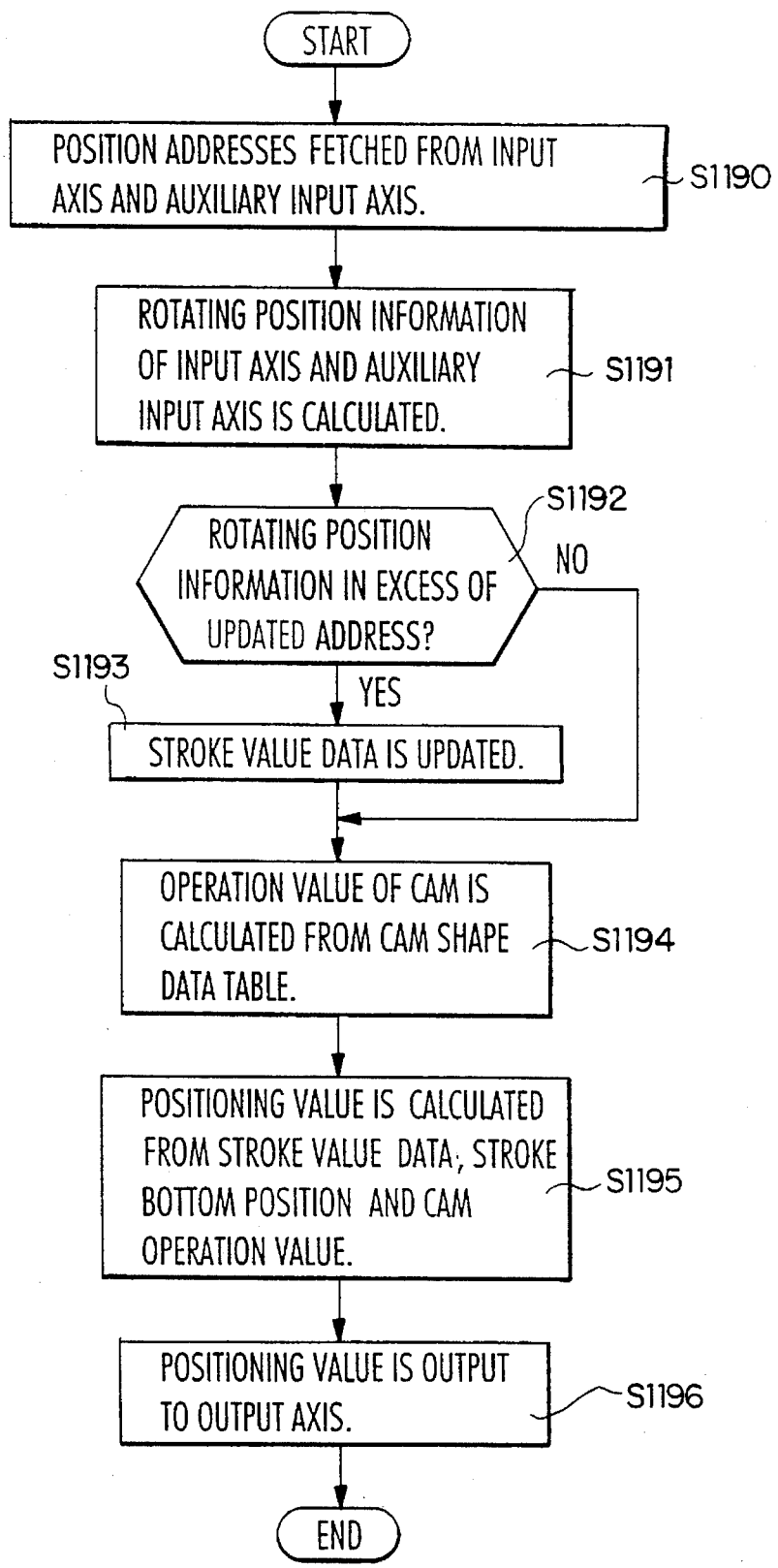
FIG. 86 is a flowchart showing a function (procedure) included in the virtual cam module shown in FIG. 84 according to the eighteenth preferred embodiment of the invention.

FIG. 86 is a flowchart indicating the function (procedure) included in the black box 59.

FIG. 87 shows a memory map where the virtual cam module is stored in the program memory 9, wherein 71 indicates a module number, and 72 connection information in accordance with which the position address of the input axis is referred to. 76 indicates auxiliary input axis connection information in accordance with which the 5 position address of the auxiliary input axis is referred to. 302 indicates operation expressions for finding a positioning value output to the output axis 53 and stores the function (procedure) indicated in the flowchart in FIG. 86. 303 indicates a variable area which stores the stroke value set value 58a, stroke lower limit position set value 58b, and virtual cam shaft updating address for updating cam operation stroke value 58d.

FIG. 88 shows a memory map of the work memory 10 employed when finding the positioning value output to the output axis 53. 304 indicates stroke value data.

Operation will now be described. The virtual cam module shown in FIG. 84 has the position address of the input axis 52 as a main input and that of the auxiliary input axis 57 as an auxiliary input. As the rotating position information of the virtual camshaft, the position address from the other virtual mechanical module is input to the input axis 52. Also, as an offset value for compensating the rotating position information of the virtual cam shaft input from the input axis 52, the command address of operation written in a conventional format of positioning program is input to the auxiliary input axis 57.

The virtual cam module outputs the positioning value for reciprocative cam operation to the output axis 53 after calculating it from the inputs, the stroke value set value 58a, stroke lower limit position set value 58b and virtual cam shaft updating address for updating cam operation stroke value 58d stored beforehand in the memory, and the cam shape data table shown in FIG. 85 stored in the program memory 9. The output positioning value for reciprocative cam operation is passed to the output module connected to the next stage, thereby driving the servo motor.

The calculating method of the output positioning value for reciprocative cam operation included in the black box 59 as the function (procedure) will now be described with reference to the flowchart in FIG. 86.

In FIG. 86, the position address x of the input axis and the position address z of the auxiliary input axis are first fetched (S1190), and the sum of these addresses is then converted into the position address within one revolution (S1191). The position address within one revolution can be represented by a remainder found by dividing the sum of the position addresses of the input axis and auxiliary input axis by one revolution (360°). The value thus obtained is the rotating position information of the virtual cam shaft.

It is then determined whether or not the rotating position information of the virtual cam shaft has exceeded the virtual cam shaft updating address for updating cam operation stroke value 58d (S1192). If it has exceeded, the stroke value set value 58a in the variable area set from an external device is updated to the stroke value data 304 on the work memory 10 (S1193). If it has not exceeded, the stroke value data 304 is not updated.

The cam operation value corresponding to the rotating position information of the virtual cam shaft is then found with reference to the cam shape data table (S1194). This procedure is as described in FIG. 77.

The positioning value for continuously performing the reciprocative cam operation is calculated as (FXD)+h2 from the cam operation value D corresponding to the rotating position information of the virtual cam shaft found, the stroke value data F on the work memory 10, and the stroke lower limit position set value h2 stored in the variable area, (FIG. 86, S1195). This is a reciprocative motion between the cam operation lower limit position ha and upper limit position (F+h2), and its stroke value F is updated per stroke even during the cam operation. The positioning value found is output to the output axis (S1196) and passed to the output module connected to the next stage, thereby driving the servo motor.

While this embodiment is an example applied to continuous reciprocative cam operation, it may also be applied to continuous unidirectional position feeding cam operation. In this case, it will only be necessary to add the processing of updating the stroke value set value (processing indicated at the S1192 and S1193 in FIG. 86) before the step of calculating the positioning value (FIG. 81, S1185).

Also, in this embodiment, if there is provided a function which allows the virtual cam shrift updating address for updating cam operation stroke value to be automatically retrieved and registered from the cam shape data table by the external peripheral 6, the operator can save the time and labor of setting the updating address.

An embodiment of the output module will be described. FIG. 89 shows the memory map where the output module is stored in the program memory 9, wherein 71, 72 and 121 are identical to those in FIG. 9 illustrating the first embodiment, 310 indicates operation expressions for finding a servo output Y and a peripheral velocity P as an auxiliary output, i.e., Expressions 48 and 49, respectively. 311, 312 and 313 indicate parameters. 311 is an actually output servo output axis number, 312 a roller diameter L, and 313 the number of pulses per output axis revolution, i.e., roller revolution.

FIG. 90 shows a memory map of the work memory 10 which saves data required for the output module to operate on the peripheral velocity as an auxiliary output, wherein 125 and 126 are identical to those in FIG. 24 illustrating the sixth embodiment.

Servo output:

$$Y=x(n) \qquad \text{Ex. 48}$$

Auxiliary output:

$$P=(x(n)-x(n-1))/N1*\pi L*1(m/min) \qquad \text{Ex. 49}$$

where

N1: number of pulses per output axis revolution, i.e., roller revolution

π: circle ratio

1: constant

L: roller diameter

Figure 91:
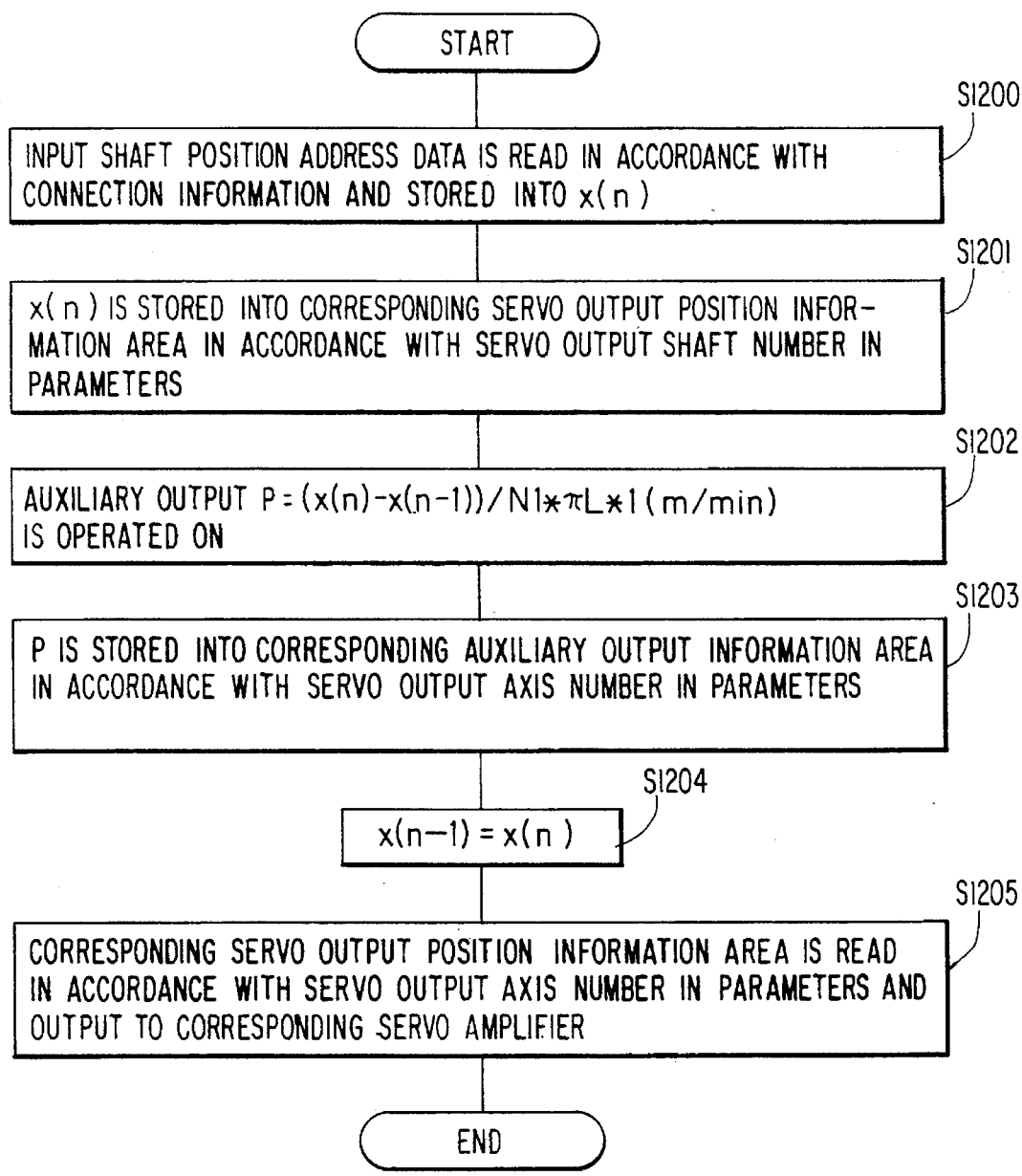
FIG. 91 is a flowchart showing the operation of the output module in the positioning apparatus according to the nineteenth preferred embodiment of the invention.

FIG. 91 is an operation flowchart for the output module and is a part of the real-time interrupt processing operation shown in FIG. 13.

Operation will now be described with reference to FIG. 91. Although the output module does not operate independently and is used with the other virtual mechanical modules, its independent operation will be described here. When the output module is implemented, the input axis position address data is read in accordance with the connection information 72 and is stored into the x(n) area 126 at step S1200. Then, at step S1201, x(n) is stored into the corresponding servo output position information area 91 (FIG. 11) in accordance with the servo output axis number 311 in the parameter area.

At step S1202, the peripheral velocity of the roller as the auxiliary output P of the output module is operated on in accordance with Expression 49, and at step S1203, the operation result P is stored into the corresponding auxiliary output information area 90 in accordance with the servo output axis number 311 in the parameter area. Then, at step S1204, the input axis position address data current value x(n) is defined as the preceding value x(n−1) and stored into the input axis position address data preceding value area 125 to prepare for the next operation.

Finally, at step S1205, the corresponding servo output axis position information area 91 is read in accordance with the servo output axis number 311 in the parameter area and that data is output to the corresponding servo amplifier. This flowchart is then terminated.

Another embodiment of the output module will be described. FIG. 92 shows the memory map where the output module is stored in the program memory 9, wherein 71, 72 and 121 are identical to those in FIG. 23 illustrating the sixth embodiment, 320 indicates operation expressions for finding a servo output Y and a position address P of a work table as an auxiliary output, i.e., Expressions 50 and 52, respectively. 311, 321 and 322 indicate parameter area. 311 is an actually output servo output axis number, 321 a ballscrew pitch B1, 322 ballscrew backlash B2, and 323 the number of pulses per output axis revolution N1, i.e., ballscrew revolution.

FIG. 93 shows a memory map of the work memory 10 which saves data required for the output module to operate on the servo output and the work table position address as the auxiliary output, wherein 125 and 126 are identical to those in FIG. 24 illustrating the sixth embodiment.

Servo output:

$$Y=x(n)+b \qquad \text{Ex. 50}$$

where b: variable indicating backlash compensation value

Supposing that b=B(B3, u0, u),

B( ): backlash compensation processing function

B3: value resulting from converting ballscrew backlash B2 into pulses $$B3=B2*N1/B1 \text{ (pulses)} \qquad \text{Ex. 51}$$

where B2≠0

N1: number of pulses per output axis revolution, i.e., roller revolution

B1: ballscrew pitch u0: backlash valid direction of rotation u: current direction of rotation Auxiliary output:

$$P=(x(n)-z)*B1/N1 \qquad \text{Ex. 52}$$

where

N1: number of pulses per output axis revolution z: zero position offset

The variable u0 (backlash valid direction of rotation) in Expression 50 and the variable z (zero position offset) in Expression 52 are determined when a zero position match is made in the work table.

Figure 94:
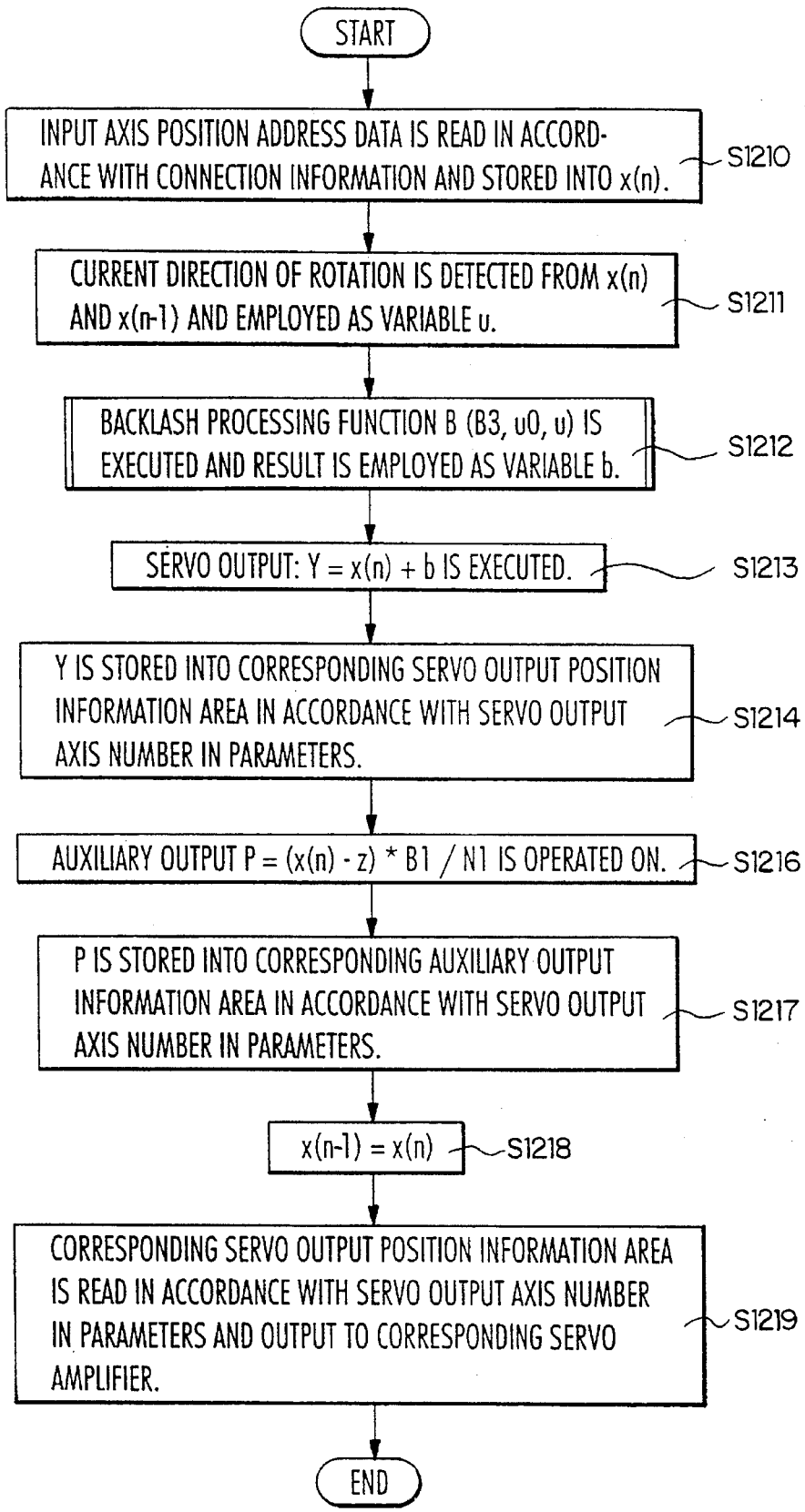
FIG. 94 is a flowchart showing the operation of the output module in the positioning apparatus according to the twentieth preferred embodiment of the invention.

FIG. 94 is a backlash compensation processing flowchart for the output module and is a part of the real-time interrupt processing operation shown in FIG. 13.

Operation will now be described with reference to FIG. 94. When the output module is implemented, the input axis position address data is read in accordance with the connection information 72 and is stored into the x(n) area 126 at step S1210.

Figure 95:
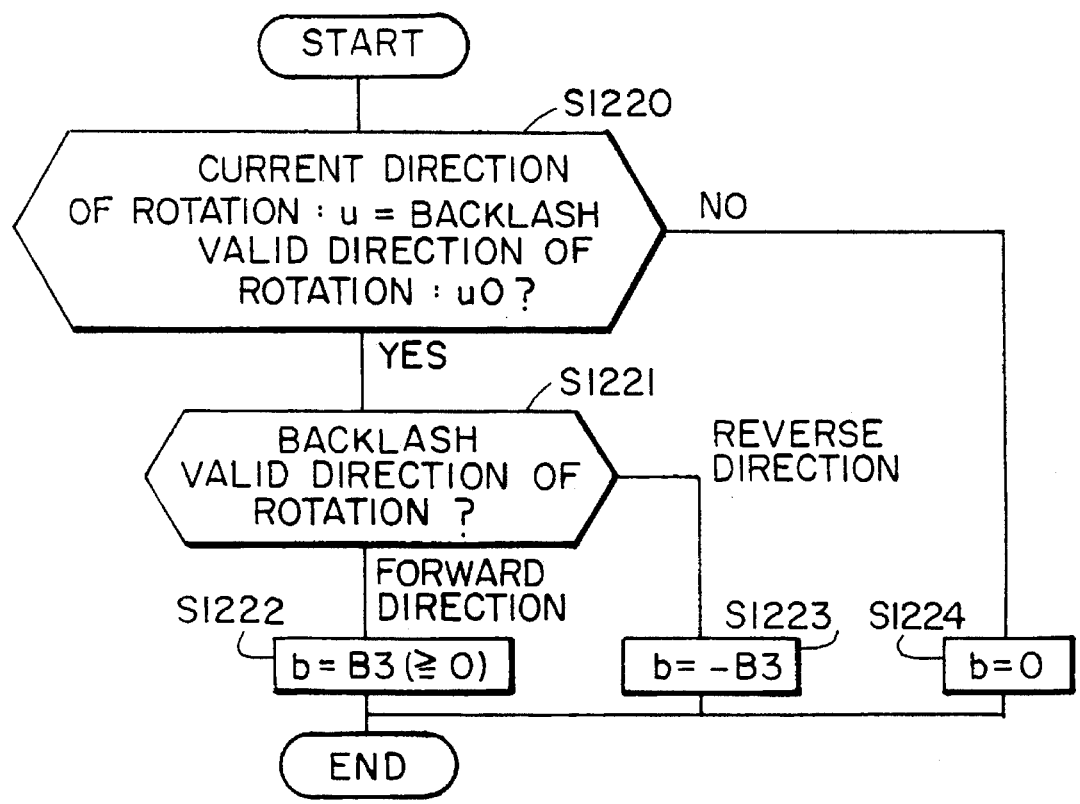
FIG. 95 is a flowchart showing the backlash compensation processing of the output module in the positioning apparatus according to the twentieth preferred embodiment of the invention.

Then, at step S1211, the current direction of rotation is detected from the input axis position address current value x(n) and preceding value x(n−1), and is defined as the variable u. At step S1212, the backlash compensation processing flowchart shown in FIG. 95 is executed, and the result is defined as the variable b which indicates a current backlash compensation value. Then, at step S1213, operation is performed in accordance with Expression 50, and at step S1214, the operation result Y is stored into the corresponding servo output position information area 91 (FIG. 11) in accordance with the servo output axis number 311 in the parameter area.

At step S1216, the position address of the work table fitted to the ballscrew as the auxiliary output P of the output module is operated on in accordance with Expression 52, and at step S1217, the operation result P is stored into the corresponding auxiliary output information area 90 in accordance with the servo output axis number 311 in the parameter area. Then, at step S1218, the input axis position address data current value x(n) is defined as the preceding value x(n−1) and stored into the input axis position address data preceding value area 125 to prepare for the next operation.

Finally, at step S1219, the corresponding servo output axis position information area 91 is read in accordance with the servo output axis number 311 in the parameter area and that data is output to the corresponding servo amplifier. This flowchart is then terminated.

The backlash compensation processing will now be described in reference to the flowchart shown in FIG. 95. When this flowchart is executed, it is determined at step S1220 whether or not the current direction of rotation u is identical to the backlash valid direction of rotation u0. If it is not identical, the processing moves to step S1224. If identical, it is determined at step S1221 whether the backlash valid direction of rotation is forward or reverse. If it is forward, the value B3 resulting from converting the ballscrew backlash B2 set in the parameter area into pulses is assigned to the variable b indicating the current backlash compensation value. If reverse, the variable b is defined as −B3 at step S1223. If the current direction of rotation is not identical to the backlash valid direction of rotation, the variable b is defined as 0 and this flowchart is then terminated. The operation expression for converting the ballscrew backlash B2 into pulses is represented by Expression 51.

Another embodiment of the output module will be described. FIG. 96 shows the memory map where the output module is stored in the program memory 9, wherein 71, 72 and 121 are identical to those in FIG. 23 illustrating the sixth embodiment, 330 indicates operation expressions for finding a servo output Y and an angle P as an auxiliary output, i.e., Expressions 53 and 54, respectively. 311 and 331 indicate parameters. 311 is an actually output servo output axis number, and 331 the number of pulses per output axis revolution, i.e., rotary table revolution.

FIG. 97 shows a memory map of the work memory 10 which saves data required for the output module to operate on the angle as the auxiliary output, wherein 126 is identical to the one in FIG. 24 illustrating embodiment 6.

Servo output:

$$Y=x(n) \qquad \text{Ex. 53}$$

Auxiliary output:

$$P=(x(n)\%N1)/N1*360(\text{degrees}) \qquad \text{Ex. 54}$$

where

%: remainder operation

N1: number of pulses per output axis revolution, i.e., rotary table revolution

Figure 98:
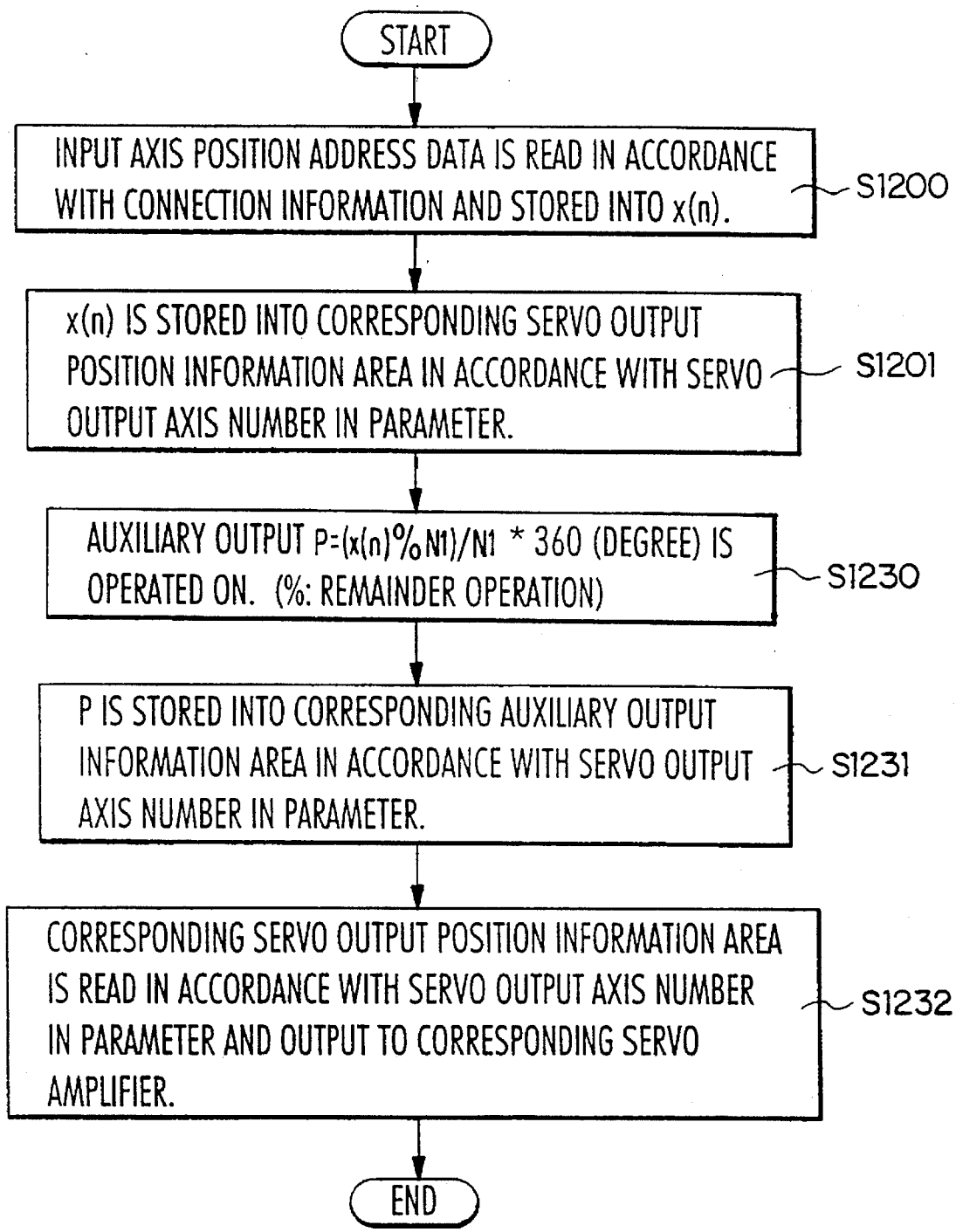
FIG. 98 is a flowchart showing the operation of the output module in the positioning apparatus according to the twenty-first preferred embodiment of the invention.

FIG. 98 is an operation flowchart for the output module and is a part of the real-time interrupt processing operation shown in FIG. 13.

Operation will now be described with reference to FIG. 98. Whereas the output module does not operate independently and is used with the other virtual mechanical modules, its independent operation will be described here. When the output module is implemented, the processing proceeds to step S1200. The steps S1200 and S1201 are identical to those in FIG. 91 illustrating embodiment 19. The processing then advances to step S1230, where the angle as the auxiliary output P of the output module is operated on in accordance with Expression 54, and at step S1231, the operation result P is stored into the corresponding auxiliary output information area 90 in accordance with the servo output axis number 311 in the parameter area.

Finally, at step S1232, the corresponding servo output position information area 91 is read in accordance with the servo output axis number 311 in the parameter area and that data is output to the corresponding servo amplifier. This flowchart is then terminated.

Another embodiment of the output module will be described. FIG. 99 shows a memory map where the output module is stored in the program memory 9, wherein 71 and 72 are identical to those in FIG. 23 illustrating the sixth embodiment, 340 indicates operation expressions for finding a servo output position address Y and a servo output torque limit value Ya, and 341 a variable, i.e., a memory address of the variable memory 11 where a command value k of the torque limit value is stored. 311 indicates a parameter, i.e., an actually output servo output axis number.

FIG. 100 shows a memory map of the work memory 10 which saves data required for the output module to carry out operation, wherein 126 is identical to the one in FIG. 24 illustrating embodiment 6.

Figure 101:
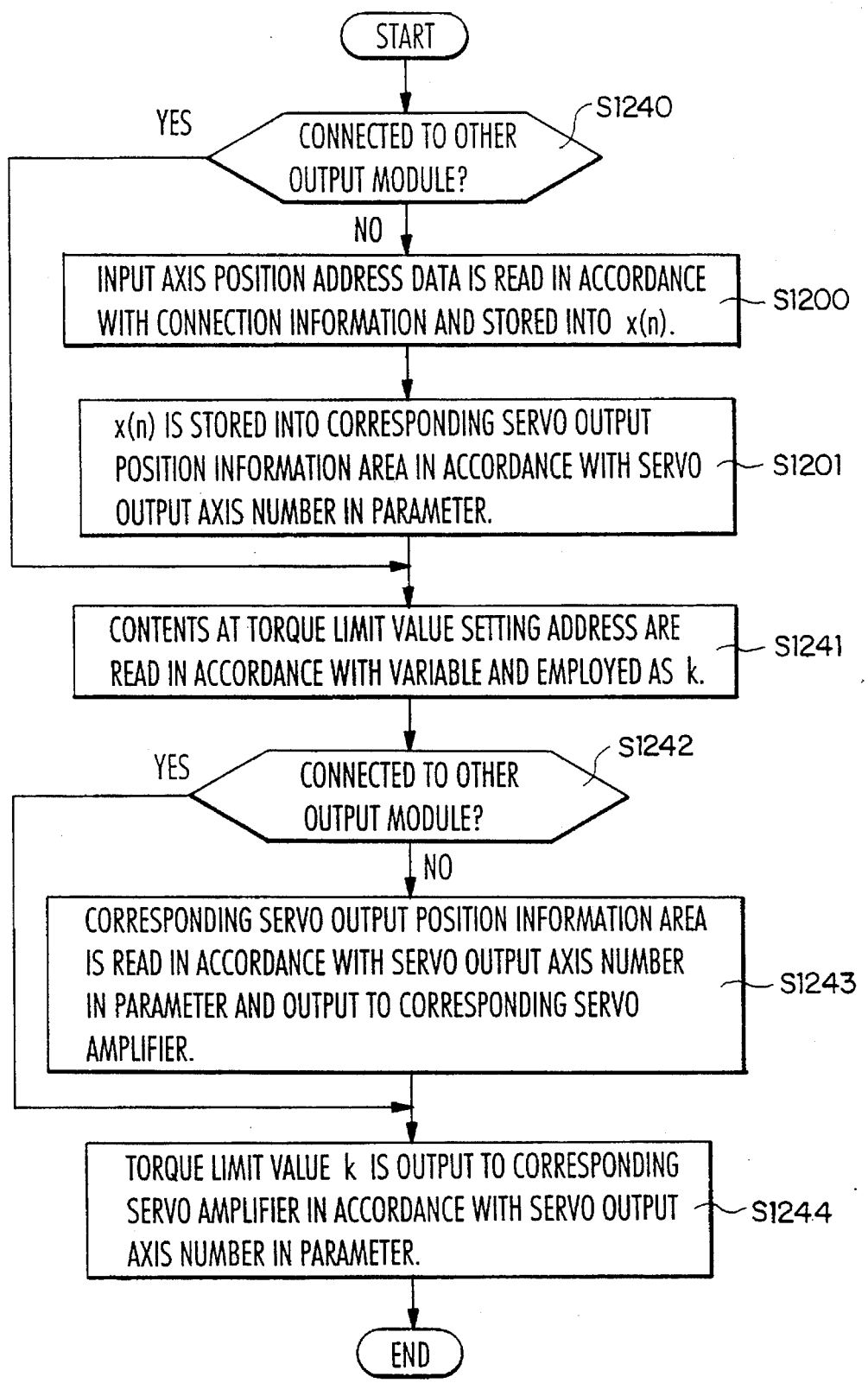
FIG. 101 is a flowchart illustrating the operation of the output module in the positioning apparatus according to the twenty-second preferred embodiment of the invention.

FIG. 101 is an operation flowchart for the output module and is a part of the real-time interrupt processing operation shown in FIG. 13.

Operation will now be described with reference to FIG. 101. While the output module does not operate independently and is used with the other virtual mechanical modules, its independent operation will be described here. When the output module is implemented, it is determined at step S1240 whether or not the output module is connected to the other output module. If it is connected, the processing goes to step S1241 because the servo output position has already been operated on by the operation processing of the other output module. If not connected, the processing proceeds to the step S1200.

The steps S1200 and S1201 are identical to those in FIG. 91 illustrating embodiment 19. Then, at step S1241, the memory address where the torque limit value input in accordance with the variable 341 is read and that data is defined as a variable k.

Then, at step S1242, it is determined whether or not the output module is connected to the other output module. If it is connected, the processing goes to step S1244 because the servo output position has already been operated on by the operation processing of the other output module. If not connected, the processing proceeds to the steps S1243, where the corresponding servo output position information area 91 is read in accordance with the servo output axis number 311 in the parameter area and that data is output to the corresponding servo amplifier. Then, at step S1244, the torque limit value k is output to the corresponding servo amplifier in accordance with the servo output axis number 311 in the parameter area. This flowchart is then terminated.

Whereas the positioning controller and servo amplifier are connected by a digital bus and the torque limit is put by passing the torque limit value to the servo amplifier in the present embodiment, the addition of means of converting the torque limit value from digital to analog produces an identical effect when the servo amplifier connected receives the torque limit as a voltage command.

As described above, the output module can be connected to the virtual connecting shaft or virtual transmission module and also to each of the other output modules in the inventions of embodiments 19, 20 and 21, and can put a torque limit to each of the output mechanisms in embodiments 19, 20 and 21.

Another embodiment of the present invention employing the virtual cam as the virtual mechanical module will now be described.

Figure 102:
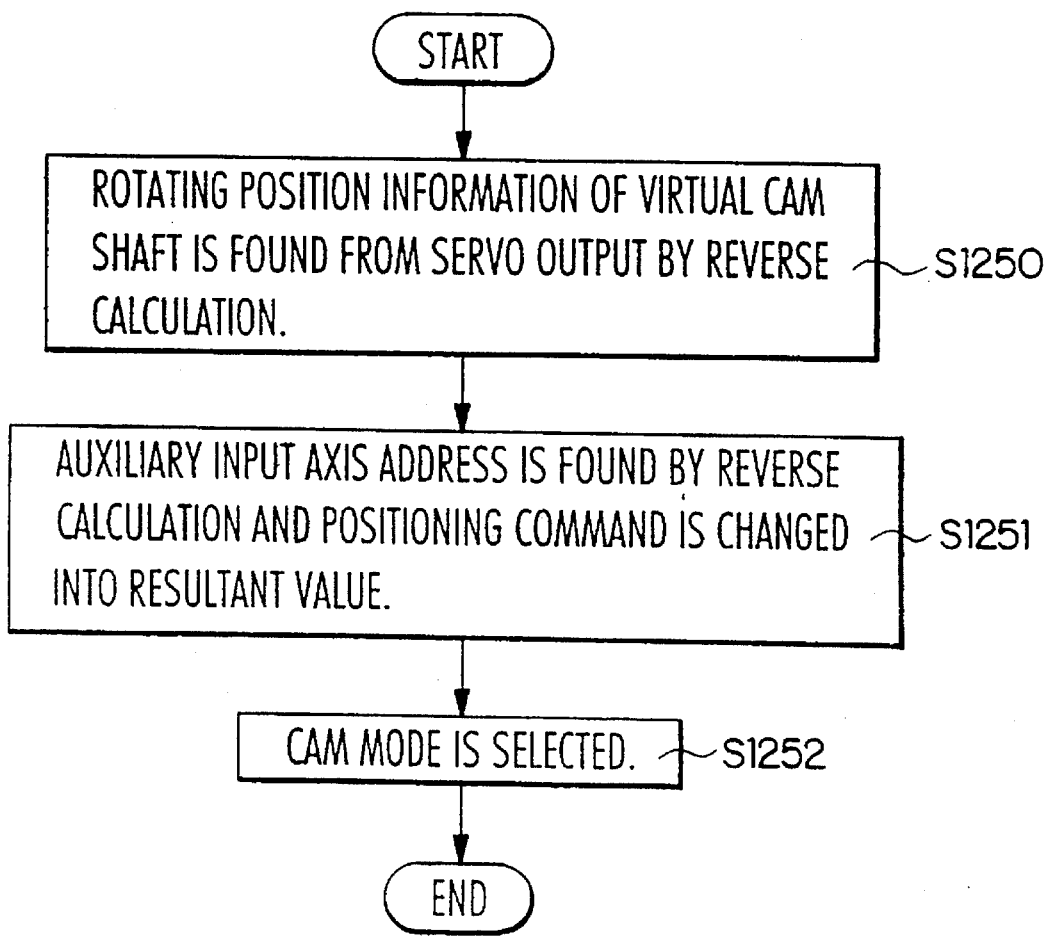
FIG. 102 is a flowchart showing the procedure of switching operation from an ordinary mode control system to a cam mode control system according to a twenty-third preferred embodiment of the invention.
Figure 103:
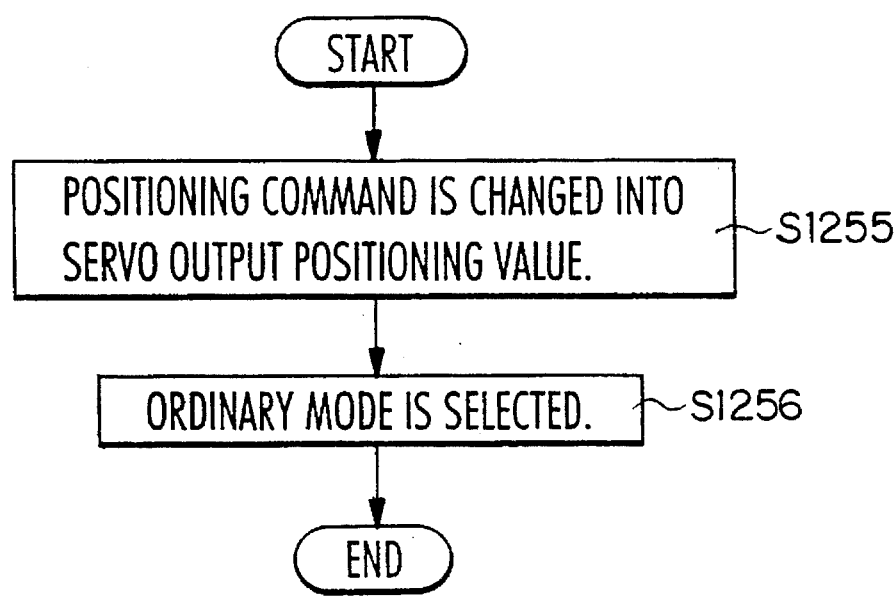
FIG. 103 is a flowchart showing the procedure of switching operation from the cam mode control system to the ordinary mode control system according to the twenty-third embodiment of the invention.

FIG. 102 shows a procedure of switching from a servo motor control run wherein machine operations are described in a conventional positioning program without using the virtual mechanical modules to a servo motor control run wherein machine operations are described in a program employing the virtual mechanical modules. Oppositely, FIG. 103 shows a procedure of switching from the servo motor control run wherein machine operations are described in a program employing the virtual mechanical modules to the servo motor control run wherein machine operations are described in a conventional positioning program without using the virtual mechanical modules.

The switching operations will now be described. A procedure of controlling the servo motor by the combination of the virtual cam module and output module is as described in FIGS. 76, 81 and 86. This control system is referred to as the cam mode. In this mode, the command address of operation described in the conventional format of positioning program is a value input to the auxiliary input axis 57 of the virtual cam module and is different from the position address actually given to the servo motor.

When the servo motor is controlled by the output module only, the command address of operation described in the conventional format of positioning program is output directly to the servo output axis. This control system is referred to as the ordinary mode. In this mode, the command address of operation described in the conventional format of positioning program is equal to the position address actually given to the servo motor.

If the position address given to the servo motor changes at the time of switching from one of these control systems to the other, the position of the object to be controlled changes suddenly. To prevent this operation, the command address under control of the conventional format of positioning program must be changed so that the position addresses given to the servo motor may be continuous before and after the switching.

A procedure of switching from the ordinary mode to the cam mode is shown in FIG. 102. First, the rotating position information of the virtual cam shaft in the virtual cam mode is found by reverse calculation from the positioning value currently given to the output module and the cam shape data table (S1250). When this calculation processing is described by using the virtual cam module shown in FIG. 74 as an example, it is the processing of retroactively executing from the output side the operation expressions 282 for finding the positioning value to be output, which is included in the memory map of the virtual cam module shown in FIG. 78. Its details will now be described.

Assuming that the stroke value set value stored beforehand in the variable memory is h1, the stroke lower limit position set value is h2, and the positioning value given to the output module is y, the cam operation value D at the time is calculated as:

$$D=(y-h2)/h1$$

The cam shape data table in FIG. 75 is then referred to reversely to find the rotating position information of the virtual cam shaft corresponding to the cam operation value D. At this time, a proportional distribution calculation based on the cam operation value is made i.e., the cam operation values D1 and D2, which satisfy the relationship of D1DD2 in relation to the cam operation value D, are first retrieved from the cam shape data table in FIG. 75. The position addresses within one revolution corresponding to the cam operation values D1 and D2 are obtained from the cam shape data table in FIG. 75 and defined as A1 and A2. The rotating position information A of the virtual cam shaft corresponding to the cam operation value D is calculated from the cam operation values D1 and D2 and the position addresses within one revolution A1 and A2 as follows:

$$A=A1+(A2-A1)*(D-D1)/(D2-D1)$$

The position address z of the auxiliary input axis is then found by reverse calculation (S1251). Since the rotating position information A of the virtual cam shaft is the sum of the input axis position address x and the auxiliary input axis position address z, the auxiliary input axis position address is found by subtracting the input axis position address x from the virtual cam shaft rotating position information A. When the result is a negative value, one revolution (360°) is added to convert the result into the position address within one revolution. The position address provided by the positioning apparatus is changed to the auxiliary input axis position address z that is found.

When the cam mode is selected after the processing (S1252), the position addresses given to the servo motor become continuous before and after the switching, preventing the position of the object to be controlled from changing abruptly.

A procedure of switching from the cam mode to the ordinary mode is shown in FIG. 103. First, the position address given by the positioning apparatus is changed to the positioning value y currently given to the output module (S1255).

When the ordinary mode is selected after appropriate processing (S1256), the position addresses given to the servo motor become continuous before and after the switching, preventing the position of the object to be controlled from changing suddenly.

Figures 104, 105, 106:
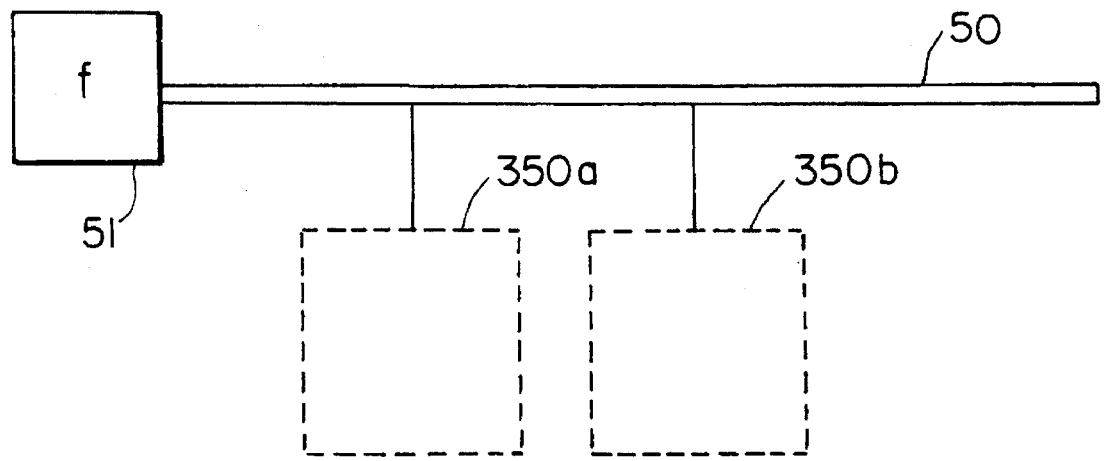
FIG. 104 is a block diagram illustrating a positioning apparatus according to a twenty-fourth preferred embodiment of the invention.
FIG. 105 is a block diagram showing the output position information area of a virtual drive module in the positioning apparatus according to the twenty-fourth preferred embodiment of the invention.
FIG. 106 is a block diagram showing the starting address area of each block in the positioning apparatus according to the twenty-fourth preferred embodiment of the invention.

FIG. 104 shows another embodiment of the present invention, wherein the numeral 51 indicates a virtual drive module, 50 a virtual connecting shaft, 350a a block 1 comprising virtual mechanical modules, and 350b a block 2 comprising virtual mechanical modules.

FIG. 105 shows an output position information area of the virtual drive module having the virtual connecting shaft as its output, of which data is the position address data of the virtual connecting shaft. FIG. 106 shows an area storing the starting address of each block, consisting of the position address of the virtual connecting shaft initiating the operation of each block.

Figure 107:
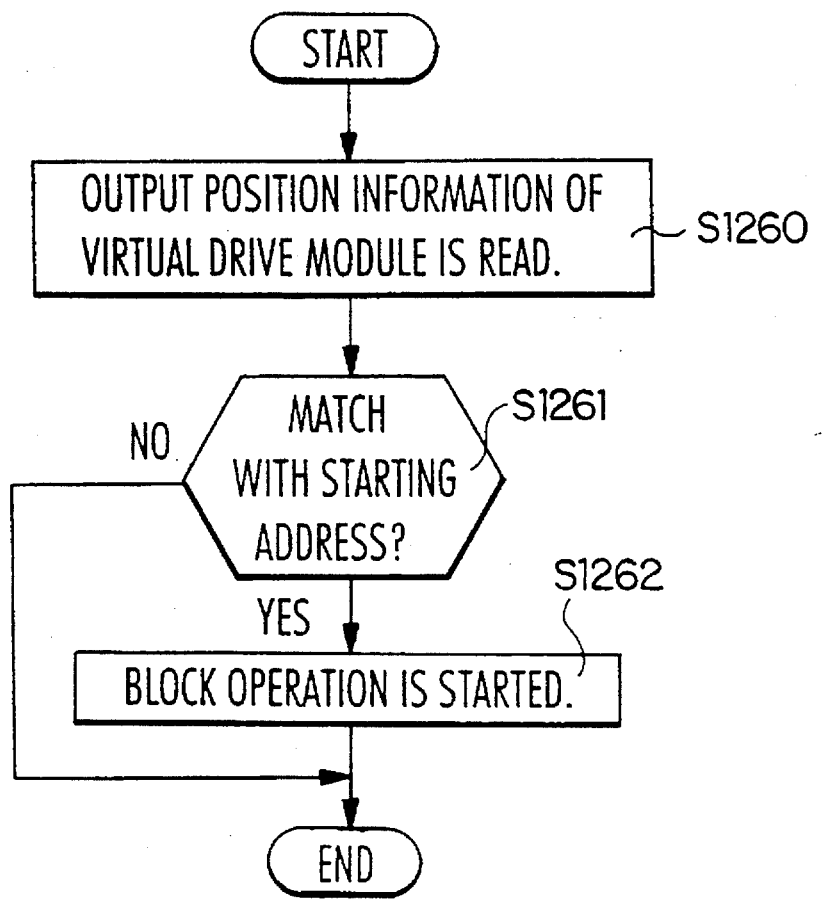
FIG. 107 is a flowchart showing the processing operation of each block at the time of operation start in the positioning apparatus according to the twenty-fourth preferred embodiment of the invention.

Operation will now be described. The output from the virtual drive module (position address of the virtual connecting shaft) is stored into the output position information area of the virtual drive module at intervals of predetermined time. When the operation start command for each block is input, the processing in FIG. 107 is performed. First, the output position information of the virtual drive module is read (step S1260). The block starting address is read from the starting address area and compared with the output position information of the virtual drive module (step S1261). If they do not match, the processing is terminated without any further operation. If they match, the block operation is started (step S1262). The block operation indicates that operation is carried out in accordance with the operation expressions of the virtual transmission modules constituting the block of the virtual mechanical modules and the servo output is stored into the servo output position information area.

Figure 108:
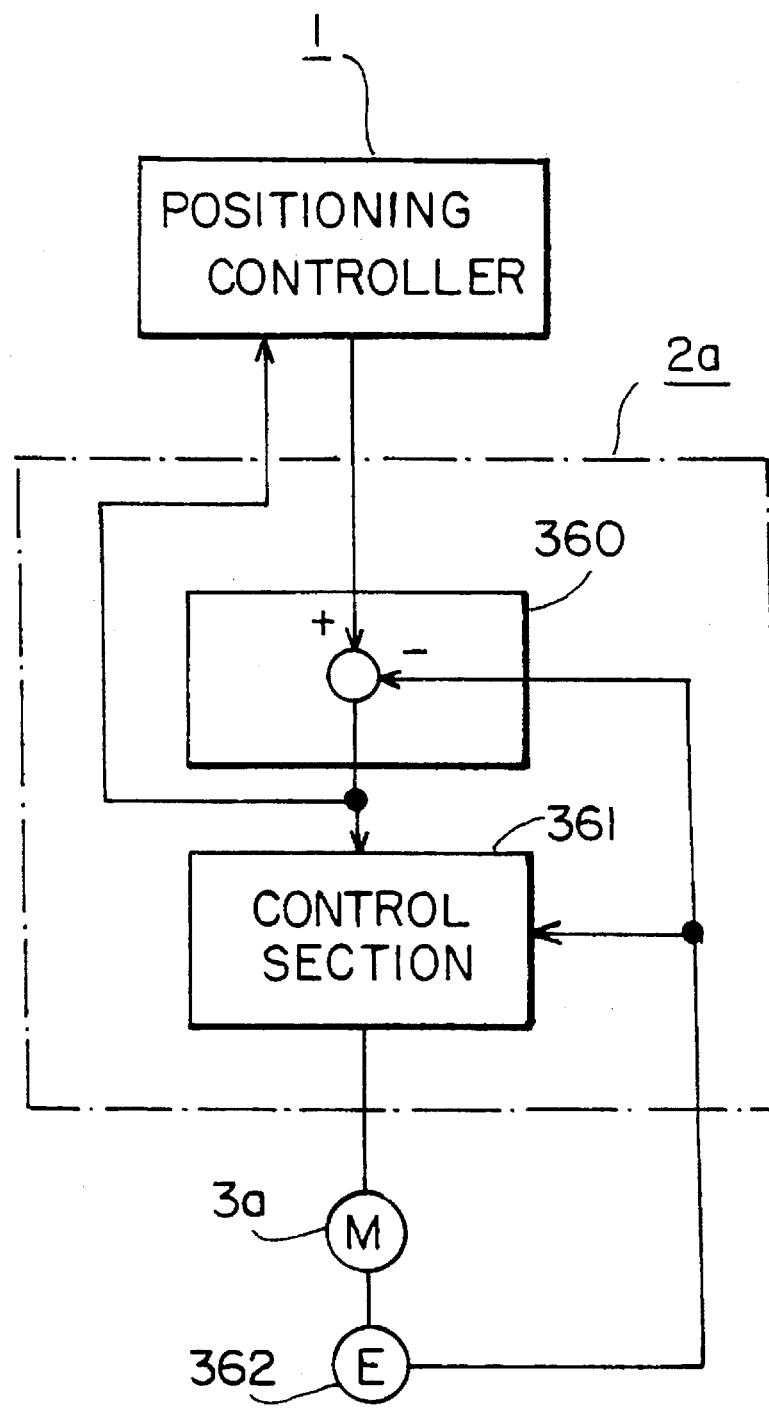
FIG. 108 is a block diagram concerned with a servo amplifier in a positioning apparatus according to a twenty-fifth preferred embodiment of the invention.

FIG. 108 shows another embodiment of the present invention, illustrating the details of the servo amplifier 2a in FIG. 1, wherein the numeral 362 indicates an encoder as a position detector connected to a servo motor 3a, 360 a deviation counter which can detect a difference between a position command value from a positioning controller 1 and a feedback pulse from the encoder 362 and read such difference also from the positioning controller 1, and 361 a control section for controlling the servo motor 3a in accordance with the output of the deviation counter 360.

FIG. 109 shows a virtual drive module memory map, wherein 363 indicates a stop command area which stores a variable used to determine whether output may be provided or not. For example, if the variable is 1, the output is provided, i.e., the operation of the virtual drive module 51 is carried out. If it is 0, the output is stopped, i.e., the operation of the virtual drive module 51 is stopped.

Figure 110:
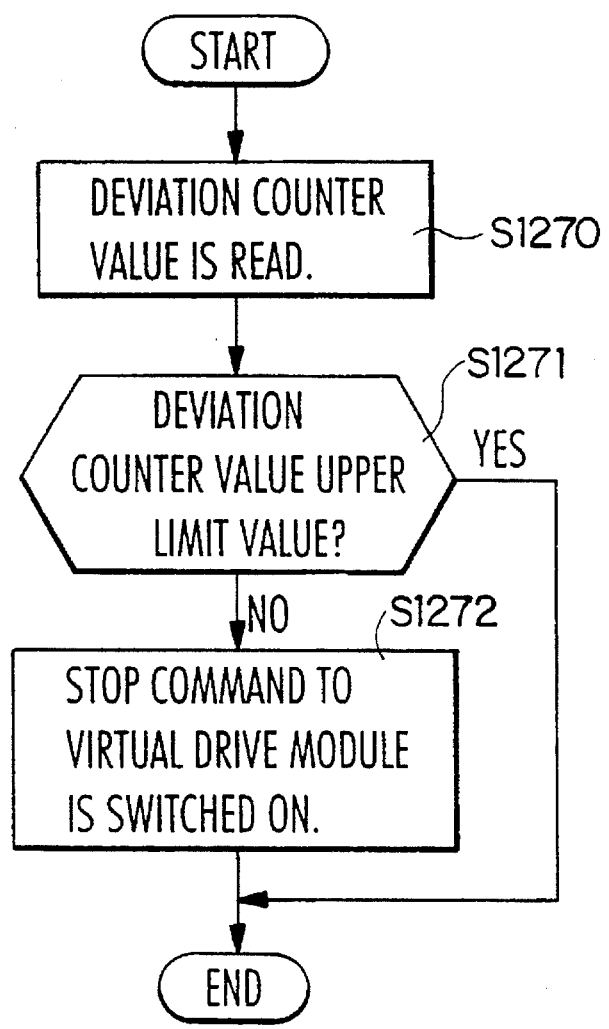
FIG. 110 is a flowchart concerned with the processing of an output module in the twenty-fifth embodiment of the invention.

FIG. 110 is an error detection flowchart for the output module. First, the value of the deviation counter 360 for the servo amplifier 2a connected to the positioning controller 1 is read via the servo amplifier interface 15 (S1270) and compared with an upper limit value preset to the variable memory 11 (S1271). As a result, if an error that the deviation counter 360 value is greater than the preset upper limit value has occurred, the stop command 363 in the variable area 74 in the memory map in FIG. 7 of the virtual drive module connected to the output module in which such error has taken place is switched on (S1272). The above operation is executed in all the output modules 60.

Figure 111:
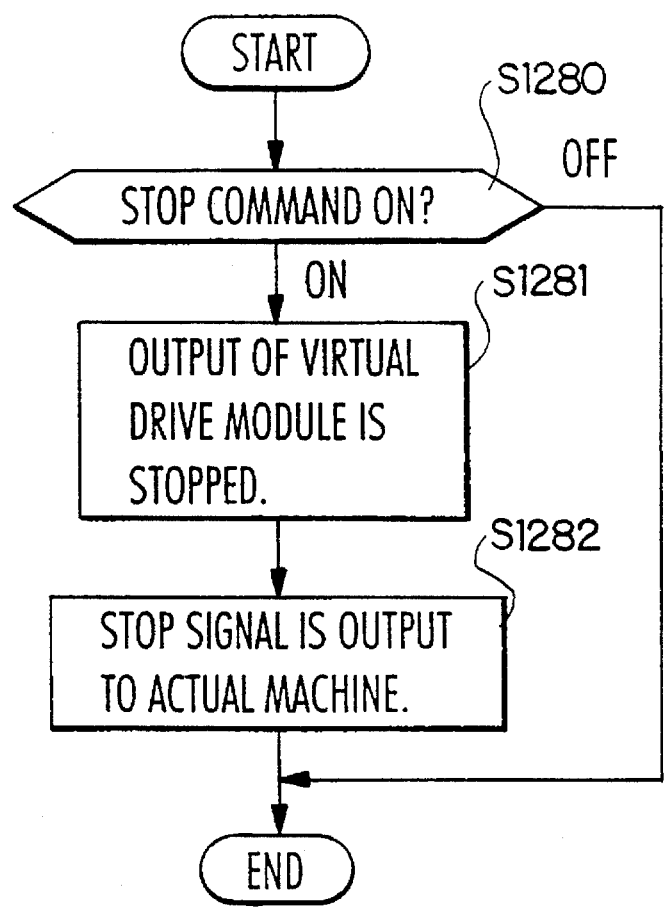
FIG. 111 is a flowchart concerned with the processing of a virtual drive module in the twenty-fifth embodiment of the invention.

FIG. 111 is an operation flowchart with respect to the stop command of the virtual drive module. When the stop command 363 in the variable area 74 is switched on (S1280), the virtual drive module 51 stops the output (S1281), and further outputs a stop signal for stopping the actual machine via the I/O interface 16 (S1282).

It should be noted that where a plurality of positioning controllers are connected by a data communication line as in the second or third embodiment of the invention, the stop command provided for each output module is passed to the corresponding virtual drive module by communication.

The output of the virtual drive module 51 is thus stopped to stop the outputs of all the output modules 60 connected to the virtual drive module 51.

The comparison between the deviation counter 360 value and set upper limit value performed by the positioning controller 1 in this embodiment may also be made by the servo amplifier 2a, only the result of comparison may be output from the servo amplifier 2a to the positioning controller 1, and the positioning controller 1 may then stop the output of the virtual drive module 51 and output the stop signal to the actual machine using such comparison result.

Figure 112:
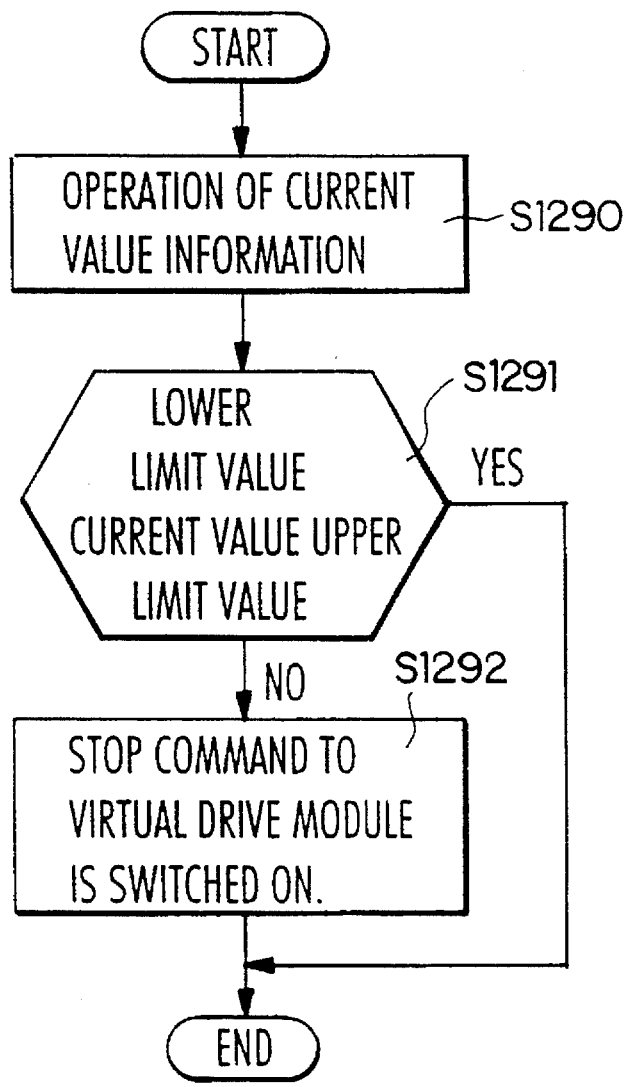
FIG. 112 is a flowchart concerned with the processing of an output module in a twenty-sixth embodiment of the invention.

Another embodiment of the present invention will be described. FIG. 112 is an error detection flowchart for the output module. The positioning controller 1 operates on the auxiliary output information 90 in accordance with the block operation expression 88 in FIG. 11 (S1290) and compares the result with the upper and lower limit values of a current value pre-stored in the variable memory 11 (S1291). If the comparison reveals the occurrence of an error that the operation result is outside the upper/lower limit value range, the stop command 363 in the variable area 74 in the memory map in FIG. 7 of the virtual drive module connected to the output module in which such error has taken place is switched on (S1292). The above operation is executed in all the output modules 60.

The method of stopping the output of the virtual drive module 51 and outputting the stop signal to the actual machine after the stop command is switched on is identical to that in FIG. 111 in the twenty-fifth embodiment of the invention.

Figure 113:
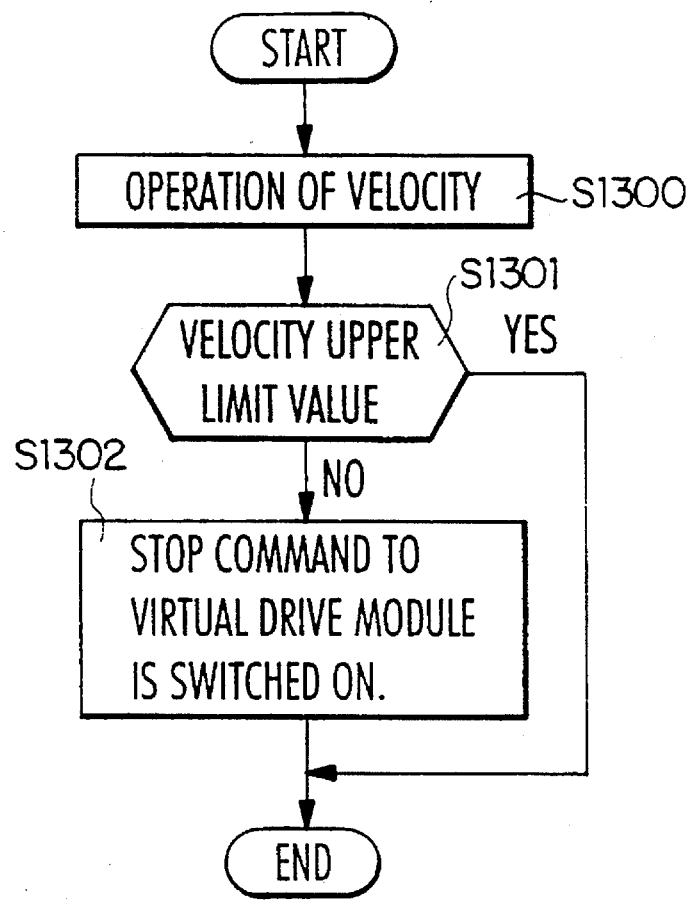
FIG. 113 is a flowchart concerned with the processing of an output module in a twenty-seventh embodiment of the invention.

Another embodiment of the present invention will be described. FIG. 113 is an error detection flowchart for the output module. The positioning controller 1 operates on the velocities of the output modules 60 for all the axes connected to the virtual connecting shaft 50 (S1300) and compares the results with the upper limit value of the velocity pre-stored in the variable memory 11 (S1301). If the result of such comparison indicates the occurrence of an error because the upper limit value has been exceeded, the stop command 363 in the variable area 74 in the memory map in FIG. 7 of the virtual drive module connected to the output module in which such error has taken place is switched on (S1302). The above operation is executed in all the output modules.

The method of stopping the output of the virtual drive module 51 and outputting the stop signal to the actual machine after the stop command is switched on is identical to that in FIG. 111 in the twenty-fifth embodiment of the invention.

The velocity in this embodiment is represented by a value of travel per unit time. By taking the block 1 in FIG. 2 as an example, the velocity can be represented by a difference between the current servo output position information Y13(n) output by the output module 30 and the preceding servo output position information Y13(n−1).

Figure 114:
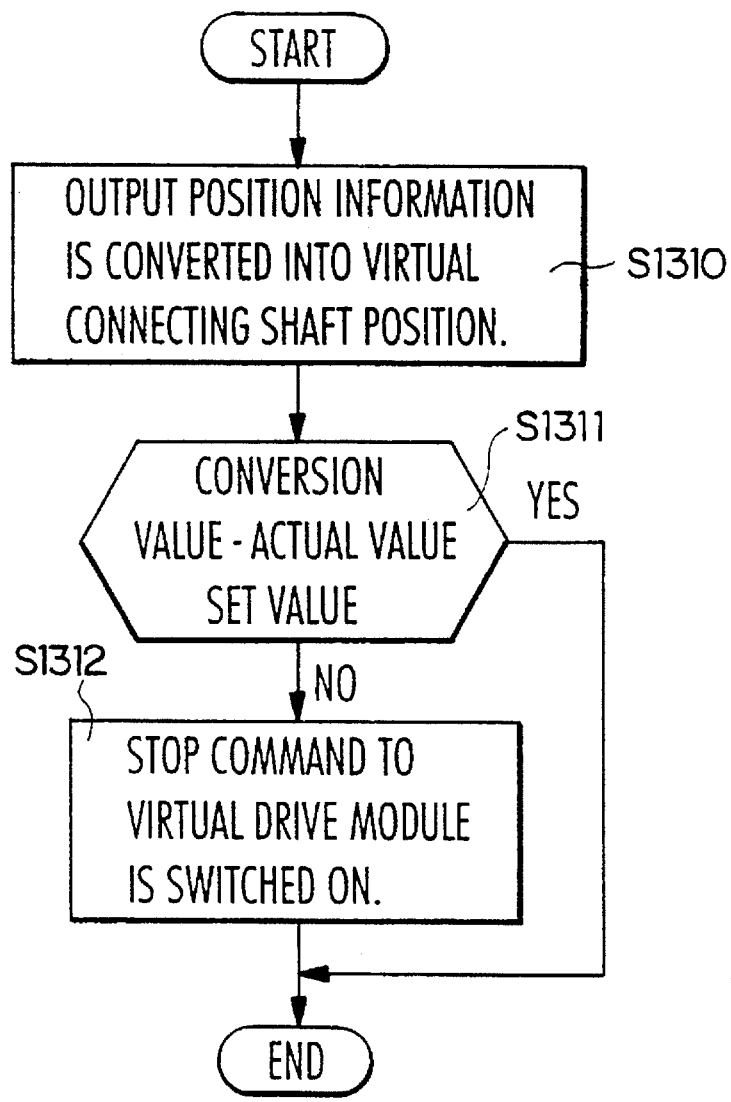
FIG. 114 is a flowchart concerned with the processing of an output module in a twenty-eighth embodiment of the invention.

Another embodiment of the present invention will be described. FIG. 114 is an error detection flowchart for the output module. First, the reverse calculation of the block operation expression 88 is carried out from the servo output position information 91 in FIG. 11 for conversion into the position of the virtual connecting shaft 51 (S1310), and the result of this reverse operation is compared with the output position information 87 of the virtual drive module 51 connected to such output module 60 (S1311). If the result of comparison indicates the occurrence of an error that the difference has exceeded a range pre-stored in the variable memory 11, the stop command 363 in the variable area 74 in the memory map in FIG. 7 of the virtual drive module 51 connected to the output module 60 in which such error has taken place is switched on (S1312). The above operation is executed in all the output modules.

The method of stopping the output of the virtual drive module 51 and outputting the stop signal to the actual machine after the stop command is switched on is identical to that in FIG. 111 in the twenty-fifth embodiment of the invention.

Figure 116:
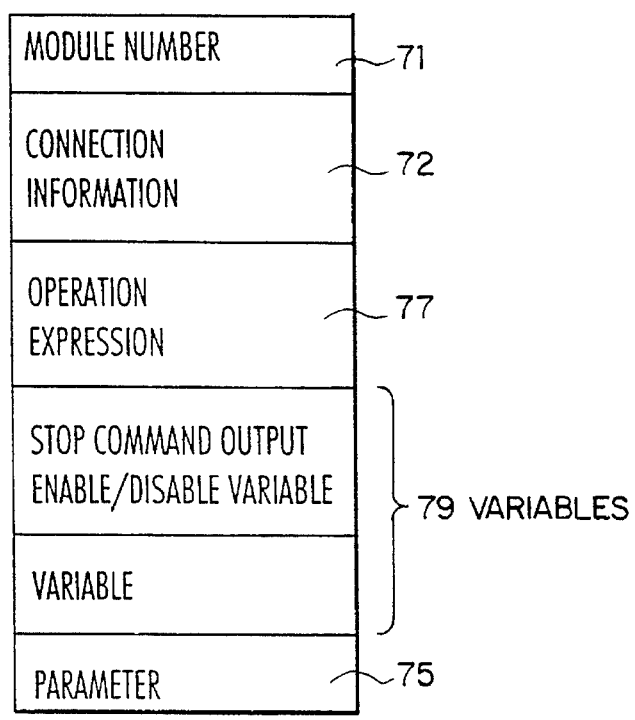
FIG. 116 is a memory map in the twenty-ninth embodiment of the invention.

While the stop command 363 is stored in the variable 74 area in the virtual drive module memory map in FIG. 109 to stop the output of the virtual drive module 51 at the occurrence of an error in any of embodiments 25 to 28, a variable 364 for selecting whether or not the stop command 363 is output to the virtual drive module 51 is stored beforehand in a variable 79 area in a memory map of the output module 60 in FIG. 116.

Figure 115:
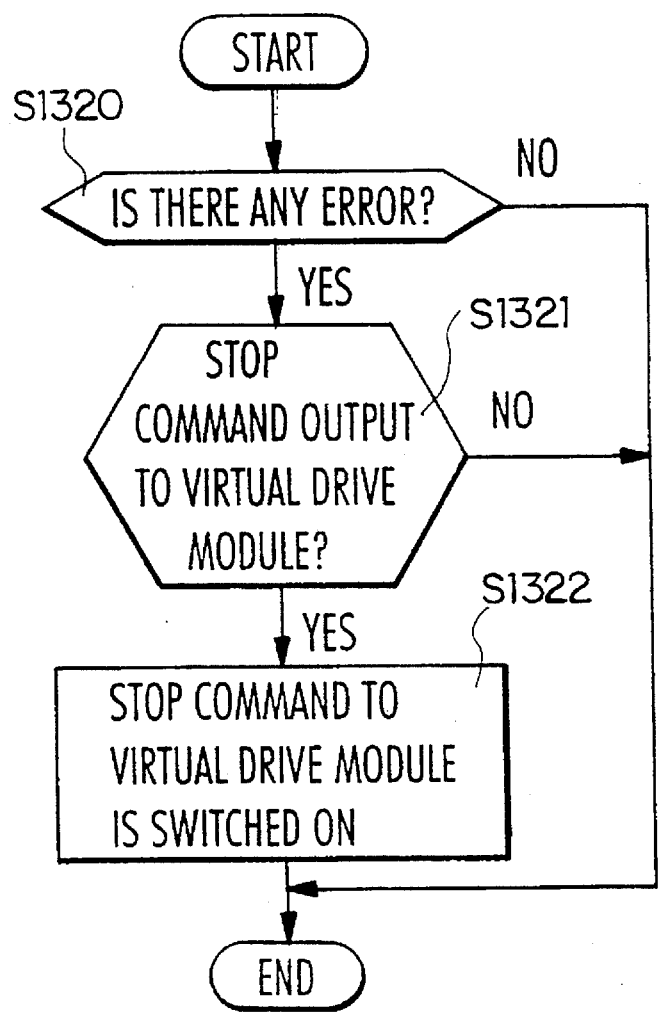
FIG. 115 is a flowchart concerned with the processing of an output module in a twenty-ninth embodiment of the invention.

FIG. 115 is an operation flowchart for the output module. If any error has been found while an error check in any of embodiments 25 to 28 is performed in any axis (S1320), it is determined whether or not the stop output is provided to the virtual drive module 51 (S1321). If it is invalid, the stop command is not output to the virtual drive module 51. If valid, the stop command is output to the virtual drive module 51 (S1322).

The virtual drive module 51 of which stop command has been switched on stops the output thereof and also outputs the stop signal to the actual machine in the same manner as in FIG. 111.

Figure 119:
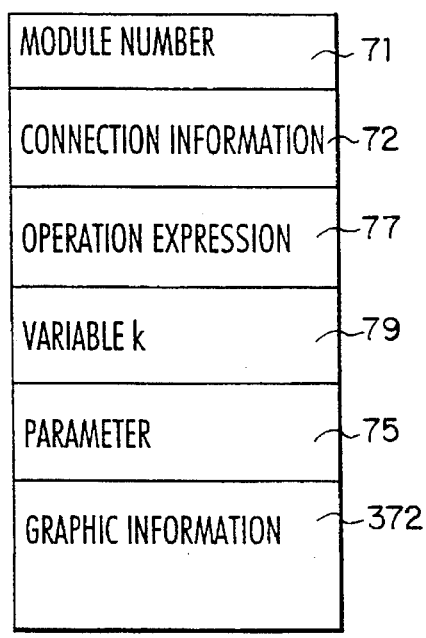
FIG. 119 is a memory map of an output module in the thirtieth embodiment of the invention.
Figure 117:
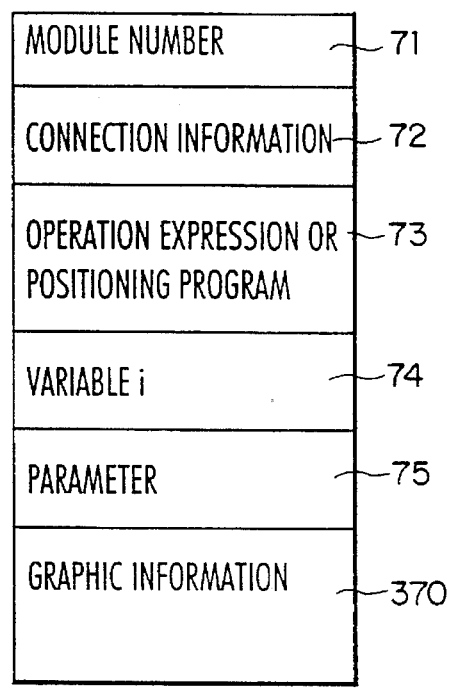
FIG. 117 is a memory-map of a virtual drive module in a thirtieth embodiment of the invention.
Figure 118:
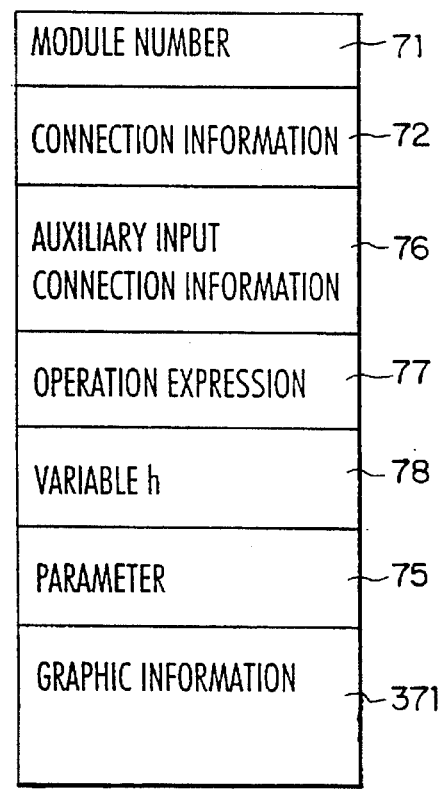
FIG. 118 is a memory map of a virtual transmission module in the thirtieth embodiment of the invention.
Figure 120:
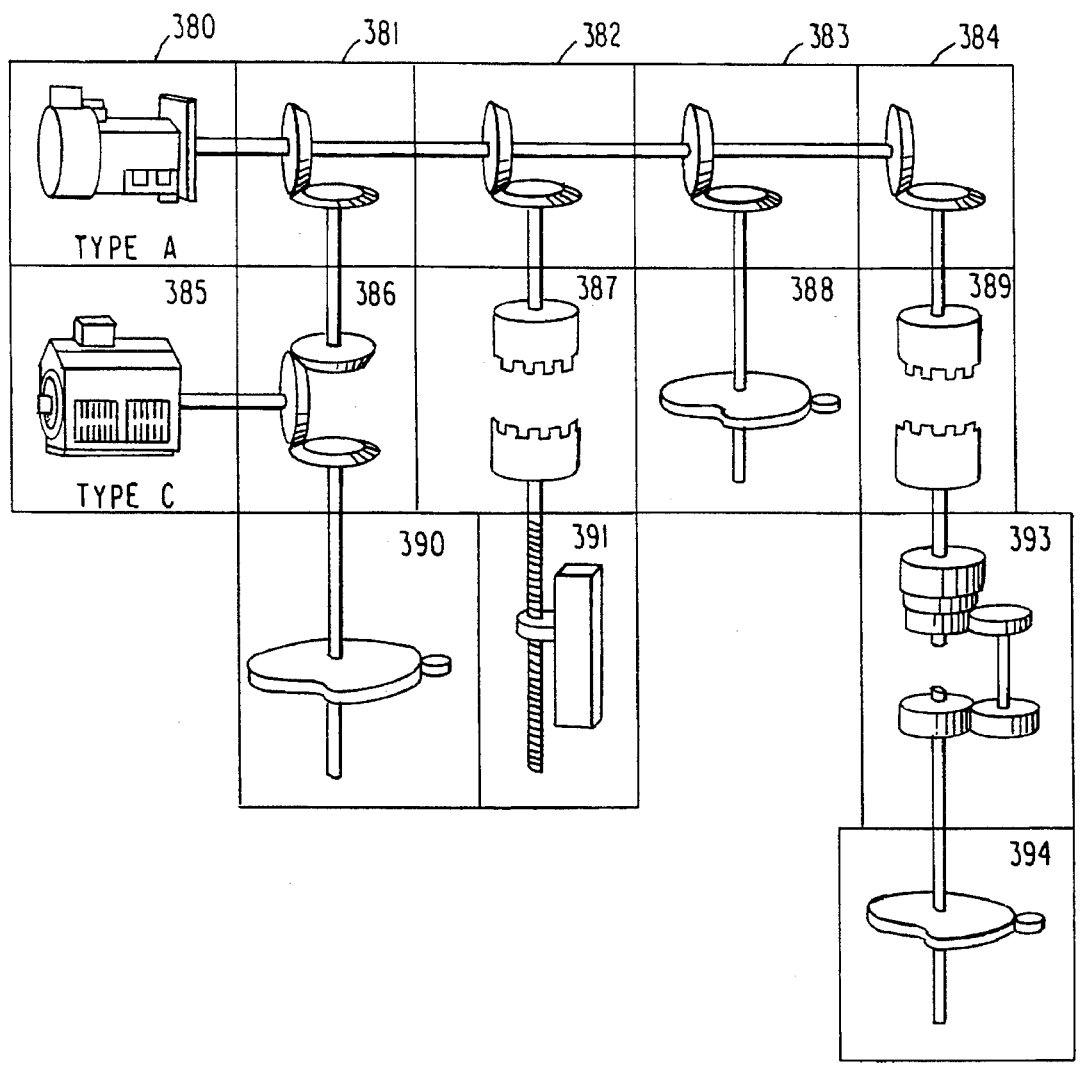

An embodiment of a program display method in accordance with the present invention will be described. FIG. 117 is a virtual drive module memory map, FIG. 118 a virtual transmission module memory map, and FIG. 119 an output module memory map. In these drawings, the numerals 370, 371 and 372 indicate graphic information and the others are identical to those in FIGS. 7 to 9. FIG. 120A provides an example of a program written by combining the virtual mechanical modules and corresponds to FIG. 2 in embodiment 1. 380 indicates the virtual drive module in the fifth embodiment, 385 the virtual drive module in the fourth embodiment, 381 to 384, 386 to 389, and 393 virtual transmission modules, 381 to 384 virtual gear modules, 386 a virtual differential gear module, 387 and 389 virtual clutch modules, 393 a virtual speed changer module, 388, 390, 391 and 394 output modules, 388, 390 and 394 rotary tables, and 391 a ballscrew.

Operation will now be described. The areas of the graphic information 370 to 372 in FIGS. 117 to 119 contain picture information which directly represent the virtual mechanical modules. On a CRT, the information is displayed as indicated by 380 to 394 in FIG. 120A. A program is written by selecting, completing and connecting the virtual mechanical modules in a manner displayed on the CRT of the peripheral 6 and is then executed after it has been downloaded to the program memory 9 of the positioning controller 1. The operation of the positioning controller 1 is identical to that described in the first embodiment, i.e., though the added graphic information is not employed for actual control, this graphic information is used on the peripheral 6 when the program is written or monitored.

In the present embodiment, the program is downloaded to the program memory 9 of the positioning controller 1 together with the graphic information. In this manner, the program can be called and re-displayed from the positioning controller 1 if the program does not exist on the peripheral 6. However, an identical effect is produced by downloading only the actually required area other than the graphic information to the positioning controller 1. In this case, although the peripheral must contain graphic information labeled to make the graphic information correspond one-for-one with the virtual mechanical modules on the positioning controller side in order to re-display the program, less program memory capacity is required for the positioning controller.

Figure 120B:
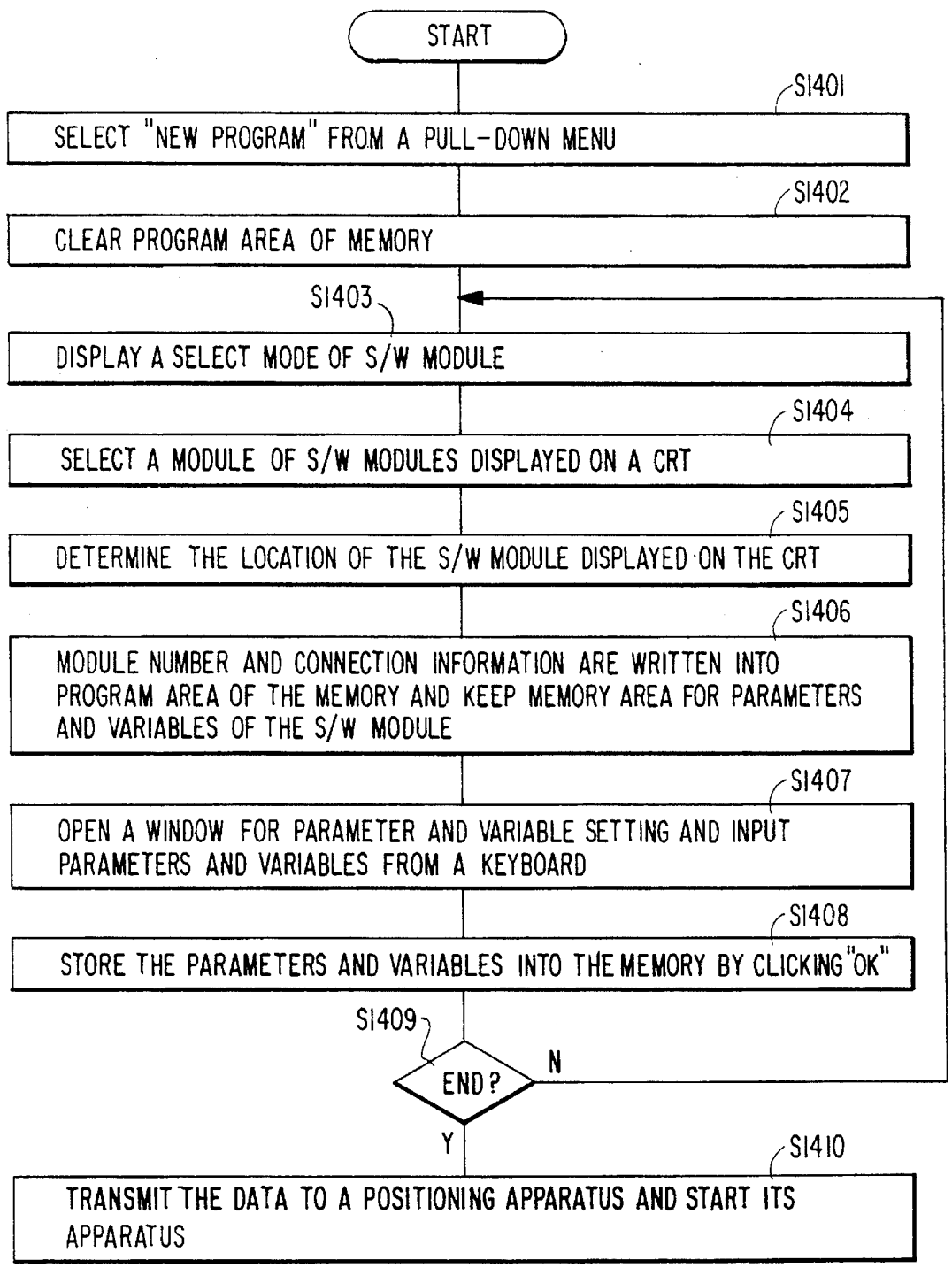

Next, a procedure to write a new program using graphics is explained. A procedure to draw block 382 in FIG. 120A is explained as an example. The procedure to write a program with graphics is shown in flowchart of FIG. 120B. First, a new program is selected from a pull down menu, etc., using a keyboard, a mouse, CRT, etc., in a peripheral device, at step 1401. When new program is selected, the memory program area is cleared at step 1402.

Figure 120C:
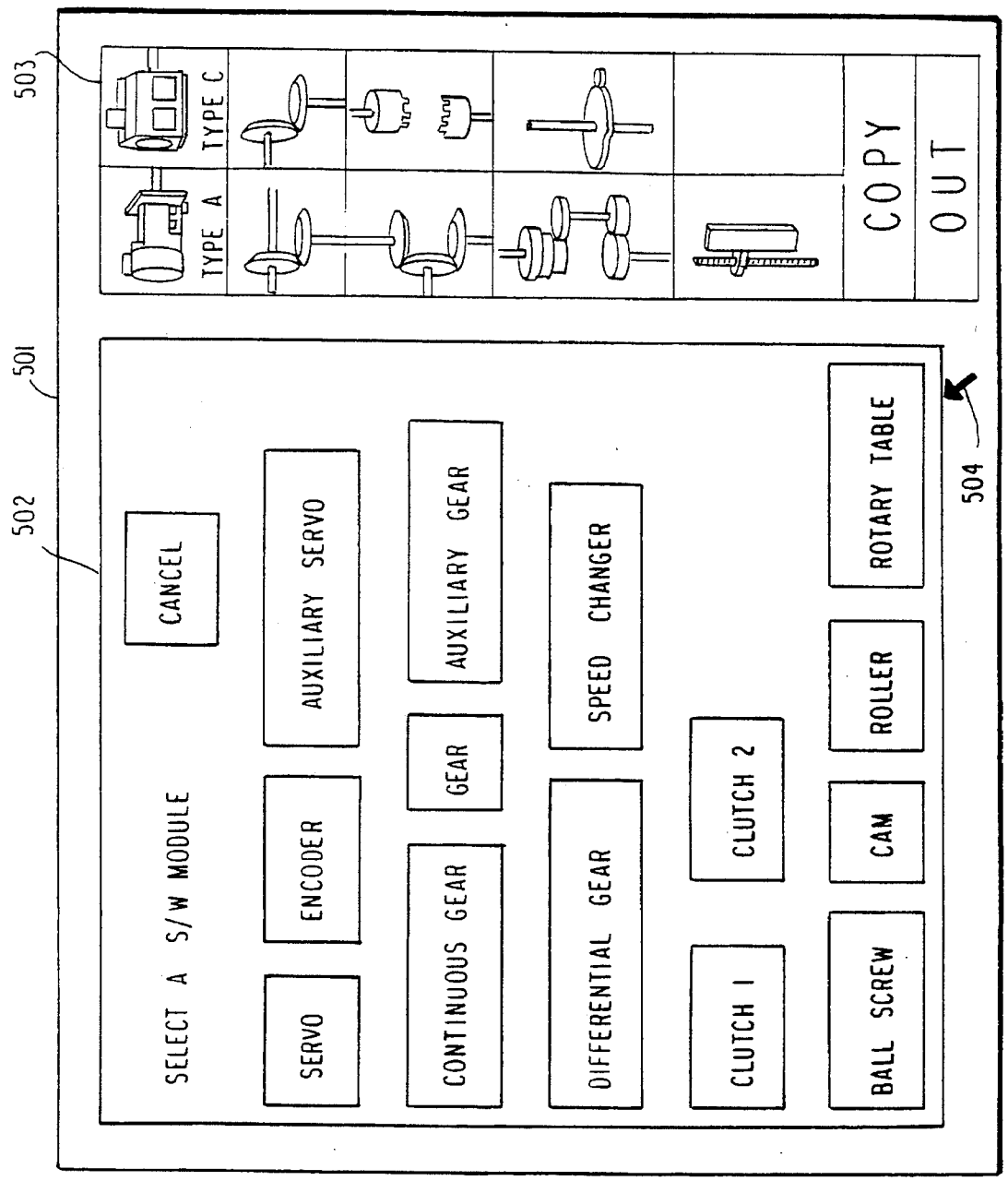

FIG. 120C is an illustration of a screen to select a software module. 501 indicates a CRT, 502 a window, 503 select keys and 504 an arrow of a mouse. Software module selection can be made either by selection keys 503 or by words in window 502. The operation has the option of choosing either one for convenience.

When the program area is cleared at step 1402, a software module select screen shown in FIG. 120C is displayed on CRT at step 1403. Here "servo" as a drive software module is selected at step 1404. Then the window will be closed, and the position to display a servo is determined either by mouse or by cursor direction key at step 1405. Next, the module number and connection information is written in the program area and the memory area for parameters and variables, and this information is maintained at step 1406. This information corresponds to the information described with respect to FIGS. 7–9. If appropriate, a window to set parameters and variables is opened an parameters and variables are inputted at step 1407. At step 1408, either by clicking "O.K." with mouse or by pushing the keyboard return key, parameters and variables which were inputted will be stored in memory area maintained at step 1406. At step 1409, a question is asked as to whether the procedure is completed or not. To go back to step 1403, the operation selects "NO" and then selects and sets a gear, which is a transmission software module, in the same way as the servo was selected and set.

In the present example, a ballscrew as an output software module is selected and set in the same manner. Clearly, the entire arrangement as seen in FIG. 120A can be built in this manner, and will be assembled into "block" form, as seen in FIG. 11. After the arrangement has been assembled, "YES" is selected at step 1409 after confirmation by the operator and the above program is transmitted to a positioning apparatus, which starts its operation.

Figure 120F:
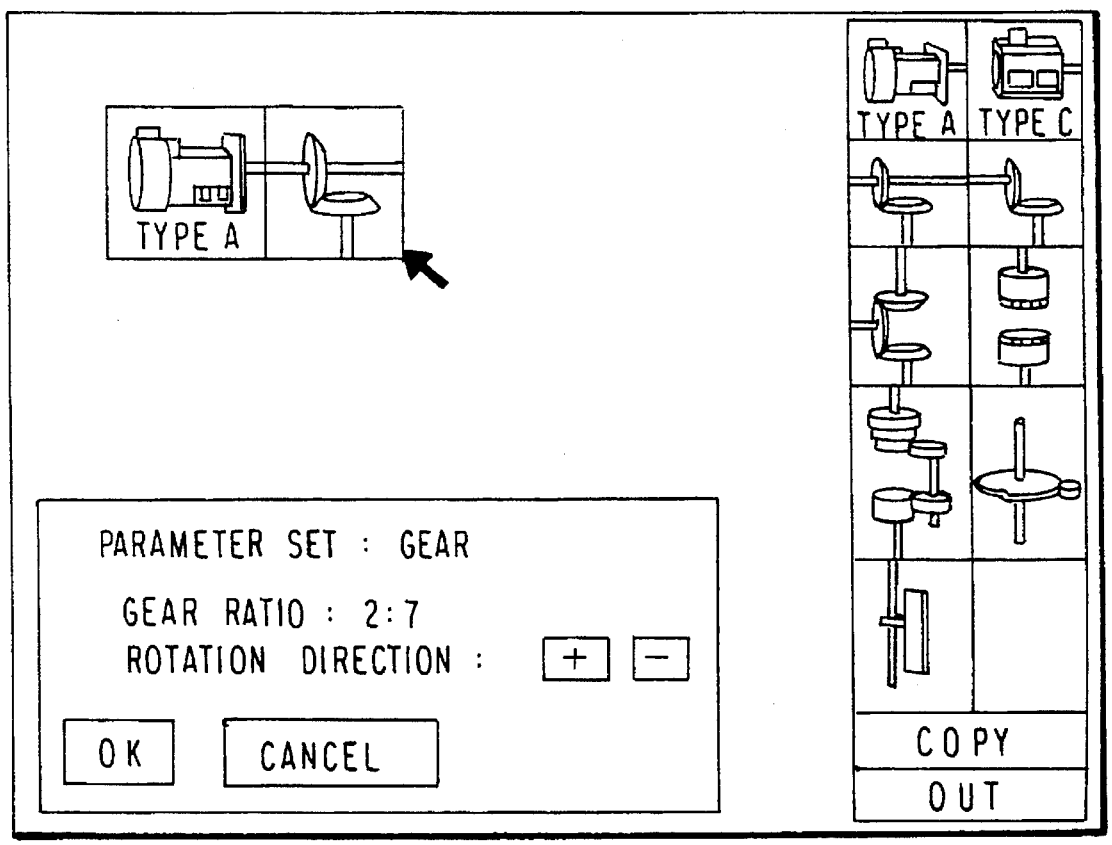

FIG. 120D shows the process to write a program in accordance with the above procedures. FIG. 120E shows a completion of servo setting. FIG. 120F illustrates that gear is connected to the servo. Finally, FIG. 120F illustrates a display indicating that a window is open to set parameters, such as a preferred gear ratio as a gear parameter setting.

The first embodiment of the invention achieves machine mechanisms required to operate in synchronization by allowing the position information of a virtual connecting shaft to be shared between a plurality of axes, allows a machine to be arranged easily since complicated machine mechanisms are simulated by virtual mechanical modules, and accomplishes a variety of mechanisms by combining the virtual mechanical modules, thereby making a dedicated positioning controller unnecessary. In addition, since the machine mechanisms are replaced by the virtual mechanical modules to describe motor operation, programs can be written easily and also programs written by others can be understood easily.

The second embodiment of the invention allows the position information of the virtual connecting shaft to be transmitted through communication between a plurality of positioning controllers so that the position information of the virtual connecting shaft may be shared between the plurality of positioning controllers, thereby achieving a machine which is required to operate while simultaneously synchronizing more axes than the number of axes controllable by a single positioning controller.

The third embodiment of the invention has connected a plurality of positioning controllers not only by a data communication line but also by a synchronous clock to allow the plurality of positioning controllers to operate at identical timing, whereby the plurality of positioning controllers can employ the position information of the virtual connecting shaft at identical timing and even a machine which operates while simultaneously synchronizing axes spanning the plurality of positioning controllers can synchronize the axes accurately using the virtual connecting shaft.

The fourth embodiment of the invention allows a synchronous mechanism with an external machine to be replaced intact by a program (virtual drive module) to allow a plurality of virtual drive modules to be placed at portions desired to be synchronized by a single encoder interface or an optional number of axes and optional motors to be synchronized by connecting a single virtual drive module to each axis by the virtual connecting shaft, whereby it will only be necessary to change the virtual drive module position if a system is modified, reducing time required to configure a system.

The fifth embodiment of the invention provides a virtual drive module that drives a virtual servo motor, allowing a multiplicity of axes to be controlled synchronously without time delay.

The sixth embodiment of the invention achieves a positioning apparatus which exercises accurate synchronous control. A transmission mechanism gear has been built as a virtual gear module so that the user need not make actual machine mechanisms, gears can be set and changed easily at optional positions of a transmission section, and the gears are made backlashless.

The seventh embodiment of the invention achieves a positioning apparatus that facilitates flexible setting and changing of gears, allows intermittent operation such as fixed-length feeding to be performed easily, and ensures ease of synchronous control with other axes. A transmission mechanism gear has been designed as a virtual gear module, whereby the user need not make actual machine mechanisms and can set the valid range of the teeth of an input axis side gear in a parameter.

In addition, the seventh embodiment achieves a positioning apparatus which can operate without giving impact to a machine actually connected. Since output is provided through a filter, an intermittent operation axis can achieve smooth acceleration/deceleration if the connecting shaft is operating continuously.

The eighth embodiment allows a virtual clutch to be created easily in short time on a machine-by-machine basis without taking life, heat generation, noise, etc., into consideration. Since a clutch as a power transmission mechanism can be replaced intact by a program (virtual clutch module), it is not necessary to make a clutch which is built actually mechanically.

The ninth embodiment allows a virtual clutch to be created easily in short time on a machine-by-machine basis without taking life, heat generation, noise, etc., into consideration. Since a clutch as a power transmission mechanism can be replaced intact by a program (virtual clutch module), it is not necessary to make a clutch which is built actually mechanically.

The tenth embodiment allows a virtual clutch that ensures smooth output and transmission without impact at clutch engagement and disengagement times to be created easily in short time on a machine-by-machine basis. Since a clutch as a power transmission mechanism can be replaced intact by a program (virtual clutch module), a clutch designed actually mechanically need not be created, life, heat generation, noise, etc., need not be taken into account, and position address data is output through a filter having a time constant.

The eleventh embodiment allows a differential gear to be represented by Expression 3 as a virtual transmission module, gear ratios to be set, and a virtual drive module to be connected to an auxiliary input axis, whereby control as exercised by machine mechanisms can be carried out without designing and manufacturing them.

The twelfth embodiment allows a differential gear to be represented by Expression 3 as a virtual transmission module, gear ratios to be set, and a velocity command to be given to an auxiliary input axis, whereby tension can be controlled easily by a dancer roll without an interface that inputs a compensation velocity command to a servo amplifier.

The thirteenth embodiment allows a differential gear to be represented by Expression 3 as a virtual transmission module, gear ratios to be set, and an auxiliary input axis to output address data sequentially read from an output address data table, thereby offering the fine adjustment of a positioning pattern.

The fourteenth embodiment allows a virtual speed changer to be created easily in short time on a machine-by-machine basis without considering life, heat generation, noise, etc. Since a speed changer built mechanically can be replaced intact by a program (virtual speed changer module), it is not necessary to make a speed changer which is designed actually mechanically.

The fifteenth embodiment allows a virtual speed changer that offers smooth speed change without impact at its speed change time to be created easily in short time on a machine-by-machine basis. Since a speed changer built mechanically can be replaced intact by a program (virtual speed changer module), a speed changer which is designed actually mechanically need not be made, life, heat generation, noise, etc., need not be considered, and position address data is output through a filter having a time constant.

The sixteenth embodiment achieves a positioning apparatus that allows reciprocative cam operation to be performed continuously, and the cam operation to be changed easily in velocity characteristic, acceleration/deceleration characteristic and stroke value. A cam shape data table, a stroke value set value and a stroke lower limit position set value for continuous reciprocative cam operation are stored in a memory, allowing them to be rewritten from an external peripheral.

The seventeenth embodiment achieves a positioning apparatus that allows unidirectional position feeding cam operation to be performed continuously, and the cam operation to be changed easily in velocity characteristic, acceleration/deceleration characteristic and stroke value. A cam shape data table, a stroke value set value and a starting address of the position feeding cam operation on a virtual cam shaft for continuous unidirectional position feeding cam operation are stored in a memory, allowing them to be rewritten from an external peripheral.

The eighteenth embodiment achieves a positioning apparatus that allows the stroke value of cam operation to be changed easily while in operation of the apparatus. A cam shape data table, a stroke lower limit position set value and a virtual camshaft updating address for updating cam operation stroke value are stored in a memory, allowing them to be rewritten from an external peripheral.

The nineteenth embodiment achieves a positioning apparatus which tells what an actual output mechanism connected to an output axis is at the sight of a program, because a roller acting as the actual output mechanism is built as an output module.

In addition, since the actual peripheral velocity of the roller is provided, the nineteenth embodiment achieves a positioning apparatus which ensures ease of operation confirmation.

The twentieth embodiment achieves a positioning apparatus which tells what an actual output mechanism connected to an output axis is at the sight of a program, because a ballscrew acting as the actual output mechanism is built as an output module.

Also, since the ballscrew acting as the actual output mechanism is designed as the output module, the twentieth embodiment achieves a positioning apparatus which can respond to a system modification by only changing a servo output axis number in parameters without needing to change a positioning program if an output axis number is altered by the system modification.

Further, because actual machine position information is provided, the twentieth embodiment achieves a positioning apparatus which ensures ease of operation confirmation.

The twenty-first embodiment achieves a positioning apparatus which tells what an actual output mechanism connected to an output axis is at the sight of a program, because an angle controlling mechanism, such as a rotary table, acting as the actual output mechanism is built as an output module.

Also, since the angle controlling mechanism, such as the rotary table, acting as the actual output mechanism is designed as the output module, the twenty-first embodiment achieves a positioning apparatus which can respond to a system modification by only changing a servo output axis number in parameters without needing to change a positioning program if an output axis number is altered by the system modification.

Further, because an actual angle is provided, the twenty-first embodiment achieves a positioning apparatus which ensures ease of operation confirmation.

The twenty-second embodiment achieves a positioning apparatus which allows a torque limit to be changed easily without changing machine mechanisms at setup changes and also allows a torque limit to be changed easily according to the load and operation of a motor changing in a synchronous system, because a torque limit value command is designed as an output module.

The twenty-third embodiment achieves a positioning apparatus which allows a mode wherein the special operation of a cam, etc., is performed and a mode wherein simple linear motion or interpolative operation is done to be switched easily from one to the other. A position command output to a servo motor is compensated for to make its values continuous when a run wherein the servo motor is controlled by a program describing machine motions using virtual mechanical modules and a run wherein the servo motor is controlled by a conventional positioning program describing machine motions without employing virtual mechanical modules are switched from one to the other.

Accordingly, position adjusting operation up to the starting position of cam operation can be performed by simple positioning operation known in the art, and the cam operation can be started from that position continuously by switching the control system.

The twenty-fourth embodiment allows the operation start of each axis to be synchronized without user burden, since a starting address is stored per axis and compared with the position address data of the virtual connecting shaft and the operation of each axis is initiated on a match of such two addresses.

The twenty-fifth embodiment is designed to stop the output of a virtual drive module and output a stop signal to the stop input of a drive unit which drives an actual machine when the value of a deviation counter in any axis has exceeded a preset upper limit value, whereby the output of the virtual drive module providing the source of operation of all the axes is stopped and the stop signal is also output to the external machine when the deviation counter value in any of a plurality of axes operating in synchronization is too large, stopping the whole machine operating in synchronization and preventing the machine from damage.

The twenty-sixth embodiment is designed to stop the output of a virtual drive module and output a stop signal to the stop input of a drive unit that drives an actual machine when a current value in any axis has exceeded a preset upper/lower limit value, whereby the output of the virtual drive module providing the source of operation of all the axes is stopped and the stop signal is also output to the external machine when the current value in any of a plurality of axes operating in synchronization exceeds the upper/lower limit value, stopping the whole machine operating in synchronization and protecting the machine from damage.

The twenty-seventh embodiment is designed to stop the output of a virtual drive module and output a stop signal to the stop input of a drive unit which drives an actual machine when a current velocity in any axis has exceeded a preset upper limit value, whereby the output of the virtual drive module providing the source of operation of all the axes is stopped and the stop signal is also output to the external machine when the current velocity in any of a plurality of axes operating in synchronization exceeds the upper limit value, stopping the whole machine operating in synchronization and protecting the machine from damage.

The twenty-eighth embodiment is designed to find the output result of an output module in each axis by reverse calculation, convert it into the position of a virtual connecting shaft, and stop the output of a virtual drive module and output a stop signal to the stop input of a drive unit that drives an actual machine when a mismatch between the resultant virtual connecting shaft position and the actual virtual connecting shaft position occurs in any axis, whereby the output of the virtual drive module providing the source of operation of all the axes is stopped and the stop signal is also output to the external machine when unsynchronization takes place for some reason in any of a plurality of axes operating in synchronization with the virtual drive module, stopping the whole machine operating in synchronization and protecting the machine from damage.

The twenty-ninth embodiment is designed to select whether the output of a virtual drive module is stopped or not when an error occurs in any axis, whereby the entire machine need not be stopped if an error takes place in any axis that do not require synchronization.

The thirtieth embodiment displays virtual mechanical modules specifically graphically,whereby the operator can easily write programs and easily understand programs written by others.

What is claimed is:

1. A method of establishing software-based, variable and synchronous control of a plurality of motors comprising the steps of:

defining plural virtual simulation means comprising a plurality of drive simulation means for generating and outputting position information, a plurality of transmission simulation means for simulating transmission mechanisms and a plurality of output simulation means for outputting motor commands, each said simulation means comprising a first addressable area for storing data uniquely identifying said simulation means, a second addressable area for storing data identifying simulation means connection information and a third addressable area for storing an operation expression or position program to generate position information;

defining a plurality of blocks of said simulation means, each block comprising the combination of at least one of the plurality of transmission simulation means and at least one of the plurality of output simulation means for a respective one of said motors; and;

establishing communication among said simulation means by specifying and storing said connection information in said second addressable area of each simulation means.

2. The method of claim 1, further comprising, on the basis of said established communication, the step of comprising the functions of all simulation means in one of said blocks into a block operation expression and storing said operation expression.

3. The method of claim 1, wherein said step of defining plural virtual simulation means further comprises defining a fourth addressable area for at least one of said simulation means for storing auxiliary information.

4. The method of claim 1, wherein said step of defining plural virtual simulation means further comprises defining a fifth addressable area for at least one of said simulation means for storing one or more of variable and parameter information.

5. The method of claim 4, further comprising the step of transferring each of said virtual simulation means from a first memory and storing said virtual simulation means in a second memory area for storing said operation expression, beginning with said output simulation means and proceeding toward a source of the position information on the basis of said connection information.

6. The method of claim 4, wherein said composing step is performed for each of said plurality of blocks.

7. The method of claim 6, wherein said composing steps conducted on the basis of a block number.

8. The method of claim 1, further comprising, on the basis of said established communication, the steps of combining the plural simulation means, on the basis of a composition of their functions, into a virtual mechanical simulation means expression and sorting said expression.

9. The method of claim 1, wherein at least one of said drive simulation means is represented by the operation expression:

$$y=f(x, i)$$

where y: output x: input, and i: variable.

10. The method of claim 1, wherein at least one of said transmission simulation means is represented by the operation expression:

$$y=g(x, z, h)$$

where y: output, x: input, z: auxiliary input, and h: variable.

11. The method of claim 1, wherein at least one of said output simulation means is represented by the operation expression:

$$Y=s1(x, k)$$

$$P=s2(s, k)$$

where

Y: servo output, x: input,

P: auxiliary output, k: variable, and i: variable.

12. A method of providing software-based, synchronous control of a plurality of motors in a machine on the basis of a plurality of virtual mechanical simulation means comprising at least one each of a drive simulation means for generating and outputting position information, a transmission simulation means for simulating transmission mechanisms, and an output simulation means for outputting motor commands, at least said transmission and output simulation means each being comprised of an operation expression or position program for generating output position information in response to input position information, certain of said simulation means being organized as a plurality of ordered blocks, each block relating to at least the transmission simulation means and the output simulation means for a respective one of said plurality of motors and each block having a block operation expression, said method comprising the steps of:

operating on the operation expression or position program of the drive simulation means and storing a result of said operation as drive simulation means output information;

operating on each of the plurality of ordered blocks in accordance with the block operation expression of the respective block on the basis of at least said corresponding drive simulation means output information and storing the results of said operation as servo output information, wherein said block operation expression of said respective block is generated based on the operation expressions or position programs of the simulation means relating to said respective block, wherein said block operation expression is a single expression stored in a single memory area so that operating on said block operation expression requires less processing time than operating separately on the corresponding operation expressions or position programs of the simulation means; and outputting said servo output information to said motors to synchronously drive said motors.

13. A method of providing software-based, synchronous control of a plurality of motors in a machine on the basis of plural virtual mechanical simulation means, the machine comprising a plurality of blocks each operative to generate and output position information, simulate transmission mechanisms, and output motor commands, each of said blocks comprising an operation expression or position program to generate output position information in response to input position information, said method comprising the steps of:

operating on the operation expression or position program of a first of said plurality of blocks and storing the results of said operation as drive output information;

operating on at least another of said plurality of blocks in accordance with the block operation expression of said first of said plurality of blocks on the basis of at least the stored drive output information and storing the results of said operation as servo output information; and outputting said servo output information to said motors.

14. The method of claim 13, wherein said block operation results comprise auxiliary output information and further comprises the step of storing said auxiliary information separately from said servo output position information.

15. The method of claim 14, further comprising the step of accessing said auxiliary information and monitoring the results of said motor operation.

16. The method of claim 13, wherein at least the first of said plurality of blocks defines a virtual operation of the motors in response to a master position controller, and said at least another of said plurality of blocks defines a virtual operation of the motors in response to a slave position controller, said motors being operated in synchronization with each other, further comprising the steps of:

creating virtual drive simulation means output position information in said master position controller;

transmitting said information to said slave position controller; and storing said information for use by the respective blocks of said master and slave controllers in executing position programs.

17. The method of claim 16, wherein the execution of said programs and the transmission of said results to motor servo amplifiers in each of said controllers is conducted in separate, synchronized time intervals.

18. The method of claim 13, wherein each block includes a transmission simulation means, and further comprising the step of providing same position information to plural ones of said transmission simulation means for synchronization thereof.

19. The method of claim 18, further comprising the step of generating a synchronous clock signal at a master controller and transmitting said clock signal to a slave controller.

20. The method of claim 13, wherein said machine comprises position detecting means mounted thereon for generating machine positioning information, and wherein at least one block is comprised of a drive simulation means, further comprising the steps of:

inputting to the drive simulation means of said at least one block said machine position information from said position detecting means;

setting a constant for normalizing said input machine position information; and outputting a result generated on the basis of said machine position information and said constant as position address data.

21. The method of any one of claims 1–7, further comprising the steps of displaying said simulation means and block composition, and performing said method interactively on the basis of such displaying.

22. The method of claim 21, further comprising the step of representing each of said simulation means on a display by one or more predetermined mechanical system images.

23. The method of claim 22, further comprising the step of representing a combination of said simulation means on a display as mechanically linked mechanical system images.

24. The method of any one of claims 1–7, further comprising the steps of displaying said simulation means and block compositions.

25. The method of claim 24, wherein said simulation means are displayed as graphic images of conventional mechanical devices and said blocks are displayed as combinations of mechanical images, mechanically connected in a conventional manner.

26. The method of claim 25, wherein said displaying steps are at least for purposes of simulation means selection by an operator.

* * * * *